(12) United States Patent
Yamasaki et al.

(10) Patent No.: US 7,273,691 B2
(45) Date of Patent: Sep. 25, 2007

(54) PLANOGRAPHIC PRINTING PLATE PRECURSOR, SUBSTRATE FOR THE SAME AND SURFACE HYDROPHILIC MATERIAL

(75) Inventors: Sumiaki Yamasaki, Haibara-gun (JP); Koichi Kawamura, Haibara-gun (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/656,395

(22) Filed: Jan. 23, 2007

(65) Prior Publication Data

US 2007/0122745 A1 May 31, 2007

Related U.S. Application Data

(62) Division of application No. 11/298,682, filed on Dec. 12, 2005, which is a division of application No. 10/166,201, filed on Jun. 11, 2002, now abandoned.

(30) Foreign Application Priority Data

| Jun. 11, 2001 | (JP) | ............................. | 2001-175952 |
| Jun. 11, 2001 | (JP) | ............................. | 2001-175953 |
| Jun. 11, 2001 | (JP) | ............................. | 2001-175954 |
| Jun. 11, 2001 | (JP) | ............................. | 2001-175955 |
| Sep. 6, 2001 | (JP) | ............................. | 2001-269833 |

(51) Int. Cl.
G03F 7/11 (2006.01)
G03F 7/038 (2006.01)
B41C 1/055 (2006.01)

(52) U.S. Cl. ............................. 430/271.1; 430/270.1; 430/302

(58) Field of Classification Search ............. 430/270.1, 430/271.1
See application file for complete search history.

(56) References Cited

U.S. PATENT DOCUMENTS

| 5,914,211 | A | 6/1999 | Hashino et al. |
| 5,962,188 | A | 10/1999 | DeBoer et al. |
| 6,014,930 | A | 1/2000 | Burberry et al. |
| 6,672,210 | B2 | 1/2004 | Kawamura et al. |
| 7,192,683 | B2 * | 3/2007 | Yamasaki et al. ........ 430/270.1 |
| 2002/0023565 | A1 | 2/2002 | Kawamura et al. |
| 2002/0134266 | A1 | 9/2002 | Yamasaki et al. |
| 2003/0118849 | A1 | 6/2003 | Yamasaki et al. |
| 2003/0143407 | A1 | 7/2003 | Yamasaki et al. |
| 2003/0170566 | A1 | 9/2003 | Yamaskai et al |
| 2003/0186057 | A1 | 10/2003 | Oohashi et al. |
| 2004/0060465 | A1 | 4/2004 | Yamasaki et al. |

FOREIGN PATENT DOCUMENTS

| EP | 0 709 228 A1 | 5/1996 |
| EP | 0 938 972 A1 | 2/1999 |
| EP | 0 903 224 A2 | 3/1999 |
| EP | 0 949 088 A1 | 10/1999 |
| EP | 1 057 622 A2 | 12/2000 |
| EP | 1 088 679 A2 | 4/2001 |
| EP | 1 172 696 A1 | 1/2002 |
| EP | 1 211 096 A1 | 6/2002 |
| EP | 1 226 976 A1 | 7/2002 |
| JP | 59-101651 A | 6/1984 |
| JP | 07-001853 A | 1/1995 |
| JP | 8-507727 A | 8/1996 |
| JP | 96/00733 | 9/1996 |
| JP | 08-272087 A | 10/1996 |
| JP | 08-292558 A | 11/1996 |
| JP | 2001-213062 A | 8/2001 |
| JP | 2001-315452 | 11/2001 |
| WO | 94/23954 A1 | 10/1994 |
| WO | 96/29375 A1 | 9/1996 |

OTHER PUBLICATIONS

"Cleaning Buildings Using Rain as a Shower," *The Chemical Daily* Jan. 30, 1995, p. 1.

* cited by examiner

*Primary Examiner*—Cynthia Hamilton
(74) *Attorney, Agent, or Firm*—Buchanan Ingersoll & Rooney PC

(57) ABSTRACT

A planographic printing plate precursor comprises a substrate having disposed thereon a hydrophilic layer which includes hydrophilic graft chains and a crosslinked structure formed through hydrolytic polycondensation of an alkoxide of an element selected from Si, Ti, Zr and Al. An aluminum substrate for a planographic printing plate includes a hydrophilic surface which is formed by a hydrophilic polymer including a functional group that chemically bonds to the aluminum substrate directly or is chemically bindable to the aluminum substrate via structural component having a crosslinking structure. A surface-hydrophilic member comprises a substrate having disposed thereon a hydrophilic layer, wherein the hydrophilic layer includes hydrophilic graft chains and a crosslinked structure formed through hydrolytic polycondensation of an alkoxide of an element selected from Si, Ti, Zr and Al.

6 Claims, No Drawings

PLANOGRAPHIC PRINTING PLATE PRECURSOR, SUBSTRATE FOR THE SAME AND SURFACE HYDROPHILIC MATERIAL

CROSS-REFERENCE TO RELATED APPLICATIONS

The present application is a divisional of application Ser. No. 11/298,682, filed on Dec. 12, 2005 which is a divisional of application Ser. No. 10/166,201, filed on Jun. 11, 2002 now abandoned, which claims the benefit of Japanese application nos. 2001-175952, 2001-175953, 2001-175954 and 2001-175955, all filed on Jun. 11, 2001, and Japanese Application No. 2001-269833, filed on Sep. 6, 2001, the contents of all of which are incorporated by reference.

BACKGROUND OF THE INVENTION

1. Field of the Invention

The present invention relates to a novel planographic printing plate precursor. In particular, the invention relates to a novel planographic printing plate precursor that is scanning-exposed to laser light on the basis of digital signals, has excellent sensitivity and resistance to stains, and with which easy in-printer development is made possible. The present invention also relates to a novel surface hydrophilic material and a substrate used for a planographic printing plate precursor which are excellent in hydrophilicity and durability.

2. Description of the Related Art

Planographic printing utilizes plate material including an ink-receiving lipophilic region and an ink-repellent region (hydrophilic region) that receives dampening water without receiving ink, and photosensitive planographic printing plate precursors (PS plates) are currently being widely used.

PS plates typically comprise a support, such as an aluminum plate, having disposed thereon a photosensitive layer. The PS plate is exposed imagewise and developed, whereby the photosensitive layer in a non-image area is removed, and printing is conducted utilizing hydrophilicity of the support surface and hydrophobicity of the photosensitive layer in an image area. It is necessary for the support surface to be highly hydrophilic in order to prevent the non-image area from being stained.

Conventionally, anodized aluminum plates or anodized aluminum plates which is subjected to silicate treatment in order to raise hydrophilicity have been used for the hydrophilic support or a hydrophilic layer. Much research relating to hydrophilized substrate and hydrophilic layers using such aluminum supports is being conducted. For example, Japanese Patent Application Laid-open (JP-A) No. 7-1853 discloses a support processed with an undercoating agent of polyvinylphosphonic acid, and JP-A No. 59-101651 discloses using a polymer including a sulfonic acid group as an undercoat layer underlying a photosensitive layer. In addition, there have also been proposals to use polyvinylbenzoic acid and the like as an undercoat agent.

There have been many proposals with respect to hydrophilic layers when flexible supports comprising PET (polyethylene terephthalate) or cellulose triacetate rather than using a metal support such as aluminum are used. For example, JP-A No. 8-292558 discloses a swelling hydrophilic layer comprising a hydrophilic polymer and a hydrophobic polymer, EP No. 0709228 discloses a PET support including a microporous, hydrophilic crosslinked silicate surface, and JP-A Nos. 8-272087 and 8-507727 disclose a hydrophilic layer that contains a hydrophilic polymer and is cured with hydrolyzed tetraalkyl orthosilicate.

These hydrophilic layers are more hydrophilic than conventional ones, and provide planographic printing plates with which stainless prints can be obtained when printing is initiated. However, there are problems in that the layers peel during the course of repeated printing and their hydrophilicity drops over time. There is thus a demand for planographic printing plate precursors with which many stainless prints can be obtained without the hydrophilic layer peeling from the support and without surface hydrophilicity dropping, even in severe printing conditions. There is also a demand for improved hydrophilicity from a practical perspective.

Numerous studies have been conducted in regard to printing plates for computer-to-plate systems, the development of which has been remarkable in recent years. Development-less planographic printing plate precursors that can be set in a printer to print without being developed after exposure are being researched with the aim of boosting process rationalization and solving the problem of waste treatment, and various methods have been proposed.

Namely, there has been the desire to simplify or eliminate altogether having to dissolve and remove the non-image area with an alkali developing solution (additional wet processing), which is customary in conventional processes for producing planographic printing plates. Particularly in recent years, because disposal of waste solution generated by wet processing is becoming a great concern in the entire industry in view of the global environment, the demand for improvement continues to grow ever stronger.

In response to this demand, there has been proposed a method using a printing plate precursor disposed with a thermosensitive recording layer, in which the non-image area is removable during the course of ordinary printing. After being exposed, the printing plate precursor is developed in a printer to obtain a final printing plate. Specifically, the exposed printing plate precursor is mounted on a cylinder in the printer without having been developed by a developer, and the non-image area of the planographic printing plate precursor is removed with ink and/or dampening water supplied thereto while the cylinder is rotated. This is referred to as in-printer development.

Planographic printing plate precursors suited to in-printer development must have a photosensitive layer that is soluble in dampening water or in an ink solvent, and they must be suitable for development in a printer set in a luminous room.

WO 94/23954 discloses a printing plate comprising a support having disposed thereon a crosslinked hydrophilic layer containing microcapsules of a thermo-fuseable substance. The microcapsules are broken by the action of heat generated in the region exposed to a laser light, and a lipophilic substance dissolves out of the broken microcapsules to thereby hydrophobicate the surface of the hydrophilic layer. Although the printing plate precursor does not require development, there is a problem in that the hydrophilicity and durability of the hydrophilic layer disposed on the support are unsatisfactory, and stains gradually appear in the non-image area in the course of printing.

One promising example relating to a thermosensitive recording layer having excellent in-printer developability is a thermosensitive planographic printing plate precursor that includes, as a thermosensitive image forming layer, a hydrophilic layer that contains hydrophobic thermoplastic polymer particles dispersed in a hydrophilic binder polymer. This printing plate precursor utilizes the principle that, when heat is applied to the thermosensitive layer, the hydrophobic thermoplastic polymer particles fuse, and the surface of the hydrophilic thermosensitive layer changes into a lipophilic image area.

However, while such planographic printing plate precursors exhibit good in-printer developability, there is a problem in that thermal energy is not sufficiently used in the image forming reaction due to the generated heat being diffused into the aluminum support in the precursor, and sensitivity is therefore low. Another problem is that, when fusion of the particles is insufficient, the image area of the thermosensitive layer becomes weak and printing durability becomes insufficient.

As a countermeasure, JP-A No. 2001-213062 proposes disposing an insulation layer comprising a water-insoluble organic polymer between the aluminum support and the thermosensitive layer. With this insulation layer, it has become possible to improve sensitivity without lowering printing durability. However, with regard to hydrophilicity of the support surface, there is still room for improvement in view of maintaining high hydrophilicity wherein stains do not appear in the non-image area over a long period of time.

On the other hand, resin films have been used for various purposes, and surfaces thereof have hydrophobic property in general. Almost inorganic materials such as glass and metal also have hydrophobic property. If surfaces of the films and materials have hydrophilicity, water droplets can adhere thereto, spread uniformly and forms water-film thereon. Therefore, cloud or mist can be prevented. Further, due to the hydrophilicity, unpreferable hydrophobic contaminants such as sealant, grease and combustion product such as carbon black, which are comprised in municipal soot, automotive exhaust gas and the like, are hard to adhere to the film and the like. Even if the hydrophobic contaminants adhere to the film and the like, it is easy to remove the hydrophobic contaminants by washing it or rain. As a method for providing hydrophilic property to a surface of the materials, etching method and plasma method have been proposed, and these methods can provide excellent hydrophilicity thereto. However, the effects thereof can not be maintained. Further, a surface hydrophilic coating film comprising hydrophilic polymer is also proposed (Dairy Chemical Industry News Paper, Jan. 30, 1995). However, when the coating film is provided on a substrate, an affinity of the coating film and the substrate is insufficient. Furthermore, a film wherein titanium oxide is used is known. For example, a layer comprising a photocatalyst is disclosed in PCT/JP96/00733. The layer is provided on a substrate, and the surface thereof has excellent hydrophilicity in accordance with an optical excitation due to photocatalyst. However, a hydrophilic film comprising the titanium oxide has insufficient film strength.

SUMMARY OF THE INVENTION

The present invention was devised to solve the conventional problems noted above. It is an object of the invention to provide a positive or negative planographic printing plate precursor that exhibits improved resistance to stains during printing and with which numerous prints having no stains can be obtained even in severe printing conditions, by disposing a hydrophilic layer that has high hydrophilicity and maintains that hydrophilicity well.

It is another object of the invention to provide a planographic printing plate precursor that can be scan-exposed on the basis of digital signals and processed into a printing plate by simple aqueous development after image formation or mounted directly into a printer and printed without conducting special development.

The present inventors have studied to achieve the objects described above and have found that the problems can be solved by forming a hydrophilic layer of a crosslinked organic/inorganic composite which comprises a specific hydrophilic polymer, and have completed a first aspect of the present invention.

The first aspect of the present invention is a planographic printing plate precursor comprising a substrate having disposed thereon a hydrophilic layer which includes hydrophilic graft chains and a crosslinked structure formed through hydrolytic polycondensation of an alkoxide of an element selected from Si, Ti, Zr and Al.

The inventors have also found that excellent effects were obtained by further providing at least one of specific image-forming layer on the hydrophilic layer of the first aspect of the present invention. Examples of the specific image-forming layer include an image layer containing a polymer compound including a functional group that changes from one of hydrophilic to hydrophobic and hydrophobic to hydrophilic in the presence of an acid, by application of heat, or by irradiation with radiation, and an image-forming layer including a hydrophobic precursor and a hydrophilic resin. The inventors have also found that excellent effects were obtained by further providing a compound that forms a hydrophobic surface region by application of heat or irradiation with radiation to the hydrophilic layer of the first aspect of the present invention. These specific image forming layer and compound may be preferably applied to and usable for following second and third aspects of the present invention.

In the planographic printing plate precursor of the present invention, the hydrophilic layer comprises hydrophilic graft chains and a crosslinked structure which is formed through hydrolytic polycondensation of an alkoxide. The alkoxide is an alkoxide of an element selected from the group consisting of Si, Ti, Zr and Al. The hydrophilic layer preferably contains a hydrophilic polymer compound represented by the following general formula (I):

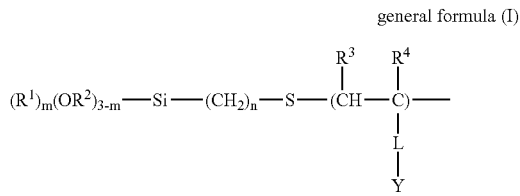

general formula (I)

wherein each of $R^1$, $R^2$, $R^3$ and $R^4$ independently represents a hydrogen atom or a hydrocarbon group having 1 to 8 carbon atoms; m is an integer of 0 to 2; n is an integer of 1 to 8; L represents a single bond or an organic linking group; Y represents —NHCOR$^5$, —CONH$_2$, —CON(R$^5$)$_2$, —COR$^5$, —OH, —CO$_2$M or —SO$_3$M; R$^5$ represents an alkyl group having 1 to 8 carbon atoms; and M represents one of a hydrogen atom, an alkali metal, an alkaline earth metal and an onium.

In the present invention, the hydrophilic layer is preferably formed by preparing a coating liquid composition including the hydrophilic polymer compound represented by general formula (I) and a crosslinking component represented by the following general formula (II), applying the coating liquid composition onto a surface of the substrate, the substrate comprising aluminum, and drying the coating liquid composition.

general formula (II)

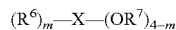
$(R^6)_m-X-(OR^7)_{4-m}$

In formula (II), each of $R^6$ and $R^7$ independently represents an alkyl group or an aryl group; X represents Si, Al, Ti or Zr; and m is an integer of 0 to 2.

Though it is not clear, the mechanism of the present invention may be as follows: The hydrophilic layer formed on the substrate has hydrophilic graft chains and has a crosslinked structure formed through hydrolytic polycondensation of an alkoxide comprising any of Si, Ti, Zr and Al. Hydrophilic functional groups in the graft chains exist in a state of free and unevenly on the surface of the layer. Further the layer comprises an organic/inorganic composite film having densificated crosslinking structure, formed through hydrolytic polycondensation of an alkoxide. Therefore, the hydrophilicity and the strength of the film are both excellent.

Concretely, when a hydrophilic coating liquid composition that contains a hydrophilic polymer compound represented by the formula (I) is prepared and applied onto a substrate to form a hydrophilic layer thereon, the silane coupling groups in the hydrophilic polymer compound interact with each other to form a crosslinked structure of $Si(OR)_4$, and the layer can provide high printing durability owing to the strong crosslinking structure formed therein. Further, since the position of the hydrophilic group comprised in the hydrophilic polymer compound is a termination (end) of a straight chain-like stem portion of the compound, mobility of the group is high. Therefore, in printing with the printing plate, dampening water can be rapidly supplied and drained from the layer. Further, the non-image area of the layer is effectively prevented from being stained since the layer has high hydrophilicity owing to the group. Accordingly, it is supposed that the printing plate can produce images of high quality due to above characteristics. In addition, when the crosslinking component of formula (II) is comprised in the hydrophilic coating liquid composition, a crosslinked structure having higher density can be formed in the hydrophilic layer owing to the interaction between the silane coupling groups and the crosslinking component. Therefore, it can be expected that the film strength of the layer is further improved to have higher printing durability.

Moreover, in the present invention, an image forming layer (recording layer) that contains a polymer compound having a functional group that changes its property from one of hydrophilic to hydrophobic and hydrophobic to hydrophilic, by application of heat, in the presence of an acid, or by irradiation with radiation (the functional group will be hereinafter referred to as a polarity-changing group) can be provided on the hydrophilic layer. Therefore, an image can be formed on the planographic printing plate precursor of this embodiment through short-time scanning exposure to laser light. In addition, the image area and the non-image area are formed in the hydrophilic layer by changing the polarity of the layer surface through the scanning exposure and the like. Therefore, the printing plate precursor of this embodiment enables in-printer development merely requiring simple treatment with water or not requiring any specific development at all, and the precursor can be directly set in a printer and processed into a printing plate.

The polarity-changing group in the polymer compound that can be comprised in the image forming layer includes two groups, a functional group that changes from hydrophobic to hydrophilic, and a functional group that changes from hydrophilic to hydrophobic. Depending on the type of the polarity-changing group in the polymer compound to be used therein, the planographic printing plate precursor can be formed into either positive or negative printing plate, when the plate precursor has the same layer constitution. This is another advantage of the precursor. In the planographic printing plate precursor of the present invention, a hydrophilic layer having a crosslinked structure of an organic/inorganic composite with a specific hydrophilic polymer, and an image forming layer (photosensitive or thermosensitive recording layer) may be formed in that order on a substrate.

In the present invention, a compound capable of forming a hydrophobic surface region may be added to the hydrophilic layer in order that the layer serves as an image forming layer. In the matrix comprising the hydrophilic polymer compound in this embodiment, the compound which can form a hydrophobic surface region is comprised. The compound such as thermo-fuseable hydrophobic particles fuses to each other in the region wherein heat is applied or radiation is irradiated to form a hydrophobic region, and an image can be formed on the hydrophilic layer through short-time scanning exposure to laser light light. The non-image region of the hydrophilic layer keeps high hydrophilicity since the film strength of the layer is high. Therefore, the printing plate precursor of this embodiment realizes in-printer development merely requiring simple treatment with water or not requiring any specific development at all, and it can be directly set in a printer and processed into a printing plate therein. The planographic printing plate precursor of the present invention can have, on a substrate, a hydrophilic layer having a crosslinked structure of an organic/inorganic composite with a specific hydrophilic polymer, and the hydrophilic layer contains a compound capable of forming a hydrophobic surface region such as thermo-fuseable hydrophobic particles. In the precursor of this embodiment, therefore, the hydrophilic layer serves as an image forming layer.

In the present invention, an image forming layer (recording layer) may be provided on the hydrophilic layer, and the image forming layer contains a hydrophobic precursor which is capable of forming a hydrophobic region, and a hydrophilic resin serving as a film-forming material. Optionally, a light to heat (photo-thermal) converting agent capable of converting the light of IR laser or the like into thermal energy may be added to the recording layer or to any other layer adjacent to the recording layer. Having the constitution, the planographic printing plate precursor of this embodiment enables image formation through short time scanning exposure to laser light or the like. Exposed to light in such a manner, the precursor has a hydrophobic layer formed only in the exposed region of the image forming layer, and the non-exposed region of the layer which essentially contains the hydrophilic resin remaining therein. In that condition, therefore, the non-exposed region of the image forming layer in the precursor can be readily removed by treating it with a small amount of water. Accordingly, the printing plate precursor of this embodiment realizes in-printer development merely requiring simple treatment with water or not requiring any specific development, and it can be directly set in a printer and processed into a printing plate therein. In the planographic printing plate precursor of the present invention, a hydrophilic layer having a crosslinked structure which is obtained from organic/inorganic composite and a specific hydrophilic polymer, and an image forming layer (photosensitive or heat sensitive recording layer) may be formed in that order on a substrate.

A second aspect of the present invention is a substrate for a planographic printing plate. The substrate comprises aluminum and includes a hydrophilic surface formed by a hydrophilic polymer including a functional group that chemically bonds to the aluminum substrate directly or is chemically bindable to the aluminum substrate via structural component having a crosslinking structure. The hydrophilic polymer preferably includes the functional group as a terminal group. The hydrophilic surface may comprise a crosslinked structure formed through hydrolytic polycondensation of an alkoxide of an element selected from Si, Ti, Zr and Al. It is also preferable that the hydrophilic surface comprises at least one of polymer compounds represented by the general formulae (III) and (V). The polymer compound represented by the general formula (III) is a polymer compound comprising the following units (i') to (iii'), and a silane coupling group represented by unit (iii') is a terminal end bounded to at least one of the units (i') and (ii').

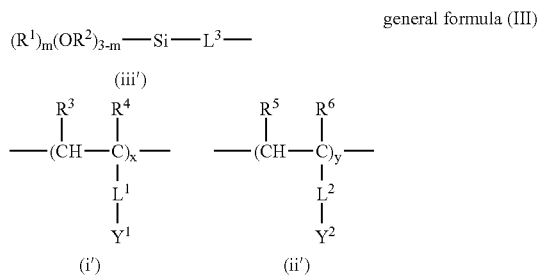

general formula (III)

In the general formula (III), each of $R^1$, $R^2$, $R^3$, $R^4$, $R^5$ and $R^6$ independently represents a hydrogen atom or a hydrocarbon group having 1 to 8 carbon atoms; m is an integer of 0 to 2; x and y are numbers showing a ratio of compositions when x+y=100, and a ratio of x to y=100:0 to 1:99; each of $L^1$, $L^2$ and $L^3$ represent a single bond or an organic linking group; each of $Y^1$ and $Y^2$ represents —$N(R^7)(R^8)$, —OH, —$NHCOR^7$—, —$CO_2M$—, or —$SO_3M$; each of $R^7$ and $R^8$ independently represents a hydrogen atom or an alkyl group having 1 to 8 carbon atoms; and M represents one of a hydrogen atom, an alkali metal, an alkaline earth metal and an onium.

The polymer compounds represented by the general formula (IV) comprises units (i'') and (ii''),

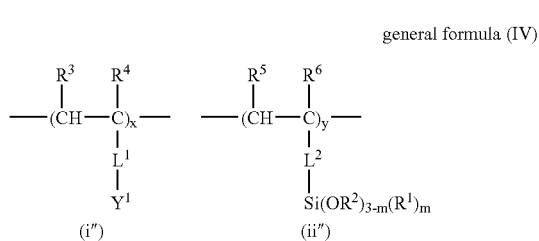

general formula (IV)

in the general formula (IV), each of $R^1$, $R^2$, $R^3$, $R^4$, $R^5$ and $R^6$ independently represents a hydrogen atom or a hydrocarbon group having 1 to 8 carbon atoms; m is an integer of 0 to 2; x and y are numbers showing a ratio of compositions when x+y=100, and a ratio of x to y=99:1 to 50:50; each of $L^1$ and $L^2$ represents a single bond or an organic linking group; $Y^1$ represents t least one of —$N(R^7)(R^8)$, —OH, —$NHCOR^7$—, —$CO_2M$—, or —$SO_3M$; each of $R^7$ and $R^8$ independently represents a hydrogen atom or an alkyl group having 1 to 8 carbon atoms; and M represents one of a hydrogen atom, an alkali metal, an alkaline earth metal and an onium. Preferably, the hydrophilic layer can be formed by preparing a coating liquid composition including the crosslinking component represented by the general formula (II) and at least one of polymer compounds represented by the general formulae (III) and (IV), applying the coating liquid composition onto a surface of the substrate, and drying the coating liquid composition. In this way, a hydrophilic surface having a firm crosslinked structure can be easily formed. The function of the second aspect of the present invention is not clear. However, it is supposed as follows. The polymer having a hydrophilic group has another reactive group that can be directly and chemically bonded to the surface of the aluminum substrate, or that can chemically bonded thereto through the constitutional component having a crosslinked structure. Therefore, the hydrophilic polymer is firmly bonded via the reactive group, which can cause a coupling reaction, to —$Al^{3+}$ or —OH on the surface of the aluminum substrate. On the other hand, the hydrophilic group does not participate in the bonding reaction to the substrate but is present in a relatively free state, and therefore, both the firm bond and the high hydrophilicity are simultaneously realized. In a preferable embodiment, the hydrophilic group is adsorbed on the substrate through the crosslinked structure having a graft structure and formed by hydrolysis and polycondensation of an alkoxide compound containing an element selected from Si, Ti, Zr and Al. Accordingly, hydrophilic functional groups introduced in the form of graft chains are unevenly distributed in a free state on the hydrophilic surface, and an organic-inorganic composite film having a high density crosslinked structure is formed through hydrolysis and polycondensation of the alkoxide, whereby a film having high hydrophilicity and high strength can be obtained.

Third aspect of the present invention is a surface-hydrophilic member comprising a substrate having disposed thereon a hydrophilic layer. The hydrophilic layer includes hydrophilic graft chains and a crosslinked structure formed through hydrolytic polycondensation of an alkoxide of an element selected from Si, Ti, Zr and Al. The hydrophilic layer of the third aspect of the present invention can be formed in a same manner of the first aspect of the present invention.

DESCRIPTION OF THE PREFERRED EMBODIMENTS

The planographic printing plate precursor, substrate for the same and surface hydrophilic material of the present invention are described in detail hereinafter. In the present invention, the description of "forms image forming" means that the image forming layer is formed on a substrate, and the description does not exclude the presence of any other layers, such as overcoat layer, undercoat layer, intermediate layer and back coat layer that may be optionally formed on or in the precursor in so far as those other layers do not detract the effect of the present invention.

First, hydrophilic polymer used for the substrate of the second aspect of the present invention is described below.

The specific hydrophilic polymer used herein is not particularly limited as far as it has hydrophilic functional group, and further has reactive groups on the terminal of the polymer chain or a side chain of the polymer chain wherein the reactive groups are capable of forming a chemical bond to the surface of the aluminum substrate directly or indirectly through the constitutional component having a crosslinked structure.

The specific hydrophilic polymer preferably has a crosslinking group such as an alkoxyl group, as the reactive group. The polymer may be bonded to the substrate such that the crosslinking group is directly bonded to the functional group such as $Al^{3+}$ or a hydroxyl group, which is present on the surface of the aluminum substrate. Alternatively, it is also possible that a crosslinked structure is formed through a hydrolysis and a polycondensation of the crosslinking group, and the polymer is bonded to the substrate via the crosslinked structure. The crosslinked structure may be formed such that a hydrophilic coating composition containing the specific hydrophilic polymer is prepared, coated on the surface of the aluminum substrate, and dried. In the invention, hereinafter, the crosslinked structure formed by the latter process may be referred to as a "sol-gel crosslinked structure".

Furthermore, the crosslinking group is preferably an alkoxide compound containing an element selected from Si, Ti, Zr and Al, and an alkoxide of Si is preferable from the standpoint of their reactivity and availability. That is, the crosslinking group may be formed from an alkoxide compound. Specifically, alkoxide compounds, which are used as a silane coupling agent, are preferably used.

Preferable embodiments of the hydrophilic surface of the substrate of the present invention will be described below. Respective structures and the forming methods for the hydrophilic surface are also described.

(Hydrophilic Polymer Having Reactive Group which Forms Chemical Bond to Surface of Aluminum Substrate Directly or Indirectly Via Constitutional Component Having Crosslinked Structure)

The hydrophilic polymer chain wherein the polymer has reactive groups capable of forming a chemical bond to the surface of the aluminum substrate directly or indirectly via the constitutional component having a crosslinked structure, and reactive groups are provided on terminal-end or a side chain of the hydrophilic polymer chain (i.e., the specific hydrophilic polymer) is not particularly limited as far as the polymer has at least hydrophilicity and has the specific reactive group in the molecule. Preferable embodiments thereof include polymer having at least one of the structures of the following general formulae (III) and (IV).

(Specific hydrophilic Polymer Represented by General Formula (III))

The specific hydrophilic polymer represented by the following general formula (III) (which will be sometimes referred to as a "specific hydrophilic polymer (III), hereinafter) is characterized by having a silane coupling group at an end.

general formula (III)

$(R^1)_m(OR^2)_{3-m}$—Si—$L^3$—

(iii')

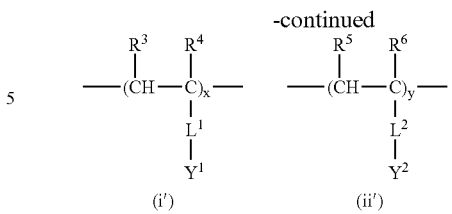

The polymer compound represented by the formula (III) has the silane coupling group represented by the structural unit (iii') on at least one of the both ends of the polymer, which are the polymer unit represented by the structural units (i') and (ii'). The polymer compound may have the functional group represented by the structural unit (iii') on another end position of the polymer, and may have a hydrogen atom or a functional group having a capability to initiate polymerization.

In the general formula (III), m represents 0, 1 or 2, $R^1$, $R^2$, $R^3$, $R^4$, $R^5$ and $R^6$ each independently represents a hydrogen atom or a hydrocarbon group having 8 or less carbon atoms. Examples of the hydrocarbon group include an alkyl group and aryl group, and a linear, branched or cyclic alkyl group having 8 or less carbon atoms is preferable. Specific examples thereof include a methyl group, an ethyl group, a propyl group, a butyl group, a pentyl group, a hexyl group, a heptyl group, an octyl group, an isopropyl group, an isobutyl group, a s-butyl group, a t-butyl group, an isopentyl group, a neopentyl group, a 1-methylbutyl group, an isohexyl group, a 2-ethylhexyl group, a 2-methylhexyl group and a cyclopentyl group.

Each of $R^1$ to $R^6$ is preferably a hydrogen atom, a methyl group or an ethyl group from the standpoint of effect and availability.

The hydrocarbon group may be substituted.

In case where the alkyl group is substituted, the substituted alkyl group is composed of a substituent and an alkylene group, and the substituent may be a monovalent non-metallic atomic group except hydrogen. Preferable examples of the substituent include a halogen atom (—F, —Br, —Cl, —I), a hydroxyl group, an alkoxy group, an aryloxy group, a mercapto group, an alkylthio group, an arylthio group, an alkyldithio group, an aryldithio group, an amino group, an N-alkylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, an ureido group, an N-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—SO$_3$H) and its conjugated base group (hereinafter referred to as a sulfonato group), an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, a phosphono group (—PO$_3$H$_2$) and its conjugated base group (hereinafter referred to as a phosphonato group), a dialkylphosphono group (—PO$_3$(alkyl)$_2$), a diarylphosphono group (—PO$_3$(aryl)$_2$), an alkylarylphosphono group (—PO$_3$(alkyl)(aryl)), a monoalkylphosphono group (—PO$_3$H(alkyl)) and its conjugated base group (hereinafter referred to as an alkylphosphonato group), a monoarylphosphono group (—PO$_3$H(aryl)) and its conjugated base group (hereinafter referred to as an arylphosphonato group), a phosphonoxy group (—OPO$_3$H$_2$) and its conjugated base group (hereinafter referred to as a phosphonatoxy group), a dialkylphosphonoxy group (—OPO$_3$(alkyl)$_2$), a diarylphosphonoxy group (—OPO$_3$(aryl)$_2$), an alkylarylphosphonoxy group (—OPO$_3$(alkyl) (aryl)), a monoalkylphosphonoxy group (—OPO$_3$H(alkyl)) and its conjugated base group (hereinafter referred to as an alkylphosphonatoxy group), a monoarylphosphonoxy group (—OPO$_3$H(aryl)) and its conjugated base group (hereinafter referred to as an arylphosphonatoxy group), a morpholino group, a cyano group, a nitro group, an aryl group, an alkenyl group, and an alkynyl group.

As examples of the alkyl group comprised in the substituent, those alkyl groups mentioned above are included. Examples of the aryl group comprise phenyl, biphenyl, naphthyl, tolyl, xylyl, mesityl, cumenyl, chlorophenyl, bromophenyl, chloromethylphenyl, hydroxyphenyl, methoxyphenyl, ethoxyphenyl, phenoxyphenyl, acetoxyphenyl, benzoyloxyphenyl, methylthiophenyl, phenylthiophenyl, methylaminophenyl, dimethylaminophenyl, acetylaminophenyl, carboxyphenyl, methoxycarbonylphenyl, ethoxycarbonylphenyl, phenoxycarbonylphenyl, N-phenylcarbamoylphenyl, phenyl, cyanophenyl, sulfophenyl, sulfonatophenyl, phosphonophenyl and phosphonatophenyl groups. Examples of the alkenyl group include vinyl, 1-propenyl, 1-butenyl, cinnamyl and 2-chloro-1-ethenyl groups. Examples of the alkynyl group include ethynyl, 1-propynyl, 1-butynyl and trimethylsilylethynyl groups. Examples of G$^1$ in the acyl group (G$^1$CO—) includes a hydrogen atom, an alkyl group and an aryl group such as those mentioned above.

Of those substituents, more preferable examples include a halogen atom (—F, —Br, —Cl, —I), an alkoxy group, an aryloxy group, an alkylthio group, an arylthio group, an N-alkylamino group, an N,N-dialkylamino group, an acyloxy group, an N-alkylcarbamoyloxy group, an N-arylcarbamoyloxy group, an acylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N-alkyl-N-arylcarbamoyl group, a sulfo group, a sulfonato group, a sulfamoyl group, an N-alkylsulfamoyl group, an N,N-dialkylsulfamoyl group, an N-arylsulfamoyl group, an N-alkyl-N-arylsulfamoyl group, a phosphono group, a phosphonato group, a dialkylphosphono group, a diarylphosphono group, a monoalkylphosphono group, an alkylphosphonato group, a monoarylphosphono group, an arylphosphonato group, a phosphonoxy group, a phosphonatoxy group, an aryl group, and an alkenyl group.

The alkylene group contained in the substituted alkyl group may be a divalent organic residue derived from the above-mentioned alkyl group having 1 to 20 carbon atoms by removing any one hydrogen atom from it. Preferably, it is a linear alkylene group having from 1 to 12 carbon atoms, or a branched alkylene group having from 3 to 12 carbon atoms, or a cyclic alkylene group having from 5 to 10 carbon atoms. Combining the substituent with the alkylene group gives a substituted alkyl group. Preferable examples of the substituted alkyl group include chloromethyl, bromomethyl, 2-chloroethyl, trifluoromethyl, methoxymethyl, methoxyethoxyethyl, allyloxymethyl, phenoxymethyl, methylthiomethyl, tolylthiomethyl, ethylaminoethyl, diethylaminopropyl, morpholinopropyl, acetyloxymethyl, benzoyloxymethyl, N-cyclohexylcarbamoyloxyethyl, N-phenylcarbamoyloxyethyl, acetylaminoethyl, N-methylbenzoylaminopropyl, 2-hydroxyethyl, 2-hydroxypropyl, carboxypropyl, methoxycarbonylethyl, allyloxycarbonylbutyl, chlorophenoxycarbonylmethyl, carbamoylmethyl, N-methylcarbamoylethyl, N,N-dipropylcarbamoylmethyl, N-(methoxyphenyl)carbamoylethyl, N-methyl-N-(sulfonyl)carbamoylmethyl, sulfobutyl, sulfonatobutyl, sulfamoylbutyl, N-ethylsulfamoylmethyl, N,N-dipropylsulfamoylpropyl, N-tolylsulfamoylpropyl, N-methyl-N-(phosphonophenyl)sulfamoyloctyl, phosphonobutyl, phosphonatohexyl, diethylphosphonobutyl, diphenylphosphonopropyl, methylphosphonobutyl, methylphosphonatobutyl, tolylphosphonohexyl, tolylphosphonatohexyl, phosphonoxypropyl, phosphonatoxybutyl, benzyl, phenethyl, α-methylbenzyl, 1-methyl-1-phenylethyl, p-methylbenzyl, cinnamyl, allyl, 1-propenylmethyl, 2-butenyl, 2-methylallyl, 2-methylpropenylmethyl, 2-propynyl, 2-butynyl, and 3-butynyl groups.

Each of L$^1$ and L$^2$ represents a single bond or an organic linking group. The organic linking group herein means a polyvalent linking group formed with non-metallic atoms. Concretely, it is composed of from 1 to 60 carbon atoms, from 0 to 10 nitrogen atoms, from 0 to 50 oxygen atoms, from 1 to 100 hydrogen atoms and from 0 to 20 sulfur atoms. More specific examples of the linking group include the following structural units and those constituted with a combination thereof.

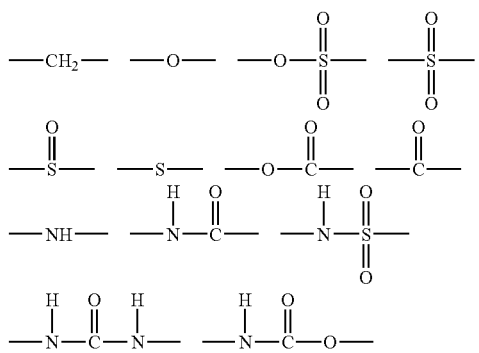

-continued

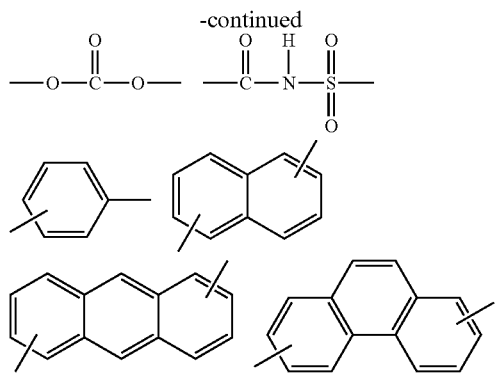

L³ represents a single bond or an organic linking group. The organic linking group herein means a polyvalent linking group of non-metallic atoms, and specific examples thereof include those similar to $L^1$ and $L^2$. Among these, —$(CH_2)_n$—S— (wherein n is an integer of from 1 to 8) is a particularly preferable.

Y represents —$NHCOR^5$, —$CONH_2$, —$CON(R^5)_2$, —$COR^5$, —OH, —$CO_2M$ or —$SO_3M$; and $R^5$ represents a linear, branched or cyclic alkyl group having from 1 to 8 carbon atoms. $R^5$'s such as those included in —$CON(R^5)_2$ may bond to each other to form a ring, and the ring thus formed may be a hetero ring containing hetero atom(s) of, for example, oxygen, sulfur and nitrogen atoms. $R^5$ may be substituted. As examples of the substituent for it, those mentioned above as the substituent for the alkyl group for $R^1$, $R^2$, $R^3$ and $R^4$ are usable and referred to.

Concretely, preferable examples of $R^5$ include methyl, ethyl, propyl, butyl, pentyl, hexyl, heptyl, octyl, isopropyl, isobutyl, s-butyl, t-butyl, isopentyl, neopentyl, 1-methylbutyl, isohexyl, 2-ethylhexyl, 2-methylhexyl and cyclopentyl groups.

Examples of M include a hydrogen atom, an alkali metal such as lithium, sodium or potassium, an alkaline earth metal such as calcium or barium, or an onium such as ammonium, iodonium and sulfonium.

Concretely, preferable examples of Y include —$NHCOCH_3$, —$CONH_2$, —COOH, —$SO_3^-NMe_4^+$, and a morpholino group.

Further, x and y represent a compositional ratio where x+y=100, and x/y is in a range of from 100/0 to 1/99 and more preferably from 100/0 to 5/95.

The molecular weight of the specific hydrophilic polymer (III) is preferably from 1,000 to 100,000, more preferably from 1,000 to 50,000, and most preferably from 1,000 to 30,000.

Examples of the specific hydrophilic polymer (III) (Compound 1-1 to Compound 1-23) preferable for use in the present invention are mentioned below, to which, however, the present invention is not limited.

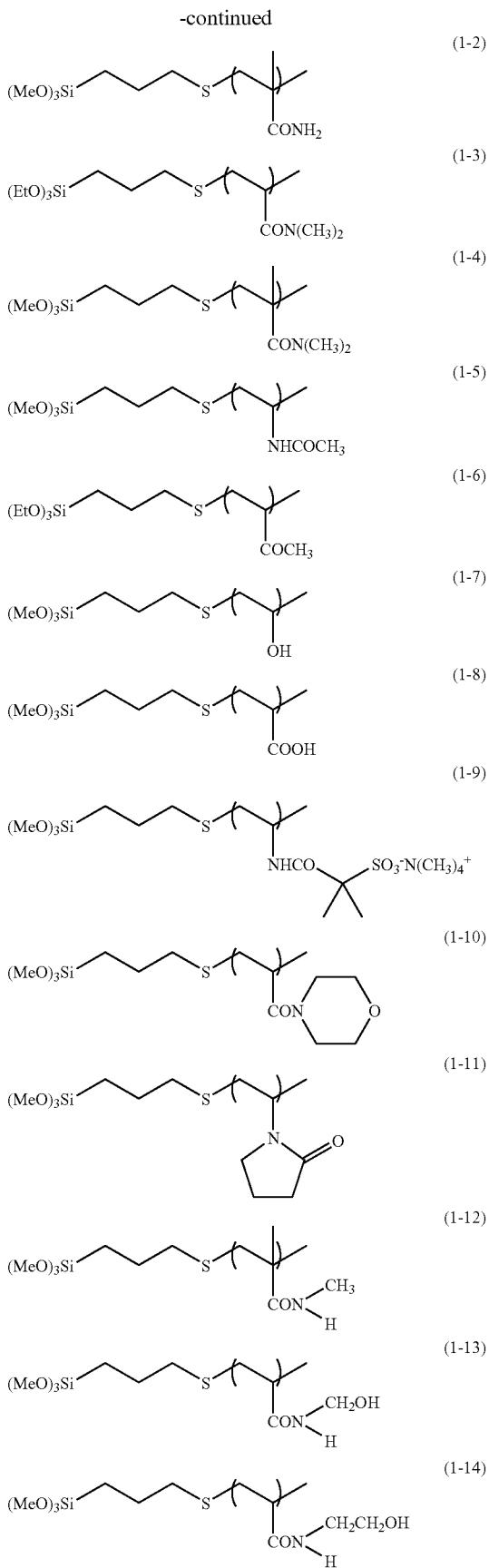

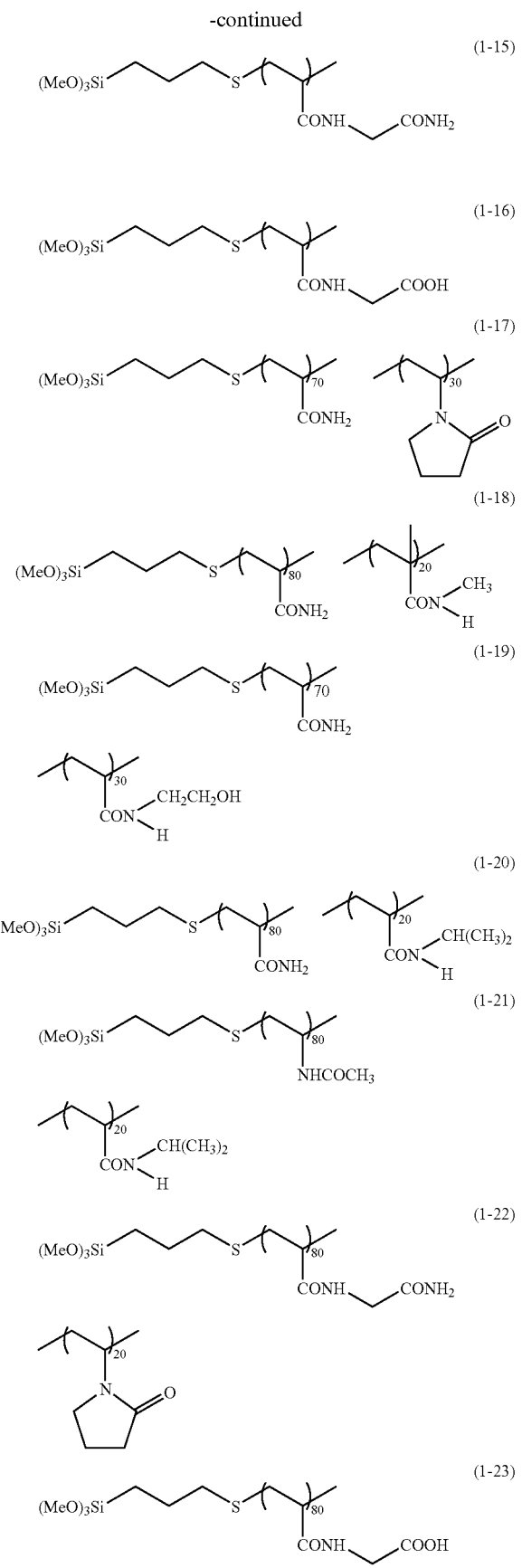

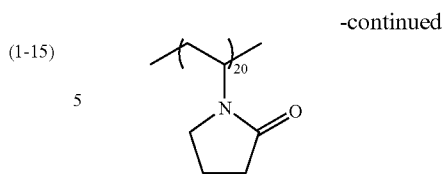

(Synthesis Method)

The specific hydrophilic polymer (III) in the present invention can be synthesized by radical polymerization of a radically polymerizable monomer represented by the following structural units (i') and (ii'), and the following structural unit (iii') which is a silane coupling agent having a chain transfer function for the radical polymerization. Owing to the chain transfer function of the silane coupling agent, a polymer having a silane coupling group which is introduced on the end of the polymer main chain can be synthesized through the radical polymerization.

The reaction mode thereof is not particularly limited. For example, a bulk reaction, a solution reaction or a suspension reaction may be carried out in the presence of a radical polymerization initiator or under irradiation with a high-pressure mercury lamp.

When the polymerization reaction is carried out, in order to control the introduced amount of the structural unit represented by (iii') and to suppress polymerization of unit (iii') with the structural unit (i') or (ii') in an effective manner, it is preferable that a polymerization method such as a divided addition method, a sequential addition method of the unsaturated compound is carried out.

The reaction ratio of the structural units (i') and (ii') with respect to the structural unit (iii') is not particularly limited. However, it is preferable that the amount of the structural units (i') and (ii') is in a range of from 0.5 to 50 mole per 1 mole of the structural unit (iii'), from the standpoint of a suppression of side reactions and an improvement in yield of the hydrolyzable silane compound. It is more preferably in a range of from 1 to 45 mole, and most preferably in a range of from 5 to 40 mole.

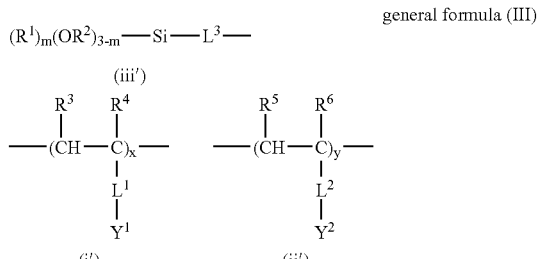

general formula (III)

In the structural units (i'), (ii') and (iii'), $R^1$ to $R^6$, $L^1$ to $L^3$, $Y^1$, $Y^2$ and m have the same meanings as in the general formula (III). These compounds are commercially available and can be easily synthesized.

For forming the specific hydrophilic polymer (III), general radical polymerization methods are usable. Concretely, those described in Shin Kobunshi Jikken-gaku 3 (New Polymer Experimentation 3), Kobunshi no Gousei to Hannou 1 (Synthesis and Reaction of Polymers 1), (edited by Polymer Society Japan, Kyoritsu Shuppan Co., Ltd.), Shin Jikken Kagaku Kouza 19 (Lectures on New Experimental Chemistry 19), Kobunshi Kagaku (I) (Polymer Chemistry (I)), (edited by The Chemical Society of Japan, Maruzen) and Busshitu Kougaku Kouza (Lectures on Substance Engineering), Kobunshi Gousei Kagaku (Synthetic Polymer Chemistry), (Publishing Division of Tokyo Denki University), which can be applied thereto.

The specific hydrophilic polymer (III) may be a copolymer with other monomers described later. Examples of the other monomers include known monomers, such as acrylate esters, methacrylate esters, acrylamides, methacrylamides, vinyl esters, styrenes, acrylic acid, methacrylic acid, acrylonitrile, maleic anhydride and maleimide. Various properties, such as film forming property, film strength, hydrophilicity, hydrophobicity, solubility, reactivity and stability, can be improved by copolymerizing the monomers selected.

Specific examples of the acrylate esters include methyl acrylate, ethyl acrylate, (n- or i-) propyl acrylate, (n-, i-, sec- or t-) butyl acrylate, amyl acrylate, 2-ethylhexyl acrylate, dodecyl acrylate, chloroethyl acrylate, 2-hydroxyethyl acrylate, 2-hydroxypropyl acrylate, 2-hydroxypentyl acrylate, cyclohexyl acrylate, allyl acrylate, trimethylolpropane monoacrylate, pentaerythritol monoacrylate, benzyl acrylate, methoxybenzyl acrylate, chlorobenzyl acrylate, hydroxybenzyl acrylate, hydroxyphenethyl acrylate, dihydroxyphenethyl acrylate, furfuryl acrylate, tetrahydrofurfuryl acrylate, phenyl acrylate, hydroxyphenyl acrylate, chlorophenyl acrylate, sulfamoylphenyl acrylate and 2-(hydroxyphenylcarbonyloxy)ethyl acrylate.

Specific examples of the methacrylate esters include methyl methacrylate, ethyl methacrylate, (n- or i-) propyl methacrylate, (n-, i-, sec- or t-) butyl methacrylate, amyl methacrylate, 2-ethylhexyl methacrylate, dodecyl methacrylate, chloroethyl methacrylate, 2-hydroxyethyl methacrylate, 2-hydroxypropyl methacrylate, 2-hydroxypentyl methacrylate, cyclohexyl methacrylate, allyl methacrylate, trimethylolpropane monomethacrylate, pentaerythritol monomethacrylate, benzyl methacrylate, methoxybenzyl methacrylate, chlorobenzyl methacrylate, hydroxybenzyl methacrylate, hydroxyphenethyl methacrylate, dihydroxyphenethyl methacrylate, furfuryl methacrylate, tetrahydrofurfuryl methacrylate, phenyl methacrylate, hydroxyphenyl methacrylate, chlorophenyl methacrylate, sulfamoylphenyl methacrylate and 2-(hydroxyphenylcarbonyloxy)ethyl methacrylate.

Specific examples of the acrylamides include acrylamide, N-methylacrylamide, N-ethylacrylamide, N-propylacrylamide, N-butylacrylamide, N-benzylacrylamide, N-hydroxyethylacrylamide, N-phenylacrylamide, N-tolylacrylamide, N-(hydroxyphenyl)acrylamide, N-(sulfamoylphenyl)acrylamide, N-(phenylsulfonyl)acrylamide, N-(tolylsulfonyl)acrylamide, N,N-dimethylacrylamide, N-methyl-N-phenylacrylamide and N-hydroxyethyl-N-methylacrylamide.

Specific examples of the methacrylamides include methacrylamide, N-methylmethacrylamide, N-ethylmethacrylamide, N-propylmethacrylamide, N-butylmethacrylamide, N-benzylmethacrylamide, N-hydroxyethylmethacrylamide, N-phenylmethacrylamide, N-tolylmethacrylamide, N-(hydroxyphenyl)methacrylamide, N-(sulfamoylphenyl)methacrylamide, N-(phenylsulfonyl)methacrylamide, N-(tolylsulfonyl)methacrylamide, N,N-dimethylmethacrylamide, N-methyl-N-phenylmethacrylamide and N-hydroxyethyl-N-methylmethacrylamide.

Specific examples of the vinyl esters include vinyl acetate, vinyl butyrate and vinyl benzoate.

Specific examples of the styrenes include styrene, methylstyrene, dimethylstyrene, trimethylstyrene, ethylstyrene, propylstyrene, cyclohexylstyrene, chloromethylstyrene, trifluoromethylstyrene, ethoxymethylstyrene, acetoxymethylstyrene, methoxystyrene, dimethoxystyrene, chlorostyrene, dichlorostyrene, bromostyrene, iodostyrene, fluorostyrene and carboxystyrene.

An amount of the other monomers used for synthesizing the copolymer is an amount that is sufficient to improve the various properties. However, when the amount thereof is too large, the function as a support for a planographic printing plate becomes insufficient. Therefore, the preferable total ratio of the other monomers in the specific hydrophilic polymer (III) is preferably 80% by weight or less, and more preferably 50% by weight or less.

(Specific Hydrophilic Polymer Represented by General Formula (IV))

The specific hydrophilic polymer represented by the following general formula (IV) (which may be referred to as a "specific hydrophilic polymer (IV), hereinafter) is characterized by having a silane coupling group on a side chain.

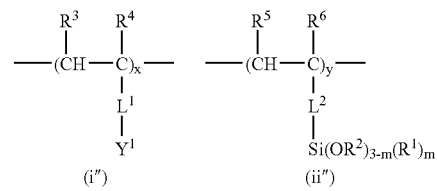

general formula IV

In the general formula (IV), m, $R^1$ to $R^6$, $L^1$, $L^2$ and $Y^1$ have the same meanings as in the general formula (III).

x and y represent a compositional ratio wherein x+y=100, and x/y is in a range of from 99:1 to 50:50, preferably from 99:1 to 60:40, and more preferably from 98:2 to 70:30.

The molecular weight of the specific hydrophilic polymer (IV) is preferably from 1,000 to 100,000, and more preferably from 1,000 to 50,000.

Specific examples (2-1) to (2-7) of the specific hydrophilic polymer (IV) that can be preferably used in the invention will be described below, but the invention is not limited to them.

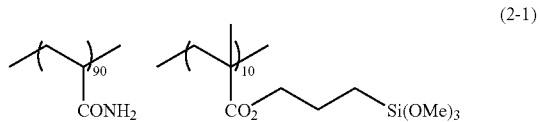

(2-1)

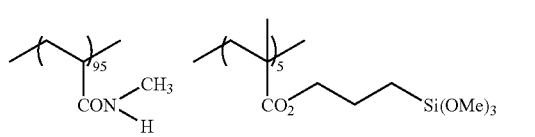

(2-2)

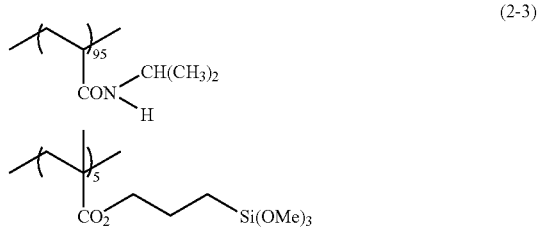

(2-3)

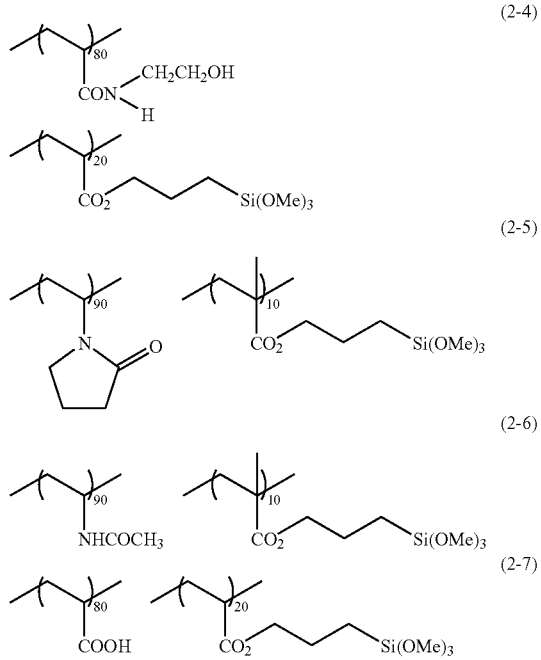

(Synthesis Method)

As a radical polymerization method for synthesizing the specific hydrophilic polymer (IV), all the known methods may be used. Specifically, the general radical polymerization methods described, for example, in Shin Kobunshi Jikkengaku 3 (New Polymer Experimentation 3), Kobunshi no Gousei to Hannou 1 (Synthesis and Reaction of Polymers 1), (edited by Polymer Society Japan, Kyoritsu Shuppan Co., Ltd.), Shin Jikken Kagaku Kouza 19 (Lectures on New Experimental Chemistry 19), Kobunshi Kagaku (I) (Polymer Chemistry (I)), (edited by The Chemical Society of Japan, Maruzen) and Busshitu Kougaku Kouza (Lectures on Substance Engineering), Kobunshi Gousei Kagaku (Synthetic Polymer Chemistry), (Publishing Division of Tokyo Denki University) can be applied thereto.

The specific hydrophilic polymer (IV) may be a copolymer obtained by using other monomers in addition to the units, and as the other monomers, monomers those mentioned in the specific hydrophilic polymer (III) may be used.

(Crosslinking Component Represented by General Formula (II))

The hydrophilic surface of the second aspect of the present invention may be formed in such a manner that the crosslinking group in the specific hydrophilic polymer is directly bonded to the functional group on the surface of the aluminum substrate, or in alternative, a hydrophilic coating composition containing the specific hydrophilic polymer is prepared and coated on the surface of the aluminum substrate, followed by drying, so as to form a crosslinked structure (sol-gel crosslinked structure) through hydrolysis and polycondensation of the crosslinking group.

For forming the sol-gel crosslinked structure, it is preferred that the specific hydrophilic polymer and the crosslinking component represented by the aforementioned general formula (II) are mixed and coated on the surface of the substrate, followed by drying. The crosslinking component represented by the general formula (II) is a compound having a polymerizable functional group in the structure thereof and exhibiting the function as a crosslinking agent, and it forms a firm film having a crosslinked structure through polycondensation with the specific hydrophilic polymer. Details of the crosslinking components represented by the general formula (II) are described herein after.

(A) Hydrophilic Layer:

In the first and third aspect of the present invention, the hydrophilic layer thereof has hydrophilic graft chains and has a crosslinked structure formed through hydrolytic polycondensation of an alkoxide with any of Si, Ti, Zr and Al. The crosslinked hydrophilic layer may be formed from an alkoxide mentioned above and a compound having a hydrophilic functional group capable of forming hydrophilic graft chains, in any desired manner. In view of reactivity and easy availability thereof, a Si alkoxide is preferab. Concretely, compounds known for silane coupling agents are favorable as the alkoxide of Si.

The crosslinked structure formed through hydrolytic polycondensation of the alkoxide may be hereinafter referred to as a sol-gel crosslinked structure.

Preferably, the hydrophilic layer that comprises the free hydrophilic graft chains and the sol-gel crosslinked structure contains a hydrophilic polymer described in detail hereinafter.

The constituent components of preferable embodiments of the hydrophilic layer in the present invention, and the method of forming the hydrophilic layer are described in detail below.

1. Polymer Compound of Formula (I):

The polymer compound represented by the formula (I) is a hydrophilic polymer terminated with a silane coupling group, namely, the polymer compound has a silane coupling group as an end group, and this compound will be referred to as a specific hydrophilic polymer.

general formula (I)

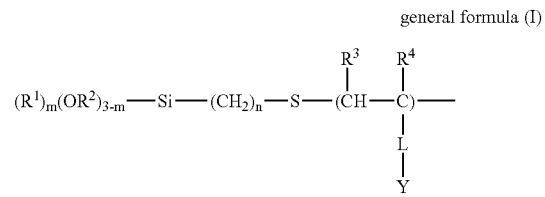

In formula (I), $R^1$, $R^2$, $R^3$ and $R^4$ each independently represent a hydrogen atom or a hydrocarbon group having at most 8 carbon atoms. The hydrocarbon group includes, for example, an alkyl group and an aryl group, and is preferably a linear, branched or cyclic alkyl group having at most 8 carbon atoms. Concretely, examples thereof include methyl, ethyl, propyl, butyl, pentyl, hexyl, heptyl, octyl, isopropyl, isobutyl, s-butyl, t-butyl, isopentyl, neopentyl, 1-methylbutyl, isohexyl, 2-ethylhexyl, 2-methylhexyl and cyclopentyl groups.

In view of the effect and the easy availability of the compound, $R^1$, $R^2$, $R^3$ and $R^4$ are preferably a hydrogen atom, or a methyl or ethyl group. The alkyl group (hydrocarbon group) may be substituted, and examples and the like of the substituent and alkylene group are the same of those of the hydrocarbon having 1 to 8 carbon atoms of the polymer compound represented by the general formula (III).

In the general formula (I), L represents a single bond or an organic linking group. When L represents an organic linking group, it is a polyvalent linking group of non-metallic atoms. Concretely, it is composed of from 1 to 60 carbon atoms, from 0 to 10 nitrogen atoms, from 0 to 50 oxygen atoms, from 1 to 100 hydrogen atoms, and from 0 to 20 sulfur atoms. Concrete examples of the linking group include the structural units and a combination thereof mentioned above as examples of structural unit for $L^1$ and $L^2$ of the general formula (III).

Examples of the specific hydrophilic polymer (Compound 3-1 to Compound 3-12) preferable for use in the present invention are mentioned below, to which, however, the present invention is not limited.

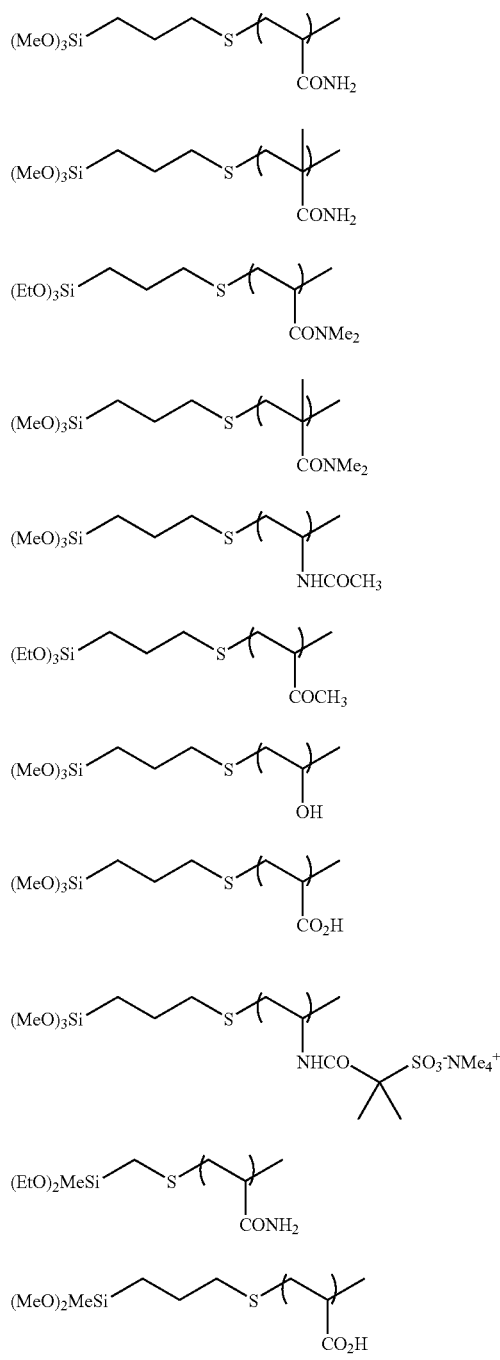

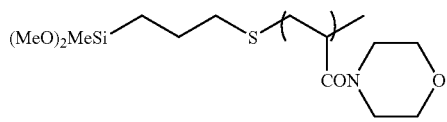

The specific hydrophilic polymer for use in the first and third aspect of the present invention can be produced through radical polymerization of a radical-polymerizable monomer of the following general formula (i) with a silane coupling agent of the following general formula (ii) which acts as a chain-transfer agent in radical polymerization. Since the silane coupling agent (ii) has the ability to act as a chain-transfer agent, the radical polymerization gives a polymer terminated with a silane-coupling agent introduced thereinto.

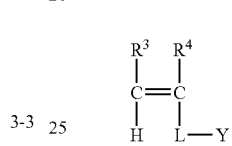

$$(R^1)_m(OR^2)_{3-m}\text{—Si—}(CH_2)_n\text{—S—H} \quad \quad (ii)$$

In formulae (i) and (ii), $R^1$ to $R^4$, L, Y, n and m have the same meanings as those in formula (I). These compounds are on the market, and can be easily produced.

The radical polymerization to produce the hydrophilic polymer of formula (I) may be effected in any known manner. Concretely, general methods of radical polymerization are described in, for example, New Polymer Experimentation 3, Polymer Synthesis and Reaction 1 (edited by the Polymer Society of Japan, published by Kyoritsu Publishing); New Experimental Chemistry Course 19, Polymer Chemistry (I) (edited by the Chemical Society of Japan, published by Maruzen); Material Engineering Course, Polymer Synthesis Chemistry (published by the Tokyo Electric Courage Publishing), and any of these are employable herein.

2. Crosslinking Component of Formula (II):

The crosslinking component represented by the formula (II) is a compound having a polymerizing functional group in its structure and acts as a crosslinking agent. By polycondensing with the specific hydrophilic polymer mentioned above, the compound forms a tough film having a crosslinked structure.

In formula (II), $R^6$ represents a hydrogen atom, an alkyl group or an aryl group; $R^7$ represents an alkyl group or an aryl group; X represents Si, Al, Ti or Zr; and m indicates an integer of from 0 to 2.

The alkyl group for $R^6$ and $R^7$ preferably has from 1 to 4 carbon atoms. The alkyl group and the aryl group for these may be substituted. The substituent for the groups includes, for example, a halogen atom, an amino group and a mercapto group.

The compound is a low-molecular compound, and preferably has a molecular weight of at most 1000.

Examples of the crosslinking component of formula (II) are mentioned below, to which, however, the present invention is not limited.

Examples of the compound in which X is Si, namely silicon-containing hydrolyzable compounds, include trimethoxysilane, triethoxysilane, tripropoxysilane, tetramethoxysilane, tetraethoxysilane, tetrapropoxysilane, methyltrimethoxysilane, ethyltriethoxysilane, propyltrimethoxysilane, methyltriethoxysilane, ethyltriethoxysilane, propyltriethoxysilane, dimethyldimethoxysilane, diethyldiethoxysilane, γ-chloropropyltriethoxysilane, γ-mercaptopropyltrimethoxysilane, γ-mercaptopropyltriethoxysilane, γ-aminopropyltriethoxysilane, phenyltrimethoxysilane, phenyltriethoxysilane, phenyltripropoxysilane, diphenyldimethoxysilane, and diphenyldiethoxysilane.

Of those, especially preferable examples thereof include tetramethoxysilane, tetraethoxysilane, methyltrimethoxysilane, ethyltrimethoxysilane, methyltriethoxysilane, ethyltriethoxysilane, dimethyldiethoxysilane, phenyltrimethoxysilane, phenyltriethoxysilane, diphenyldimethoxysilane, and diphenyldiethoxysilane.

Examples of the compound in which X is Al, aluminium-containing hydrolyzable compounds, include trimethoxyaluminate, triethoxyaluminate, tripropoxyaluminate, and tetraethoxyaluminate.

Examples of the compound in which X is Ti, namely titanium-containing compounds, include trimethoxytitanate, tetramethoxytitanate, triethoxytitanate, tetraethoxytitanate, tetrapropoxytitanate, chlorotrimethoxytitanate, chlorotriethoxytitanate, ethyltrimethoxytitanate, methyltriethoxytitanate, ethyltriethoxytitanate, diethyldiethoxytitanate, phenyltrimethoxytitanate, and phenyltriethoxytitanate.

Examples of the compound in which X is Zr, namely zirconium-containing compounds, are zirconates corresponding to the titanium-containing compounds but containing zirconium in place of titanium.

3. Formation of Hydrophilic Layer:

In the present invention, the hydrophilic layer may be formed by preparing a hydrophilic coating liquid composition that contains a specific hydrophilic polymer, applying the liquid onto a suitable substrate, and drying it. In the hydrophilic coating liquid composition, the content of the specific hydrophilic polymer is preferably not smaller than 10% by weight but smaller than 50% by weight based on the total solid content of the layer. If the polymer content is 50% by weight or more, the strength of the film formed will lower; but if smaller than 10% by weight, the film properties will be not good and the film will be readily cracked. Therefore, these contents are unfavorable.

In one preferable embodiment of the present invention, the crosslinking component is added to the hydrophilic coating liquid composition. In this case, the amount of the crosslinking component to be added is preferably 5 mol % or more, more preferably 10 mol % or more with respect to the silane-coupling group in the specific hydrophilic polymer. The uppermost limit of the amount of the crosslinking component is not specifically defined so far as it ensures good crosslinking of the component with the hydrophilic polymer. However, if the amount of the crosslinking component added is too large, it will be problematic in that the excess crosslinking component not having acted in crosslinking will make the surface of the formed hydrophilic layer sticky.

The specific hydrophilic polymer terminated with silane coupling group is dissolved in a solvent, preferably along with the crosslinking component, and well stirred, and these are hydrolyzed and polycondensed to prepare an organic/inorganic composite sol. This is the hydrophilic coating liquid for use in the present invention, and this forms a surface hydrophilic layer of high hydrophilicity and high film strength. To promote the hydrolysis and polycondensation in preparing the organic/inorganic composite sol, an acid catalyst or a basic catalyst is preferably used. For increasing the reaction efficiency in practice, the catalyst is indispensable.

As the catalyst, an acid or a basic compound itself or those dissolved in a solvent of water or alcohol may be used. These acid and basic compounds will be hereinafter referred to as an acid catalyst and a basic catalyst, respectively. The catalyst concentration in the solvent is not specifically defined, and may be suitably determined depending on the properties of the acid or the basic compound used and on the desired content of the catalyst in the reaction system. The catalyst solution of higher concentration can promote the hydrolysis and the polycondensation of the system. However, if the basic catalyst of high concentration is used, a precipitate is formed in the sol. Therefore, the concentration of the basic catalyst is preferably at most 1 N in terms of the concentration of the catalyst in the aqueous solution.

The acid catalyst and the basic catalyst for use herein are not specifically limited in point of their type. However, if the catalyst is used in high concentration, compound wherein elements that will remain little in the dried film are comprised is preferable as the catalyst.

Concretely, examples of the acid catalyst includes hydrogen halides such as hydrochloric acid; nitric acid, sulfuric acid, sulfurous acid, hydrogen sulfide, perchloric acid, hydrogen peroxide, carbonic acid; carboxylic acids such as formic acid and acetic acid; substituted carboxylic acids of formula RCOOH in which R is substituted with any other element or substituent; and sulfonic acids such as benzenesulfonic acid. Examples of the basic catalyst include ammonia bases such as aqueous ammonia, and amines such as ethylamine and aniline.

To prepare the hydrophilic coating liquid, the silane coupling group-terminated hydrophilic polymer is dissolved in a solvent such as ethanol, preferably along with the crosslinking component, and optionally the catalyst described above is added thereto, and the mixture is stirred. Preferably, the reaction temperature is between room temperature and 80° C., and the reaction time for which the mixture is stirred is between 1 and 72 hours. Stirring the mixture promotes the hydrolysis and polycondensation of the two components to give the intended organic/inorganic composite sol.

The solvent usable for preparing the hydrophilic coating liquid composition that contains the hydrophilic polymer, preferably along with the crosslinking component, is not specifically limited in so far as the solvent can uniformly dissolve and disperse the components. For example, the solvent is preferably an aqueous solvent such as methanol, ethanol and water.

As mentioned above, the organic/inorganic composite sol, which is sol of composite comprising organic and inorganic compounds, (hydrophilic coating liquid composition) to form the hydrophilic surface in the present invention can be prepared in a sol-gel method. The sol-gel method is described in detail, for example, in Sumio Sakuhana's Science for Sol-Gel Process (published by Agune Shofusha, 1988); and Ken Hirashima's Technology for Functional Thin film Formation by Latest Sol-Gel Process (published by General Technology Center, 1992). The methods described in these can be employed in preparing the hydrophilic coating liquid composition for use in the present invention.

The hydrophilic coating liquid composition used in the present invention may contain, if desired, various additives in so far as it does not interfere the effect of the present invention. For example, a surfactant may be added thereto for improving the uniformity of the coating liquid.

The hydrophilic coating liquid composition prepared in the manner as described above is applied onto the surface of a substrate and dried to form thereon the intended hydrophilic layer. The thickness of the hydrophilic layer may be determined in any desired value, but dry weight of the layer is generally from 0.5 to 5.0 g/m$^2$, preferably from 1.0 to 3.0 g/m$^2$. If the thickness of the layer is smaller than 0.5 g/m$^2$, it is unfavorable since the layer could not well hydrophilicate the substrate surface; but if larger than 5.0 g/m$^2$, it is also unfavorable since the sensitivity and the film strength will lower.

(B) Image Forming Layer

On the hydrophilic surface of the support for a planographic printing plate of first and second aspect of the invention, a predetermined recording layer (image forming layer) is formed, whereby a planographic printing plate precursor is obtained. Any image forming layer may be formed optionally. If necessary, image forming layer may be formed on the hydrophilic surface of the material of the third aspect of the present invention. Some representative examples of image forming layer are described below.

(Photosensitive or Heat-sensitive Image Forming Layer)

In the first and second aspect of the present invention, at least one of image forming layer is formed on the hydrophilic layer to form a planographic printing plate precursor. The substrate and precursor of the first and second aspect of the present invention has a surface excellent in hydrophilicity, and therefore, an image having excellent image quality without contamination on the non-image portion can be formed eve if any image forming layer is formed.

The image forming layer provided on the hydrophilic surface is optional. However, preferable examples thereof include a photosensitive layer and a heat-sensitive layer wherein the image forming layer containing a known positive sensitive composition or a known negative sensitive composition.

(Positive Sensitive Composition)

As the positively sensitive composition used in the image forming layer in the present invention, it is preferable to use the known positive sensitive compositions (a) and (b) shown below.

(a) A conventional positive photosensitive composition containing naphthoquinone diazide and a novolak resin (b) A chemical sensitized positive photosensitive composition containing a combination of an alkali soluble compound protected with an acid-decomposable group and an acid generator The compositions (a) and (b) are well known in this field of art, and it is more preferable that they be used in combination with the following positively sensitive compositions (c) to (f).

(c) A laser-sensitive positive composition which contains a sulfonate polymer and an infrared ray absorbent, and is capable of forming a planographic printing plate without developing treatment disclosed in JP-A No. 10-282672

(d) A laser-sensitive positive composition which contains a carboxylate polymer and an acid generator or an infrared ray absorbent, and is capable of forming a planographic printing plate without developing treatment disclosed in EP No. 652,483 and JP-A No. 6-502260

(e) A laser-sensitive positive composition which contains an alkali soluble compound and a substance that is heat-decomposable and substantially decreases the solubility of the alkali soluble compound when the substance does not decomposed disclosed in JP-A No. 11-95421

(f) An alkali-developable elution type positive composition which contains an infrared ray absorbent, a novolak resin and a dissolution preventing agent, and is capable of forming an alkali-developable elusion type positive printing plate These positive sensitive compositions have a function such that suppressing effect with respect to dissolution into the developer such as an alkali aqueous solution is cancelled by applying energy to form a non-image part.

The alkali soluble compound used in the positive sensitive composition as a main component is a compound that, in the case where it is applied to a positive material, alkali solubility thereof is lowered in the presence of a dissolution preventing agent, and the alkali solubility is recovered by decomposition of the dissolution preventing compound. Examples of the alkali soluble compound used in the positively sensitive composition include a novolak resin, polyhydroxystyrene and an acrylic resin.

A solubility preventing agent may be added to the alkali soluble compound. The solubility preventing agent is such a compound that is decomposed by an action of an acid and becomes alkali soluble. Examples of the dissolution preventing agent include a carboxylic acid, a phenol compound and a quinone diazide compound that are protected with an acid decomposable group of a chemical sensitizing type used in the field of resists, such as a t-butyl ester, t-butyl carbamate and an alkoxyethyl ester.

An acid generator, which is a compound generating an acid by heat or light, also be usable for canceling the dissolution suppressing effect.

(Negative Sensitive Composition)

As the negative sensitive composition, the known negative sensitive compositions (g) to (j) shown below can be used in the present invention.

(g) A negative sensitive composition containing a polymer having a photo-crosslinkable group and an azide compound (h) A negative sensitive composition containing a diazo compound disclosed in JP-A No. 59-101651

(i) A photopolymerizable negatively sensitive composition containing a photopolymerization initiator and an addition polymerizable unsaturated compound disclosed in U.S. Pat. No. 5,262,276 and JP-A No. 2-63054

(j) A negatively sensitive composition containing an alkali soluble compound, an acid generator and an acid crosslinkable compound disclosed in JP-A No. 11-95421

The negative sensitive composition is such a composition that formation of a crosslinked structure and/or a polymerization reaction occurs and proceeds in the composition due to application of energy, whereby the composition is hardened to form an image part.

Examples of the major hardening reactions include a reaction wherein a polymer having a photocrosslinkable group, such as a polymer having —CH═CH—CO— as a photocrosslinkable group on the main chain or the side chain of the molecule, forms a crosslinked structure by exposure to light and hardened, a hardening reaction using an azide compound and a diazo compound, a hardening reaction wherein the composition contains a photopolymerization initiator and an addition polymerizable unsaturated compound having two or more terminal-ethylenically groups, and polymerization proceeds by exposure to light, and a reaction wherein the compound contains an acid generator and a compound capable of being crosslinked in the presence of an acid, such as a reaction wherein an acid crosslinkable compound such as an aromatic compound and a heterocyclic compound having been polysubstituted with a hydroxymethyl group, an acetoxymethyl group or an alkoxymethyl group are used, and a crosslinked structure is formed by application of energy.

The negatively sensitive composition may contain the alkali soluble compound similar to those used in the positively sensitive compound in order to improve the film property.

(B-1) Especially Preferable Image Forming Layer of the Present Invention:

The preferable image forming layer of the present invention is characterized in that it contains a polymer compound having a functional group that changes from one of hydrophilic to hydrophobic and hydrophobic to hydrophilic in the presence of an acid, by application of heat, or by irradiation with radiation.

The essential component of the image forming layer of the present invention, a polymer compound having a polarity-changing group, is described. The polarity-changing group to be introduced into the polymer compound includes two types as so mentioned above, that is, a functional group that changes from hydrophobic to hydrophilic and a functional group that changes from hydrophilic to hydrophobic.

B-1-1. Polymer Compound Comprising Functional Group that Changes from Hydrophobic to Hydrophilic in Side Chains:

Among the polymers having a polarity-changing group in the side chains, examples of the polymer having a functional group that changes from hydrophobic to hydrophilic in the side chains include sulfonate polymers and sulfonamides described in JP-A No. 10-282672; and carboxylate polymers described in EP Nos. 0652483, 6-502260 and 7-186562.

Of those polymers having side chains to change from hydrophobic to hydrophilic (polymer compounds including a functional group that changes from hydrophobic to hydrophilic), especially useful are secondary sulfonate polymers, tertiary carboxylate polymers, and alkoxyalkyl carboxylate polymers.

Examples of sulfonate polymers and carboxylate polymers usable in the present invention are mentioned below, however, the present invention is not limited thereto. Compounds (1p-1) to (1p-8) are sulfonate polymers; and Compounds (a1) to (a10) are carboxylate polymers.

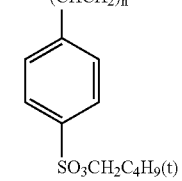 (1p-1)

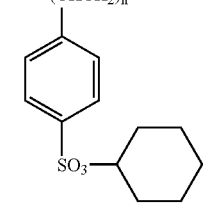 (1p-2)

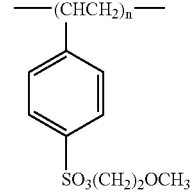 (1p-3)

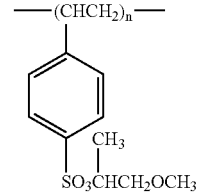 (1p-4)

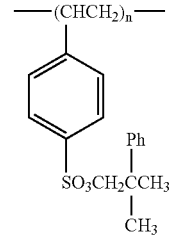 (1p-5)

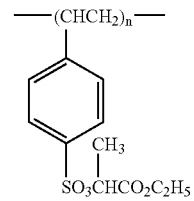 (1p-6)

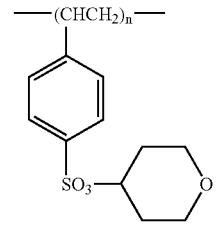 (1p-7)

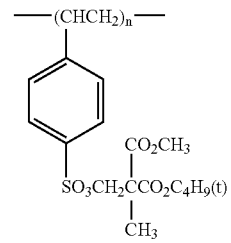 (1p-8)

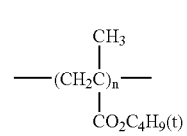 (a1)

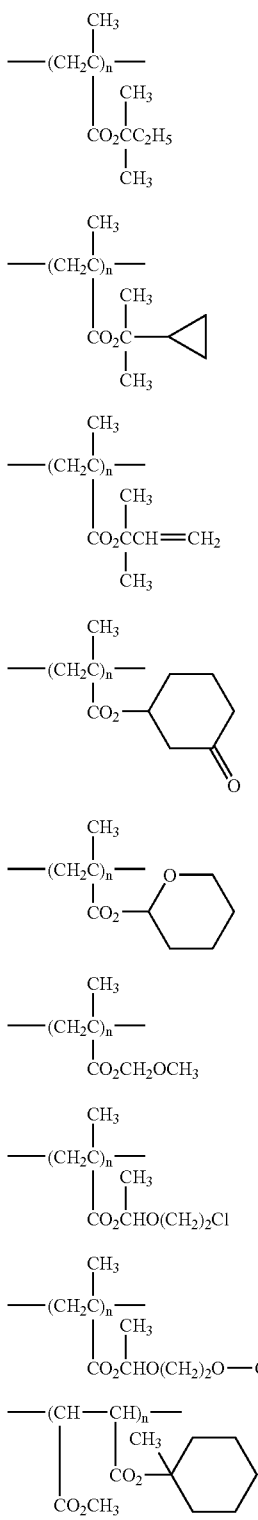

In case where the sulfonate polymer or the carboxylate polymer is used in the present invention, those amount may be from 5 to 99% by weight, preferably from 10 to 98% by weight, and more preferably from 30 to 90% by weight based on the total solid content of the image forming layer (photosensitive or thermosensitive recording layer).

B-1-2. Polymer Compound Having Functional Group that Changes from Hydrophilic to Hydrophobic in Side Chains:

Examples of the polymer having a functional group in the side chains wherein the group changes from hydrophilic to hydrophobic (polymer compounds including a functional group that changes from hydrophilic to hydrophobic), include ammonium group-having polymers described in JP-A No. 6-317899; and polymers having a decarboxylation type polarity-changing group such as the following general formula (1), such as sulfonylacetic acid, described in JP-A No. 2000-309174 (Japanese Patent Application No. 11-118295):

general formula (1)

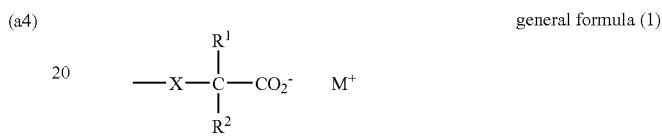

general formula (1)

wherein X represents —O—, —S—, —Se—, —NR$^3$—, —CO—, —SO—, —SO$_2$—, —PO—, —SiR$^3$R$^4$—, or —CS; each of R$^1$, R$^2$, R$^3$ and R$^4$ independently represent a monovalent group; and M represents a cation.

Examples of R$^1$, R$^2$, R$^3$ and R$^4$ include —F, —Cl, —Br, —I, —CN, —R$^5$, —OR$^5$, —OCOR$^5$, —OCOOR$^5$, —OCONR$^5$R$^6$, —OSO$_2$R$^5$, —COR$^5$, —COOR$^5$, —CONR$^5$R$^6$, —NR$^5$R$^6$, —NR$^5$—COR$^6$, —NR$^5$—COOR$^6$, —NR$^5$—CONR$^6$R$^7$, —SR$^5$, —SOR$^5$, —SO$_2$R$^5$, and —SO$_3$R$^5$.

Examples of R$^5$, R$^6$ and R$^7$ include a hydrogen atom, an alkyl group, an aryl group, an alkenyl group, and an alkynyl group. Specific examples of the functional groups can be referred to those mentioned above.

Preferably, each of R$^1$, R$^2$, R$^3$ and R$^4$ are a hydrogen atom, an alkyl group, an aryl group, an alkynyl group, or an alkenyl group.

The polarity-converting polymer compound in the present invention may be a homopolymer of one monomer having a hydrophilic functional group as described above, or a copolymer of two or more such monomers. Not interfering with the effect of the present invention, it may be a copolymer with any other monomers.

Examples of the polymer compound having side chains that changes from hydrophilic to hydrophobic used in the present invention are mentioned below (Compounds (P-1) to (P-17)). However, the present invention is not limited thereto.

P-1

-continued
P-2
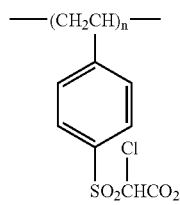
P-3
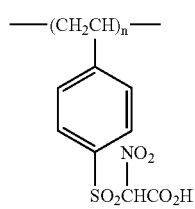
P-4
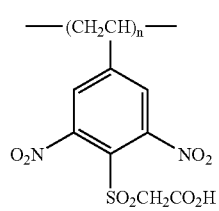
P-5
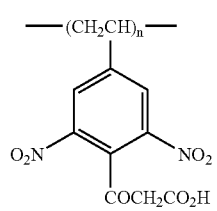
P-6
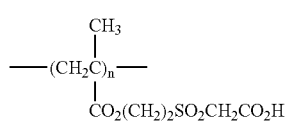
P-7
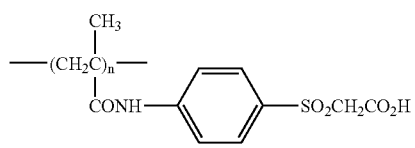
P-8
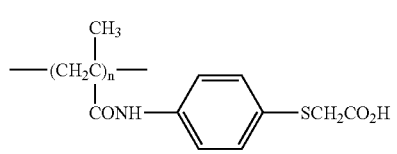
P-9
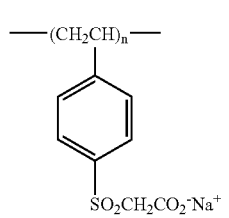
-continued
P-10
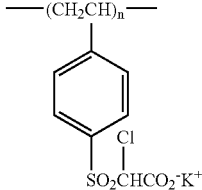
P-11
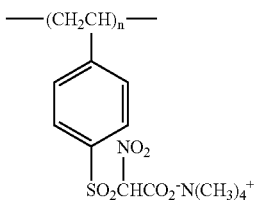
P-12
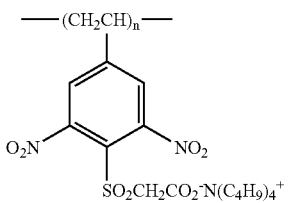
P-13
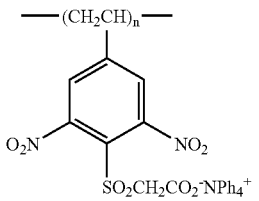
P-14
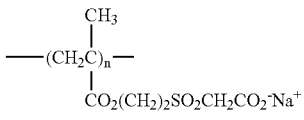
P-15
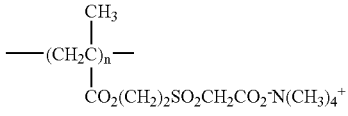
P-16
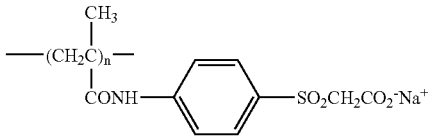
P-17
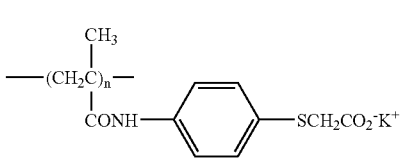
The amount of the polarity-changeable polymer compound to be used in the image forming layer of the planographic printing plate precursor of the present invention is preferably from 0.01 to 94% by weight, more preferably from 0.05 to 90% by weight of the total solid content of the layer.

B-1-3. Other Components of the Present Invention:

The image forming layer of the planographic printing plate precursor of the present invention may contain, if desired, any other various compounds for getting various properties.

For example, the image forming layer of the planographic printing plate precursor of the present invention may contain a dye having high absorption in the visible light range, as an image colorant.

Concretely, examples of the dye includes Oil Yellow #101, Oil Yellow #103, Oil Pink #312, Oil Green BG, Oil Blue BOS, Oil Blue #603, Oil Black BY, Oil Black BS, Oil Black T-505 (all manufactured by Orient Chemical Industry Co., Ltd.), Victoria Pure Blue, Crystal Violet (CI 42555), Methyl Violet (CI 42535), Ethyl Violet, Rhodamine B (CI 145170B), Malachite Green (CI 42000), Methylene Blue (CI 52015), as well as the dyes described in JP-A No. 62-293247.

These dyes facilitate to show differentiation of the image area from the non-image area in the image-formed plate, and it is desirable to add any of them to the image forming layer. The amount of the dye in the image forming layer is from 0.01 to 10% by weight of the total solid content of the layer.

The image forming layer of the planographic printing plate precursor of the present invention may contain any of nonionic surfactants described in JP-A Nos. 62-251740 and 3-208514, and ampholytic surfactants described in JP-A Nos. 59-121044 and 4-13149, for broadening the latitude in stable processing of the precursor in various conditions for development.

Examples of the nonionic surfactants include sorbitan tristearate, sorbitan monopalmitate, sorbitan trioleate, stearic monoglyceride, and polyoxyethylene nonylphenyl ether.

Examples of the ampholytic surfactants include alkyldi (aminoethyl)glycine, alkylpolyaminoethylglycine hydrochloride, 2-alkyl-N-carboxyethyl-N -hydroxyethylimidazolium betaine, and N-tetradecyl-N,N-betaine (e.g., Amogen K, trade name, manufactured by Daiichi Kogyo Co., Ltd.). The amount of the nonionic surfactant or the ampholytic surfactant used in the image forming layer of the planographic printing plate precursor is preferably from 0.05 to 15% by weight, more preferably from 0.1 to 5% by weight of the layer.

Also if desired, the image forming layer of the planographic printing plate precursor of the present invention may contain a plasticizer for making the layer flexible. Examples of the plasticizer includes butylphthalyl, polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, and oligomers and polymers of acrylic acid or methacrylic acid.

Apart from these, the layer may contain any of onium salts, haloalkyl-substituted s-triazines, epoxy compounds, vinyl ethers, and also hydroxymethyl-having phenol compounds and alkoxymethyl-having phenol compounds described in Japanese Patent Application No. 7-18120.

In the present invention, the image forming layer may be formed by dissolving the above-mentioned components in a solvent and applying the resulting solution onto the hydrophilic layer. Examples of the solvent usable herein includes ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N -dimethylformamide, tetramethylurea, N-methylpyrrolidone, dimethyl sulfoxide, sulforane, γ-butyrolactone, toluene and water. However, the present invention is not limited thereto. One or more of these solvents may be used singly or in combination of two or more. The concentration of the constituent components (total solid content including additives) in the solvent is preferably from 1 to 50% by weight.

The dry weight (in terms of the solid content) of the image forming layer may vary depending on the use thereof. In general, the dry weight thereof is from 0.1 $g/m^2$ to 10 $g/m^2$, preferably from 0.5 $g/m^2$ to 5 $g/m^2$. The sensitivity of the layer is higher when the coating amount thereof is lower. However, if the coating amount of the layer is too small, the printing durability of the printing plate will be low. On the other hand, the film properties of the layer are better when the coating amount thereof is larger. However, if the coating amount of the layer is too large, the sensitivity thereof will lower and the fine line reproduction in prints will be poor.

In order for forming the layer, various coating methods are employable. For example, employable are bar coating, spin coating, spraying, curtain coating, dipping, air knife coating, blade coating and roll coating.

The image forming layer of the planographic printing plate precursor of the present invention may contain a surfactant having the ability to improve the coatability of the layer. For example, the layer may contain a fluorine-containing surfactant described in JP-A No. 62-170950. Preferably, the amount of the surfactant to be used in the image forming layer is from 0.01 to 1% by weight, more preferably from 0.05 to 0.5% by weight of the total solid content of the layer.

Light to Heat Converting Substance:

In case where the planographic printing plate precursor of the present invention is treated through scanning exposure to IR laser light for forming image, it is desirable that the precursor contains somewhere therein a light to heat converting substance having the ability to convert optical energy to heat energy. For example, the precursor may contain a photo-thermal converting substance in any of the image forming layer, the hydrophilic layer, and the surface layer of the substrate or the substrate itself. Apart from these sites, the light to heat converting substance may also be added to a thin layer that may be formed between the image forming layer and the crosslinked hydrophilic layer, or between the substrate surface layer and the substrate.

The light to heat converting substance that may be used in the planographic printing plate precursor of the present invention is not specifically defined. The substance may be any one and selected from every substances capable of absorbing light such as UV light, visible light, IR light and white light to convert it into heat. Examples thereof include carbon black, carbon graphite, pigment such as phthalocyanine pigment, iron powder, graphite powder, iron oxide powder, lead oxide, silver oxide, chromium oxide, iron sulfide, and chromium sulfide. Especially preferable substances are dyes, pigments and metals capable of effectively absorbing IR light falling between 760 nm and 1200 nm.

The dyes may be any known ones, and examples thereof include those available as commercial products and those described in literature (e.g., in Dye Handbook, edited by the Organic Synthetic Chemistry Association of Japan, 1970).

Concretely, examples thereof include azo dyes, metal complexed azo dyes, pyrazolonazo dyes, anthraquinone dyes, phthalocyanine dyes, carbonium dyes, quinonimine dyes, methine dyes, cyanine dyes and metal thiolate complex dyes. Preferable examples thereof include cyanine dyes described in JP-A Nos. 58-125246, 59-84356, 59-202829 and 60-78787; methine dyes described in JP-A Nos. 58-173696, 58-181690 and 58-194595; naphthoquinone dyes described in JP-A Nos. 58-112793, 58-224793, 59-48187, 59-73996, 60-52940 and 60-63744; squalilium dyes described in JP-A No. 58-112792; and cyanine dyes described in British Patent No. 434,875.

Examples of preferable dyes include near IR-absorbing sensitizers described in U.S. Pat. No. 5,156,938; substituted arylbenzo(thio)pyrylium salts described in U.S. Pat. No. 3,881,924; trimethinethiapyrylium salts described in JP-A No. 57-142645 (U.S. Pat. No. 4,327,169); pyrylium compounds described in JP-A Nos. 58-181051, 58-220143, 59-41363, 59-84248, 59-84249, 59-146063 and 59-146061; cyanine dyes described in JP-A No. 59-216146; pentamethinethiopyrylium salts described in U.S. Pat. No. 4,283,475; and pyrylium compounds described in JP-B Nos. 5-13514 and 5-19702. Still other examples of preferable dyes include near IR absorbent dyes of formulae (I) and (II) in U.S. Pat. No. 4,756,993. Of those dyes, especially preferable dyes are cyanine dyes, squarylium dyes, pyrylium salts and nickel-thiolate complexes.

Herein employable are commercial pigments and pigments disclosed in Color Index (C.I.) Handbook, Latest Pigment Handbook (edited by the Pigment Technology Association of Japan, 1977), Latest Pigment Application Technology (published by CMC, 1986) and Printing Ink Technology (published by CMC, 1984). Concrete examples of the pigments employable herein include black pigments, yellow pigments, orange pigments, brown pigments, red pigments, purple pigments, blue pigments, green pigments, fluorescent pigments, metal powder pigments, and polymer-bonded colorants. More concretely, examples thereof include insoluble azo pigments, azo-lake pigments, condensed azo pigments, chelate-azo pigments, phthalocyanine pigments, anthraquinone pigments, perylene and perinone pigments, thioindigo pigments, quinacridone pigments, dioxazine pigments, isoindolinone pigments, quinophthalone pigments, dyed lake pigments, azine pigments, nitroso pigments, nitro pigments, natural pigments, fluorescent pigments, inorganic pigments, and carbon black. Of those pigments, preferable is carbon black.

These pigments may be surface-treated or not. As the surface-treatment, for example, the pigment particles may be coated with resin or wax; or a surfactant may be adhered to them; or a reactive substance (e.g., silane coupling agent, epoxy compound, polyisocyanate) may be bonded to the surfaces of the pigment particles. The surface treatment is described, for example, in Properties and Applications of Metal Soap (by Miyuki Shobo), Printing Ink Technology (by CMC, 1984), and Latest Pigment Application Technology (by CMC, 1986).

Preferably, the particle size of the pigment used in the present invention is from 0.01 µm to 10 µm, more preferably from 0.05 µm to 1 µm, even more preferably from 0.1 µm to 1 µm. If the particle size of the pigment is smaller than 0.01 µm, it is unfavorable since the pigment dispersion in the light to heat converting substance-containing layer coating liquid is not stable; but if larger than 10 µm, it is also unfavorable since the light to heat converting substance-containing layer may not be uniform. For dispersing the pigment, employable is any known dispersion technology for ink production or toner production. The dispersing machine to be used may be any of an ultrasonic wave dispersing machine, sand mill, attritor, pearl mill, super mill, ball mill, impeller, disperser, KD mill, colloid mill, dynatron, three-roll mill, and pressure kneader. They are described in detail, for example, in Latest Pigment Application Technology (by CMC, 1986).

The amount of the dye or pigment to be used in the light to heat converting substance-containing layer may be from 0.01 to 50% by weight, preferably from 0.1 to 10% by weight of the total solid content of the layer. More preferably, the amount of the dye is from 0.5 to 10% by weight; and that of the pigment is from 3.1 to 10% by weight. If the amount of the pigment or dye is smaller than 0.01% by weight, the layer will be ineffective for increasing the sensitivity of the precursor; but if larger than 50% by weight, the film strength of the light to heat converting substance-containing layer will be low.

The planographic printing plate precursor produced in the manner may be exposed and developed in any known method in order to form a planographic printing plate, and this plate is used in producing a large number of prints.

When thermal energy is applied to the image forming layer in the planographic printing plate precursor of the present invention, the heated region of the layer changes from hydrophilic to hydrophobic, or from hydrophobic to hydrophilic. Depending on the type of change in the layer, the exposed part or the non-exposed part of the image forming layer changes into a hydrophobic ink-receiving image area or a hydrophilic non-image area of the layer. The image formation based on the polarity change does not substantially require wet development. Therefore, after heat is applied to precursor or the precursor is exposed to light to form an image thereon, the precursor may be directly set in a printer, not requiring any special wet development, and it receives dampening water and ink in the printer, and serves as a printing plate to produce prints.

Image formation may be carried out on the planographic printing plate precursor of the present invention by applying heat to the precursor. When the precursor contains a light to heat converting substance as described above, an image may be formed thereon through scanning exposure to IR laser light and the like.

Examples of method, which is employable for forming an image on the precursor, include any method of thermal fixation, optical fixation, pressure fixation, and solvent fixation. Concretely, an image may be formed on the precursor through direct imagewise heating with a thermal recording head, or through scanning exposure to IR laser light, or high-intensity flash exposure to a xenon discharge lamp, or exposure to an IR lamp.

In order for carrying out direct plate making using the precursor by a computer-to-plate system having the ability to improve the productivity, it is desirable to fuse image portion thereof using laser. Examples of the laser include gas lasers such as carbon dioxide laser, nitrogen laser, Ar laser, He/Ne laser, He/Cd laser, Kr laser; liquid (color) lasers; solid lasers such as ruby laser, Nd/YAG laser; semiconductor lasers such as GaAs/GaAlAs, InGaAs laser; and excimer lasers such as KrF laser; XeCl laser, XeF laser, $Ar_2$. Above all, preferable laser is exposure to high-power type solid IR laser such as YAG laser or IR semiconductor laser which emit 700-1200 nm light.

Thus the image forming layer of the precursor, which is exposed imagewise, has a hydrophilic region and a hydrophobic region formed therein. In that condition, the precursor may be directly set in a printer, in which it receives ink and dampening water in an ordinary order, and comes to serve as a printing plate to produce prints. The planographic printing plate precursor of the present invention may be set in a printer equipped with an exposing device, and it may be exposed to light to form an image thereon in the printer.

(B-2) Preferable Image Forming Layer of the Present Invention:

The image forming layer of the present invention may be characterized in that it contains a hydrophobic precursor capable of forming a hydrophobic region through application of heat or to radiation such as those of IR laser light.

First described component is the preferable component of the image forming layer. The hydrophobic precursor may be particles that form a hydrophobic region in the image forming layer by application of heat. Examples thereof include thermoplastic polymer particles, thermosetting polymer particles, thermo-reactive functional group-having polymer particles, and microcapsules of a hydrophobic compound such as a thermo-reactive functional group-having compound, which are dispersed in the matrix of the hydrophilic image forming layer. The particles can be dispersed in a matrix of the image-forming layer. When applied heat, the polymer particles of these compounds fuse or react with each other into aggregates to form a hydrophobic region. In case of the microcapsules, the microcapsules include walls that are broken or become permeable by application of heat, so that the hydrophobic compound encapsulated therein is let out, whereby a predetermined region of the image-forming layer changes polarity to become hydrophobic and form the hydrophobic region.

The image forming layer may contain one or more different types of such particles or microcapsules.

B-2-1. Hydrophobic Precursor:

B-2-1-1. Thermoplastic Polymer Particles:

Examples of the thermoplastic polymer particles preferred for use in the present invention are described in, for example, Research Disclosure No. 33303, January 1992, JP-A Nos. 9-123387, 9-131850, 9-171249 and 9-171250, and EP No. 931647.

Examples of the polymer to form the polymer particles includes homopolymers or copolymers of monomers such as ethylene, styrene, vinyl chloride, methyl acrylate, ethyl acrylate, methyl methacrylate, ethyl methacrylate, vinylidene chloride, acrylonitrile, and vinylcarbazole, and their mixtures. Of those, more preferable polymers are polystyrene and polymethyl methacrylate.

Preferably, the mean particle size of the thermoplastic polymer particles for use in the present invention is from 0.01 to 20 μm. In order to produce the polymer particles, any known method is employable. For example, they may be readily produced through ordinary emulsion polymerization or suspension polymerization, but the method is not limited thereto.

B-3-1-2. Thermosetting Polymer Particles:

Examples of the thermosetting polymer suitable for the thermosetting polymer particles for use in the present invention includes resins having phenol-based structure, urea resins (e.g., those produced by resinifying urea or urea derivatives such as methoxymethylurea with aldehydes such as formaldehyde), melamine resins (e.g., those produced by resinifying melamine or its derivatives with aldehydes such as formaldehyde), alkyd resins, unsaturated polyester resins, polyurethane resins, and epoxy resins.

Preferable examples of the resins having phenol-based structure include phenolic resins produced by resinifying phenol or cresol with aldehydes such as formaldehyde, hydroxystyrene resins, methacrylamide or acrylamide resins having a phenol skeleton structure such as N-(p-hydroxyphenyl)methacrylamide, and methacrylate or acrylate resins having a phenol skeleton such as p-hydroxyphenyl methacrylate.

Of those, especially preferable are resins having phenol-based structure, melamine resins, urea resins and epoxy resins.

Preferably, the mean particle size of the thermosetting polymer particles for use in the present invention is from 0.01 to 20 μm. For producing the polymer particles, for example, known is a method of dissolving the polymer compound in a water-insoluble organic solvent, mixing it with an aqueous solution containing a dispersant, and solidifying the resulting emulsion into fine particles by heating it to remove the organic solvent. Alternatively to it, thermosetting polymers may be formed into fine particles while they are produced. However, the present invention is not limited to these methods.

B-2-1-3. Thermo-Reactive Functional Group Having Polymer Particles:

Examples of the thermo-reactive functional group in the thermo-reactive functional group-having polymer particles which are preferable for use in the present invention includes polymerizing ethylenically unsaturated groups (e.g., acryloyl group, methacryloyl group, vinyl group, allyl group); isocyanate groups that can cause addition reaction, and their blocked groups, and functional groups having active hydrogen atom which are reaction partner groups of the isocyanate groups or blocked groups (e.g., amino group, hydroxyl group, carboxyl group); epoxy groups that can cause addition reaction, and their reaction partners, amino group, carboxyl group or hydroxyl group; carboxyl groups that can cause condensation with hydroxyl or amino group, and their reaction partners; acid anhydrides that can cause ring-opening addition reaction with amino or hydroxyl group, and their reaction partners. However, any and every functional group is acceptable herein so far as it forms some chemical bond through chemical reaction.

Concrete examples of the thermo-reactive functional group in the polymer particles for use in the image forming layer of the present invention includes an acryloyl group, a methacryloyl group, a vinyl group, an allyl group, an epoxy group, an amino group, a hydroxyl group, a carboxyl group, an isocyanate group, an acid anhydride group, and their protected groups. Introducing the functional group into the polymer particles may be effected during polymerization of the polymer, or by proceeding polymer reaction for the group after polymerization of the polymer.

In case where the thermo-reactive functional group is introduced into the polymer for polymer particles during polymerization, it is desirable that a thermo-reactive functional group-having monomer is prepared and the monomer is polymerized into polymer by an emulsion polymerization or suspension polymerization.

Examples of the thermo-reactive functional group-having monomer include allyl methacrylate, allyl acrylate, vinyl methacrylate, vinyl acrylate, glycidyl methacrylate, glycidyl acrylate, 2-isocyanatoethyl methacrylate and its blocked isocyanates which is blocked with alcohol or the like, 2-isocyanatoethyl acrylate and its blocked isocyanates which is blocked with alcohol or the like, 2-aminoethyl methacrylate, 2-aminoethyl acrylate, 2-hydroxyethyl methacrylate, 2-hydroxyethyl acrylate, acrylic acid, methacrylic acid, maleic anhydride, difunctional acrylates and difunctional methacrylates. However, the thermo-reactive functional group-having monomers usable in the present invention are not limited thereto.

In producing the thermo-reactive functional group-having polymers, the thermo-reactive functional group-having monomers may be copolymerized with any other comonomers not having the thermo-reactive functional group. Examples of the comonomers not having the functional group include styrene, alkyl acrylates, alkyl methacrylates, acrylonitrile, and vinyl acetate, but these are not limited thereto. Any others not having such a thermo-reactive functional group may serve as the comonomers.

The polymer reaction in order for introducing the thermo-reactive functional group into the polymers after polymerization is described, for example, in the pamphlet of International Patent Publication Laid-Open No. 96/34316.

Preferably, the thermo-fusing temperature of the thermo-reactive functional group-having polymer particles is not lower than 70° C., more preferably not lower than 100° C. in view of the storage stability of the polymer particles. However, if the thermo-fusing temperature of the polymer particles is too high, it is unfavorable from the viewpoint of the sensitivity thereof. Therefore, the thermo-fusing temperature of the polymer particles preferably is in a range of from 80 to 250° C., more preferably 100 to 150° C.

Preferably, the mean particle size of the polymer particles is from 0.01 to 20 μm, more preferably 0.05 to 2.0 μm, most preferably 0.1 to 1.0 μm. Within the range, the polymer particles ensure good image resolution and storage stability of the image forming layer containing them.

B-2-1-4. Microcapsules of Hydrophobic Compound:

Next described are the microcapsules wherein a hydrophobic substance is encapsulated therein. The hydrophobic substance is preferably a compound having a thermo-reactive functional group.

As the thermo-reactive functional group in the hydrophobic compound to be encapsulated into microcapsules, those mentioned above for the thermo-reactive functional group-having polymer particles are preferably usable and referred to. Concrete examples of the group includes polymerizing unsaturated groups (polymerizable ethylenically unsaturated groups), hydroxyl groups, carboxyl groups, carboxylate groups, acid anhydride groups, amino groups, epoxy groups, isocyanate groups, and blocked isocyanate groups.

The compounds having polymerable unsaturated group are preferably compounds having at least one, more preferably at least two, ethylenically unsaturated bonds such as acryloyl group, methacryloyl group, vinyl group and allyl group. These compounds are well known in the industrial field. Without specific limitation thereon, any and every compound of these type is employable in the present invention. As its chemical form, the compound includes monomers, prepolymers, e.g., dimers, trimers and oligomers, and their mixtures and copolymers.

Concrete examples of the compound includes unsaturated carboxylic acids (e.g., acrylic acid, methacrylic acid, itaconic acid, crotonic acid, isocrotonic acid, maleic acid), esters thereof, and unsaturated carboxamides. Above all, preferable compounds for use herein are esters obtained by a reaction of unsaturated carboxylic acids with aliphatic polyalcohols, and amides obtained by a reaction of unsaturated carboxylic acids with aliphatic polyamines.

Also preferable are adducts obtained by a reaction of unsaturated carboxylates or unsaturated carboxamides having a nucleophilic substituent such as hydroxyl, amino or mercapto group, with monofunctional or polyfunctional isocyanates or epoxides; and dehydrated polycondensates obtained by a reaction of such unsaturated carboxylates or carboxamides with monofunctional or polyfunctional carboxylic acids.

Also preferable for use herein are adducts obtained by a reaction of unsaturated carboxylates or amides having an electrophilic substituent such as isocyanate or epoxy group with monofunctional or polyfunctional alcohols, amines or thiols; and substitution products obtained by a reaction of unsaturated carboxylates or amides having a eliminatable substituent such as halogen or tosyloxy group, with monofunctional or polyfunctional alcohols, amines or thiols.

Still other examples also preferable for use in the present invention include compounds corresponding to those mentioned above in which, however, the unsaturated carboxylic acids or unsaturated carboxylic acid portion are replaced with unsaturated phosphonic acids or chloromethylstyrenes.

Examples of the esters obtained from unsaturated carboxylic acids and aliphatic polyalcohols are shown below.

Examples of acrylates include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane diacrylate, trimethylolpropane triacrylate, trimethylolpropane tris(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol pentaacrylate, dipentaerythritol hexaacrylate, sorbitol triacrylate, sorbitol tetraacrylate, sorbitol pentaacrylate, sorbitol hexaacrylate, tris(acryloyloxyethyl)isocyanurate, and polyester acrylate oligomers.

Examples of methacrylates include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloyloxy-2-hydroxypropoxy)phenyl]-dimethylmethane, and bis-[p -(methacryloyloxyethoxy)phenyl]dimethylmethane.

Examples of itaconates include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonates include ethylene glycol dicrotonate, tetramethylene glycol dicrotonate, pentaerythritol dicrotonate, and sorbitol tetra/dicrotonate.

Examples of isocrotonates include ethylene glycol diisocrotonate, pentaerythritol diisocrotonate, and sorbitol tetraisocrotonate.

Examples of maleates include ethylene glycol dimaleate, triethylene glycol dimaleate, pentaerythritol dimaleate, and sorbitol tetramaleate.

Examples of other esters also usable herein include aliphatic alcohol esters described in JP-B Nos. 46-27926, 51-47334, 57-196231; aromatic skeleton-having esters described in JP-A Nos. 59-5240, 59-5241, 2-226149; and amino group-having esters described in JP-A No. 1-165613.

Examples of the amide monomers obtained from aliphatic polyamine compounds and unsaturated carboxylic acids include methylenebis-acrylamide, methylenebis-methacrylamide, 1,6-hexamethylenebis-acrylamide, 1,6-hexamethylenebis-methacrylamide, diethylenetriamine-trisacrylamide, xylylenebisacrylamide, and xylylenebismethacrylamide.

Other amide monomers also preferable for use herein are those having a cyclohexylene structure described in, for example, JP-B No. 54-21726.

Urethane-based polyadducts produced through addition reaction of isocyanates with a hydroxyl group are also preferable for use in the present invention. Concrete examples thereof include urethane compounds having at least two polymerizable unsaturated groups in a molecule, which are obtained by adding a hydroxyl group-having unsaturated monomer of the following formula (III) to a polyisocyanate compound having at least two isocyanate groups in one molecule. These are described in JP-B No. 48-41708.

$$CH_2=C(R^1)\ COOCH_2CH(R^2)OH \qquad (III)$$

wherein $R^1$ and $R^2$ each represent H or $CH_3$.

Also preferable for use in the present invention are urethane acrylates described in JP-A No. 51-37193, and JP-B Nos. 2-32293 and 2-16765; and ethylene oxide-based urethane compounds described in JP-B Nos. 58-49860, 56-17654, 62-39417 and 62-39418.

Also preferable are radical-polymerizable compounds having an amino structure or a sulfide structure in the molecule, described in JP-A Nos. 63-277653, 63-260909 and 1-105238.

Other examples which is preferable for use in the present invention include polyfunctional acrylates and methacrylates, such as polyester acrylates and epoxy acrylates obtained through reaction of epoxy resins with (meth)acrylic acid, described in JP-A No. 48-64183, and JP-B Nos. 49-43191 and 52-30490. Also preferable are specific unsaturated compounds described in JP-B Nos. 46-43946, 1-40337 and 1-40336; and vinylphosphonic acid compounds described in JP-A No. 2-25493. As the case may be, perfluoroalkyl group-having compounds described in JP-A No. 61-22048 are also preferable. Further, photocurable monomers and oligomers described in the Journal of the Adhesive Association of Japan, Vol. 20, No. 7, pp. 300-308 (1984) are also preferable.

Examples of preferable epoxy compounds include glycerin polyglycidyl ether, polyethylene glycol diglycidyl ether, polypropylene diglycidyl ether, trimethylolpropane polyglycidyl ether, sorbitol polyglycidyl ether, and polyglycidyl ethers of bisphenols or polyphenols or hydrogenated compounds thereof.

Preferable examples of isocyanate compounds include tolylene diisocyanate, diphenylmethane diisocyanate, polymethylene-polyphenyl polyisocyanate, xylylene diisocyanate, naphthalene diisocyanate, cyclohexanephenylene diisocyanate, isophorone diisocyanate, hexamethylene diisocyanate, cyclohexyl diisocyanate, and their derivatives blocked with alcohols or amines.

Examples of preferable amine compounds include ethylenediamine, diethylenetriamine, triethylenetetramine, hexamethylenediamine, propylenediamine, and polyethylenimine.

Examples of preferable hydroxyl group-containing compounds include compounds terminated with methylol group, polyalcohols such as pentaerythritol, bisphenols and polyphenols.

Examples of preferable carboxyl group-containing compounds include aromatic polycarboxylic acids such as pyromellitic acid, trimellitic acid, phthalic acid; and aliphatic polycarboxylic acids such as adipic acid.

Examples of preferable acid anhydrides include pyromellitic anhydride, and benzophenonetetracarboxylic anhydride.

Examples of preferable copolymers of ethylenic unsaturated compounds include allyl methacrylate copolymers. Concrete examples thereof include allyl methacrylate/methacrylic acid copolymers, allyl methacrylate/ethyl methacrylate copolymers, and allyl methacrylate/butyl methacrylate copolymers.

For forming microcapsules, any known method is employable. Examples thereof include a method of coacervation described in U.S. Pat. Nos. 2,800,457 and 2,800,458; a method of interfacial polymerization described in British Patent No. 990,443, U.S. Pat. No. 3,287,154, JP-B Nos. 38-19574, 42-446, 42-711; a method of polymer precipitation described in U.S. Pat. Nos. 3,418,250 and 3,660,304; a method of using an isocyanate-polyol wall-forming material described in U.S. Pat. No. 3,796,669; a method of using an isocyanate wall-forming material described in U.S. Pat. No. 3,914,511; a method of using an urea-formaldehyde or urea-formaldehyde-resorcinol wall-forming material described in U.S. Pat. Nos. 4,001,140, 4,087,376 and 4,089,802; a method of using a melamine-formaldehyde resin or hydroxy cellulose as a wall-forming material described in U.S. Pat. No. 4,025,445; a method of in-situ polymerization of monomers described in JP-B Nos. 36-9163 and 51-9079; a spray-drying method described in British Patent No. 930,422 and U.S. Pat. No. 3,111,407; and an electrolytic dispersion cooling method described in British Patent Nos. 952,807 and 967,074. However, the present invention is not limited to these methods.

The microcapsule walls which are preferable for the microcapsules for use in the present invention have a three-dimensional crosslinked structure, and they can swell in solvents. From this viewpoint, it is desirable that the wall material for the microcapsule is polyurea, polyurethane, polyester, polycarbonate, polyamide or their mixture. Especially preferable materials are polyurea and polyurethane. If desired, a compound having thermo-reactive functional group such as those described above may be introduced into the microcapsule walls.

Preferably, the mean particle size of the microcapsules is from 0.01 to 20 μm, more preferably 0.05 to 2.0 μm, most preferably 0.10 to 1.0 μm. Within the range, the microcapsules can provide good image resolution and storage stability of the image forming layer containing them.

In the image forming mechanism wherein microcapsules of a hydrophobic substance (thermo-reactive functional group-having compound) are used, any compound of the microcapsule material, the compound contained in the microcapsules and other optional components, which exist in the thermo-sensitive layer that contains the microcapsules dispersed therein, can react with each other to form an image region which is a hydrophobic region (ink-acceptable region). Various embodiments will satisfy the requirement. Examples of the mechanism include one type mechanism wherein the microcapsules fuse each other when heat is applied as described above; another type mechanism wherein the encapsulated compound have oozed on the outer surfaces of the microcapsules or completely oozed through the microcapsules in a coating step of applying a microcapsule dispersion onto a substrate, or an outer compound have penetrated into the microcapsules in a coating step, and chemical reaction is caused under heat due to the oozed compound or penetrated compound; and still another type mechanism wherein the microcapsule material and/or the encapsulated compound reacts with a hydrophilic resin or a low-molecular compound which is added to the layer; and still another type mechanism wherein at least two different types of microcapsule wall materials or at least two different types compounds to be encapsulated are prepared such that they have different functional groups capable of undergoing thermal reaction with each other, and used in combination so that the microcapsules can react with each other. The present invention can employ any of such types of image formation.

Accordingly, the thermal fusion of microcapsules is one preferable embodiment for image formation but is not indispensable in the present invention.

Preferably, the amount of the hydrophobic precursor, which is selected from the thermoplastic polymer particles, thermosetting polymer particles, thermo-reactive functional group-having polymer particles, microcapsules and the like to be added to the image forming layer is from 20 to 99% by weight of the solid content of the layer, and more preferably 40 to 90% by weight. Within the range, the image forming layer can achieve good in-printer development, good image formation, high sensitivity and good printing durability.

B-2-2. Hydrophilic Resin:

In the present invention, the image forming layer can contain a hydrophilic resin in order for providing better in-printer developability and higher film strength of the heat-sensitive layer.

From the viewpoint of the in-printer developability of the image forming layer, it is desirable that the hydrophilic resin is not three-dimensionally crosslinked. Desirable concrete examples include hydrophilic resin having a hydrophilic group such as hydroxyl, carboxyl, hydroxyethyl, hydroxypropyl, amino, aminoethyl, aminopropyl and carboxymethyl groups.

Examples of the hydrophilic resin include gum arabic, casein, gelatin, starch derivatives, carboxymethyl cellulose and its salts, cellulose acetate, sodium alginate, vinyl acetate-maleic acid copolymers, styrene-maleic acid copolymers, polyacrylic acids and their salts, polymethacrylic acid and their salts, homopolymers and copolymers of hydroxyethyl methacrylate, homopolymers and copolymers of hydroxyethyl acrylate, homopolymers and copolymers of hydroxypropyl methacrylate, homopolymers and copolymers of hydroxypropyl acrylate, homopolymers and copolymers of hydroxybutyl methacrylate, homopolymers and copolymers of hydroxybutyl acrylate, polyethylene glycols, hydroxypropylene polymers, polyvinyl alcohols, hydrolyzed polyvinyl acetates having a degree of hydrolysis of at least 60% by weight, and preferably at least 80% by weight, polyvinylformals, polyvinylbutyrals, polyvinylpyrrolidones, homopolymers and copolymers of acrylamide, homopolymers and copolymers of methacrylamide, homopolymers and copolymers of N-methylolacrylamide, 2-acrylamido-2-methylpropane sulfonic acid and its salts.

The amount of the hydrophilic resin to be in the image forming layer is preferably from 2 to 40% by weight, more preferably from 3 to 30% by weight of the solid content of the layer. Within the range, the image forming layer ensures good in-printer developability and high film strength.

B-2-3. Light to Heat Converting Agent:

In case where the planographic printing plate precursor of the present invention is processed through scanning exposure to laser light for forming image thereon, it is desirable that at least one layer comprised in the precursor contains a light to heat converting agent having the ability to convert optical energy to heat energy.

The light to heat converting agent that may be comprised in the planographic printing plate precursor of the present invention can be selected from every substances capable of absorbing light which is not shorter than 700 nm to convert light into heat. The light to heat converting agent is not specifically defined, and therefore, various pigments and dyes are usable for the light to heat converting agent. Especially preferable substances are dyes, pigments, metal powders and metal compound powders capable of effectively absorbing IR light in a range of from 760 nm to 1200 nm.

As the pigments usable and preferable for the light to heat converting agent in this embodiment, those mentioned above can be usable and referred to.

In case where the pigment is added to the image forming layer in the present invention, it is desirable that the pigment particles are coated with a hydrophilic resin or silica sol since the particles coated by the resin are uniformly dispersed in the water-soluble or hydrophilic resin which is a matrix of the image forming layer, and do not interfere the hydrophilicity of the matrix. In particular, carbon black particles treated with such a coating are very useful, as they are suitable for exposure to IR-emitting laser.

Preferably, the particle size of the pigment particles is from 0.01 to 1 µm, and more preferably 0.01 to 0.5 µm. As dispersing the pigment in the desired layer, any known dispersion technique generally used in ink production or toner production is employable. As the dispersing machine to be used for the purpose, those mentioned above are usable and referred to.

The dyes usable as the light to heat converting agent in the present invention may be commercial dyes and other known dyes described in literature (e.g., Dye Handbook (edited by the Association of Organic Synthetic Chemistry of Japan, 1970); Chemical Industry, May 1986, pp. 45-51, "Near-IR Absorbing Dyes"; Development and Market Trend of Functional Dyes in 1990s, Chap. 2, Sec. 2.3 (by CMC, 1990)) or in patent specifications.

Concretely, as the dyes usable and preferable herein, those mentioned above are usable and referred to. In addition, also usable dye are the dyes described in U.S. Pat. No. 4,756,993; cyanine dyes described in U.S. Pat. No. 4,973,572; the dyes described in JP-A No. 10-268512; and phthalocyanine compounds described in JP-A 11-235883.

Preferable commercial products to be used as the dye are EPOLITE III-178, EPOLITE III-130 and EPOLITE III-125 manufactured by Epolin, Ltd.

Above all, dyes having a water-soluble functional group are especially preferable as a dye added to the hydrophilic image forming layer. Some examples of the dyes are mentioned below, however, the present invention is not limited thereto.

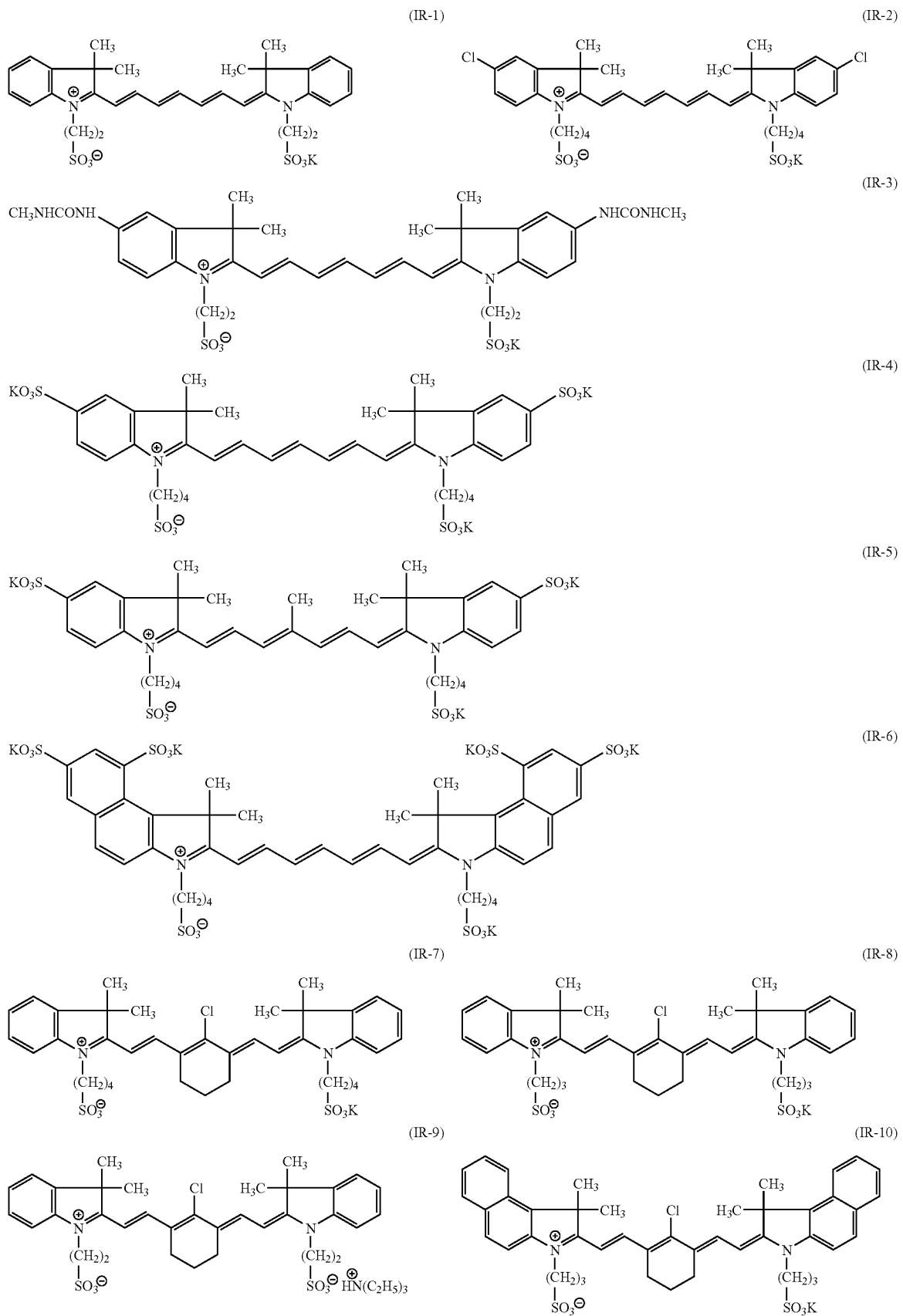

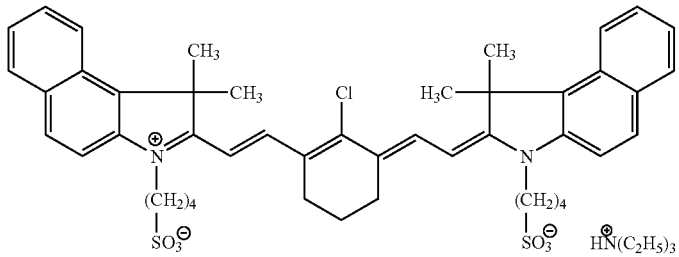

(IR-11)

When dye and/or pigment is used as the light to heat converting agent, the amount of the dye or pigment added to the thermo-sensitive layer is at most 30% by weight, preferably from 3 to 25% by weight and more preferably from 4 to 20% by weight of the total solid content of the layer. Within the range, the layer has good sensitivity.

The thermo-sensitive layer of the present invention may contain metal particles as a light to heat converting agent. Most metal particles have the capability of light to heat conversion, and are self-exothermic material. Preferable metal particles for use herein are particles of simple metals or alloys of, for example, Si, Al, Ti, V, Cr, Mn, Fe, Co, Ni, Cu, Zn, Y, Zr, Mo, Ag, Au, Pt, Pd, Rh, In, Sn, W, Te, Pb, Ge, Re, Sb, or their oxides or sulfides.

Among the metals to form the metal powders, especially preferable metals are those capable of thermally fusing into aggregates when it is exposed to light, those having a melting point of about 1000° C. or lower and those capable of absorbing visible light, UV light or IR light. Examples thereof include Re, Sb, Te, Au, Ag, Cu, Ge, Pb and Sn.

More preferable examples are those having a relatively low melting point and having a relatively high IR absorbance such as metal powders of Ag, Au, Cu, Sb, Ge and Pb; and most preferable are Ag, Au and Cu.

Two or more different types of light to heat converting substances may be combined used for the present invention. For example, mixtures of low-melting-point metal particles such as those of Re, Sb, Te, Au, Ag, Cu, Ge, Pb and Sn, and self-exothermic metal particles such as those of Ti, Cr, Fe, Co, Ni, W and Ge may be used. Also preferable is combination of particles having an especially high-level light absorption such as those of Ag, Pt or Pd and metal particles of any other metal.

In case where the metal (compound) particles described above are used as the light to heat converting agent, it is desirable that the surfaces of the metal particles are hydrophilicated, since the hydrophilicated metal particles are more effective.

In order to provide hydrophilicity to their surfaces, for example, the particles can be surface-treated with a hydrophilic compound, which can be adsorbed by the particles, such as a surfactant; or the particles can be surface-treated with a substance having a hydrophilic group which can react with the constituents of the particles; or the particles can be coated with a hydrophilic polymer film of protective colloid. Preferably, the surfaces of the metal particles are treated with a silicate. For example, the surface of iron particles can be fully hydrophilicated by a method of dipping the particles in a 31 aqueous solution of sodium silicate at 70° C. for 30 seconds. Other metal particles can be also subjected in the same manner.

Preferably, the size of the metal particles that are used as a light to heat converting agent is at most 10 μm, more preferably 0.003 to 5 μm, and most preferably 0.01 to 3 μm. Within the range, the particles ensure good sensitivity and good image resolution.

In case where such metal particles are used as the light to heat converting agent herein, the amount of the particles to be added to the image forming layer is at least 5% by weight, and preferably from 10 to 50% by weight of the solid content of the layer. Within the range, the layer can have high sensitivity.

The light to heat converting agent can be comprised in any other layer instead of within the image forming layer. For example, the light to heat converting agent can be comprised in the undercoat layer just below the image forming layer, or in a water-soluble overcoat layer that will be described hereinafter. When at least one of the image forming layer, the undercoat layer or the overcoat layer contains the light to heat converting agent, the IR absorption efficiency of the printing plate precursor increases and the sensitivity thereof increases.

B-2-1-4. Other Components:

If desired, any other and various compounds may be added to the image forming layer of the planographic printing plate precursor of the present invention, in order that the layer may have various properties.

Inorganic Particles:

Inorganic particles may be added to the image forming layer of the present invention. Preferable examples of the inorganic particles include silica, alumina, magnesium oxide, titanium oxide, magnesium carbonate, calcium alginate and their mixtures. Even if they do not serve as a light to heat converting agent, these inorganic particles are effective for reinforcing the film and for roughening the surface of the film to improve an interfacial adhesive property of the film.

Preferably, the particle size of the inorganic particles is 5 nm to 10 μm, and more preferably 10 nm to 1 μm. Within the range, the inorganic particles can stably disperse in hydrophilic resin along with other resin particles and metal particles serving as a light to heat converting agent, and the image forming layer can have sufficient film strength and, as a result, a non-image area having high hydrophilicity resistant with respect to printing stains can be formed.

These inorganic particles are easily available on the market as commercial products such as colloidal silica dispersions. The amount of the inorganic particles to be comprised in the image forming layer is preferably from 1.0 to 70% by weight, and more preferably from 5.0 to 50% by weight of the total solid content of the layer.

Colorant and Plasticizer:

The image forming layer of the planographic printing plate precursor of the present invention may contain a colorant and a plasticizer, like that mentioned above. Those mentioned above as preferable examples are also usable and referred to.

Solvent:

In case where microcapsules are added to the image forming layer, a solvent capable of dissolving the compound encapsulated in the microcapsules and capable of swelling the capsule wall material may be added to the dispersant of the microcapsules. The solvent promotes the diffusion of the encapsulated, thermo-reactive functional group-having hydrophobic compound, out of the microcapsules.

Selection of the solvent depends on the dispersing medium for the microcapsules, the wall material for the microcapsules, the wall thickness and the contents of the microcapsules, and the solvent may be readily selected from many commercial products. For example, for water-dispersible microcapsules wherein the walls are made of crosslinked polyurea or polyurethane, the solvent is preferably selected from alcohols, ethers, acetals, esters, ketones, polyalcohols, amides, amines and fatty acids.

Concrete examples of the solvent includes methanol, ethanol, tert-butanol, n-propanol, tetrahydrofuran, methyl lactate, ethyl lactate, methyl ethyl ketone, propylene glycol monomethyl ether, ethylene glycol diethyl ether, ethylene glycol monomethyl ether, γ-butyrolactone, N,N-dimethylformamide and N,N-dimethylacetamide. However, the present invention is not limited thereto. If desired, two or more of solvents may be combined in order for using herein.

A solvent which can not be dissolved in the microcapsule dispersion by itself, but can dissolved therein when the solvent is combined with other solvent mentioned above may also be used. The amount of the solvent is determined, depending on a combination of other materials. However, if the amount of the solvent is lower than a proper amount, the image formation can not be carried out satisfactory; but if too large, the dispersion is unstable. In general, the amount of the solvent is preferably from 5 to 95% by weight, more preferably 10 to 90% by weight, and even more preferably from 15 to 85% by weight of the coating liquid for the image-recording layer.

Reaction Initiator, Reaction Promoter:

In case where microcapsules of a thermo-reactive functional group-having compound or polymer particles having thermo-reactive functional group are used in the image forming layer of the present invention, a compound having the ability to initiate or promote the reaction of the thermo-reactive functional group-having compound may be added to the layer, if desired. Examples of the compound which can initiate or promote the reaction comprise a compound that generates a radical or cation when exposed to heat. Concrete examples thereof include lophine dimers, trihalomethyl compounds, peroxides, azo compounds, onium salts such as diazonium salts or diphenyliodonium salts, acylphosphines and imidosulfonates.

Preferably, the amount of the compound to be added to the image forming layer is from 1 to 20% by weight, and more preferably 3 to 10% by weight of the solid content of the layer. Within the range, the compound can be effective for initiating or promoting the reaction, and do not detracting from the in-printer developability of the printing plate precursor.

Formation of Image forming Layer Used in the Present Invention:

In the present invention, the image forming layer can be formed by dissolving or dispersing the necessary components as above in water or in a mixed solvent optionally containing an organic solvent to prepare a coating liquid, followed by applying the coating liquid onto a substrate. The solid content concentration of the coating liquid for forming the image forming layer is preferably from 1 to 50%.

If desired, a surfactant may be added to the coating liquid for the image forming layer for improving the coatability of the liquid and for improving the properties of the coating film. As the surfactant and its preferable examples, those mentioned above are also usable and referred to. As the coating method and examples thereof, also referred to and usable are mentioned above.

The amount (solid content) of the image forming layer formed on the substrate after coating and drying in that manner varies depending on the use of the printing plate produced. Generally, however, the amount is preferably 0.5 to 5.0 g/m$^2$, and more preferably from 0.5 to 2.0 g/m$^2$.

(C) Compound that is Capable of Forming Hydrophobic Surface Region through Exposure to Heat or Radiation of the Present Invention:

The compound having the function of image formation, which may be added to any of the hydrophilic layer of the present invention, is a compound forms a hydrophobic surface region by application of heat, or by irradiation with radiation. The compound may be comprised in the hydrophilic layer. Examples thereof includes a compound wherein the property thereof can change from hydrophilic to hydrophobic by application of heat, or by irradiation with radiation, and thermo-fuseable hydrophobic particles.

C-1. Compound that is Changing from Hydrophilic to Hydrophobic:

One example of the compound that changes from hydrophilic to hydrophobic is a polymer having a functional group capable of being decarboxylated through application of heat to change from hydrophilic to hydrophobic, described in JP-A No. 2000-122272 (Japanese Patent Application No. 10-229783). Preferable examples of the polymer are mentioned below. Regarding the physical properties of the polymer of the type, it is desirable that, when the polymer is formed into a film, the contact angle between the polymer film surface and a water drop in air (a airborne water drop) is at most 20° before the film is heated, but increases to at least 65° after the film has been heated. However, the present invention is not limited to it.

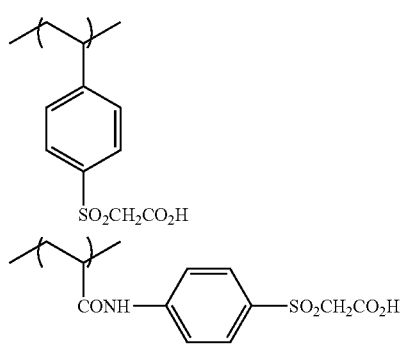

-continued

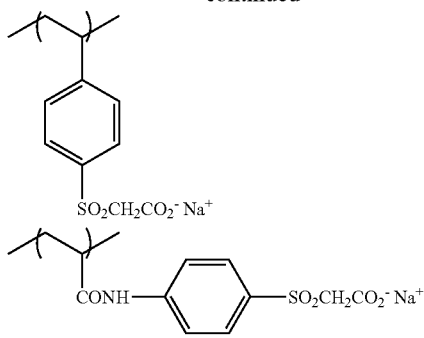

Examples of the polymer having a functional group capable of changing from hydrophilic to hydrophilic in the side chains (in the present invention, the description of "in the side chains" may contains a meaning of "as the side chain") include those of the polymer compound having, in the side chains, a functional group capable of changing from hydrophilic to hydrophilic, described above in B-2 in the section of the present invention. As the preferable examples of the polymer of the type employable herein, those mentioned in B-2 are also preferable.

C-2. Thermo-Fuseable Hydrophobic Particles:

Examples of the thermo-fuseable hydrophobic particles usable in the present invention include polystyrene particles described in EP No. 816070. In addition, microcapsules of hydrophobic particles described in WO94/23954 are also usable herein for the same purpose.

The thermo-fuseable hydrophobic particles that can serve as an image forming component in the hydrophilic layer of the present invention fuse and bond to each other, when heated or when exposed to IR laser light and heated due to the exposure, and they form a hydrophobic region (ink-receiving region, image region). The particles are those of a hydrophobic organic compound.

In order that the particles rapidly fuse when they are applied predetermined heat, it is desirable that the hydrophobic organic compound has a melting point (thermo-fuseable temperature) of from 50 to 200° C. If the thermo-fusing temperature of the thermo-fuseable hydrophobic particles is lower than 50° C., it is unfavorable since the particles may soften or fuse owing to the influence of heat provided thereto while the coating film is dried in the process of producing the plate precursor or owing to the influence of the ambient temperature thereon during storage. Preferably, the thermo-fusing temperature of the particles is not lower than 80° C., more preferably not lower than 100° C. in consideration of the storage stability of the precursor. The particles having a higher melting point are more stable. However, from the viewpoint of the recording sensitivity and the handlability of the precursor, the melting point of the particles is preferably not higher than 200° C.

Concrete examples of the hydrophobic organic compound to form the thermo-fuseable hydrophobic particles includes resins such as polystyrene, polyvinyl chloride, polymethyl methacrylate, polyvinylidene chloride, polyacrylonitrile, polyvinyl carbazole, and their copolymers or mixtures. Also preferable examples thereof include paraffin wax, microcrystalline wax; polyolefin wax such as polyethylene wax and polypropylene wax; fatty acid wax such as stearamide, linolenamide, laurylamide, myristylamide, palmitamide and oleamide; and higher fatty acids such as stearic acid, tridecanoic acid and palmitic acid.

Among thermo-fuseable hydrophobic particles as the image forming components to be in the hydrophilic layer of the present invention, preferable component is thermo-fuseable hydrophobic particles of the hydrophobic organic compound mentioned above, which can readily fuse and aggregate when heated, in view of their ability of image formation. In particular, more preferable particles are those having hydrophilic surfaces and capable of readily dispersing in water since they do not lower the hydrophilicity of the layer containing them.

Regarding the hydrophilicity of the surfaces of the thermo-fuseable hydrophobic particles, it is desirable that, when liquid containing the thermo-fuseable hydrophobic particles alone are applied onto a substrate and dried at a temperature lower than the solidifying temperature of the particles, the contact angle of the thus-formed film (to a water drop in air) is smaller than the contact angle of a film of the particles (to a water drop in air) wherein a drying temperature thereof is higher than the solidifying temperature of the particles. In order that the surface hydrophilicity of the thermo-fuseable hydrophobic particles satisfies the preferable condition, a hydrophilic polymer or oligomer such as those of polyvinyl alcohol or polyethylene glycol, or a hydrophilic low-molecular compound can be adsorbed in the surfaces of the thermo-fuseable hydrophobic particles. However, the method of hydrophilicating the surfaces of the thermo-fuseable hydrophobic particles is not limited thereto, and any known surface-hydrophilicating methods are employable for the purpose.

Preferably, the mean particle size of the thermo-fuseable hydrophobic particles is from 0.01 to 20 μm, more preferably 0.05 to 2.0 μm, most preferably 0.1 to 1.0 μm. If their mean particle size is too large, the resolution of the precursor will be lower; but if too small, the storage stability of the precursor will be low.

The amount of the thermo-fuseable hydrophobic particles to be used in the hydrophilic layer is preferably from 30 to 98% by weight, more preferably 40 to 95% by weight of the solid content of the layer.

In the planographic printing plate precursor of the present invention, the hydrophilic layer having the function of image formation may contain, if desired, any other various compounds for getting various properties.

Light to Heat Converting Substance:

In case where the planographic printing plate precursor of the present invention is processed through scanning exposure to laser light for forming image thereon, it is desirable that the precursor contains somewhere therein a light to heat converting substance having the ability to convert optical energy to heat energy. The details of the light to heat converting substance are the same as those mentioned above. The precursor may contain a light to heat converting substance in any position such as the hydrophilic image forming layer, the surface layer of the substrate or the substrate itself. Apart from these sites, the light to heat converting substance may also be added to a thin layer that may be formed between the substrate surface layer and the substrate.

Thus produced, the planographic printing plate precursor of the present invention may be exposed and developed in any known manner into a planographic printing plate, and this is used in producing a large number of prints.

Regarding the mechanism of image formation on the planographic printing plate precursor of the present invention, a compound such as thermo-fuseable hydrophobic particles which are capable of forming a hydrophobic surface region fuses to each other in the region of the hydrophilic layer wherein heat is applied or radiation is irradiated to form a hydrophobic region which is an ink-receiving image region. On the other hand, in the region of the hydrophilic layer wherein heat is not applied or radiation is not irradiated, the hydrophilic layer remains as it is, and forms a non-image region of high hydrophilicity. Therefore, the printing plate precursor of this embodiment realizes superior in-printer developability, and thereby merely requiring simple treatment with water or not requiring any specific wet development at all, and it can be directly set in a printer and processed into a printing plate.

Regarding the process of image formation on the planographic printing plate precursor of the present invention, the methods and the conditions mentioned hereinabove can be also used.

In the present invention, due to imagewise-exposure, the hydrophilic layer of the precursor can have a hydrophobic region converted by heat and a hydrophilic region still having the original hydrophilicity. In that condition, the precursor can be directly set in a printer, in which the precursor receives ink and dampening water in an ordinary order, and comes to serve as a printing plate to produce prints. The planographic printing plate precursor of the present invention can be set in a printer equipped with an exposing device, and it can be exposed to light to form an image portion thereof in the printer.

Overcoat Layer:

In the present invention, a hydrophilic overcoat layer may be formed on the image forming layer of the planographic printing plate precursor for protecting the hydrophilic surface of the image forming layer from being contaminated with oleophilic substances while the precursor is stored and for protecting it from being contaminated with fingerprints while the precursor is handled by hand.

The hydrophilic overcoat layer can be readily removed while the precursor is processed in printers, and the layer contains a resin selected from water-soluble resins and water-swellable resins which is partially crosslinked the water-soluble resins.

Examples of the water-soluble resins include water-soluble natural polymers and water-soluble synthetic polymers. They have an ability to form a film when applied onto the image forming layer and dried thereon, and are used alone or along with a crosslinking agent.

Examples of the water-soluble resins which are preferable for use in the present invention include natural polymers such as gum arabic, water-soluble soybean polysaccharides, cellulose derivatives (e.g., carboxymethyl cellulose, carboxyethyl cellulose, methyl cellulose) and their modified derivatives, white dextrin, pullulan, enzymolysis etherified dextrin; and synthetic polymers such as polyvinyl alcohols (prepared by hydrolyzing polyvinyl acetates to a degree of at least 65%), polyacrylic acids and their alkali metal salts and amine salts, polyacrylic acid copolymers and their alkali metal salts and amine salts, polymethacrylic acids and their alkali metal salts and amine salts, vinyl alcohol/acrylic acid copolymers and their alkali metal salts and amine salts, polyacrylamides and their copolymers, polyhydroxyethyl acrylates, polyvinyl pyrrolidones and their copolymers, polyvinyl methyl ethers, vinyl methyl ether/maleic anhydride copolymers, poly-2-acrylamido-2-methyl-1-propane-sulfonic acids and their alkali metal salts and amine salts, poly-2-acrylamido-2-methyl-1-propanesulfonic acid copolymers and their alkali metal salts and amine salts. If desired, two or more of these resins may be combined for use herein. However, the present invention is not limited to these examples.

In case where at least one water-soluble resin is partially crosslinked and the resin is applied onto the image forming layer to form an overcoat layer, crosslinking is carried out at the reactive functional group of the water-soluble resin. The crosslinking may be any one of covalent bond crosslinking and ionic bond crosslinking.

Due to the crosslinking, the surface adhesiveness of the overcoat layer lowers and the handlability of the planographic printing plate precursor having the overcoat layer is improved. However, if the polymer is too much crosslinked, the hydrophilicity of the overcoat layer lowers, and eliminate of the overcoat layer is difficult when the precursor is processed in printers. Therefore, in case where a crosslinking agent is used along with the resin to form the overcoat layer, it is desirable that the crosslinking reaction is controlled to achieve a suitable degree of partial crosslinking. The preferable degree of partial crosslinking of the resin is as follows. When the planographic printing plate precursor coated with the overcoat layer comprising the partially crosslinked resin is dipped in water at 25° C., the hydrophilic overcoat layer remains as it is for 30 seconds to 10 minutes without elution, but elution thereof is shown after 10 minutes or more.

The compound to be used for the crosslinking reaction (crosslinking agent) may be any known polyfunctional compound having the ability of crosslinking. Examples thereof include polyepoxy compounds, polyamine compounds, polyisocyanate compounds, polyalkoxysilyl compounds, titanate compounds, aldehyde compounds, polyvalent metal salt compounds, and hydrazines.

One or more different types of crosslinking agents may be used herein singly or in combination of two or more. Especially preferable examples for use herein include water-soluble crosslinking agents. However, water-insoluble crosslinking agents can also be used, by dispersing them in water with a dispersant.

Especially preferable combinations of the water-soluble resin and the crosslinking agent are carboxylic acid-containing water-soluble resin/polyvalent metal compound, carboxylic acid-containing water-soluble resin/water-soluble epoxy resin, hydroxyl group-containing resin/dialdehyde and the like.

Preferably, the amount of the crosslinking agent to be added to the water-soluble resin is from 2 to 10% of the resin. Within the range, the overcoat layer has good resistant to water, and the layer is readily removed when the plate is processed in printers.

If desired, the overcoat layer may contain a light to heat converting agent for improving the sensitivity of the printing plate precursor. As the light to heat converting agent, preferable agents are water-soluble IR-absorbing dyes. Especially preferable dyes are those represented by the general formulae shown above in the description of the image forming layer.

In case where the coating liquid for the overcoat layer is an aqueous solution, a surfactant, typically a nonionic surfactant, may be added thereto in order for forming a uniform film of the layer. Examples of the nonionic surfactant include sorbitan tristearate, sorbitan monopalmitate, sorbitan trioleate, stearinomonoglyceride, polyoxyethylene nonylphenyl ether, and polyoxyethylene dodecyl ether.

The amount of the nonionic surfactant that may be comprised in the overcoat layer is preferably from 0.05 to 5%, more preferably from 1 to 3% of the total solid content of the layer.

The thickness of the overcoat layer is preferably 0.1 μm to 4.0 μm, and more preferably 0.1 μm to 1.0 μm when the water-soluble resin for the layer is not crosslinked. On the other hand, when the water-soluble resin is partially crosslinked, the thickness of the overcoat layer is preferably 0.1 to 0.5 μm, and more preferably 0.1 to 0.3 μm. Within the range, the overcoat layer is well effective for preventing the image forming layer from being stained by oleophilic substances and is readily removed while processed in printers.

Method of Image Formation of the Present Invention:

The planographic printing plate precursor thus produced of the present invention may be exposed and developed in any known method into a planographic printing plate, and this is used in producing a large number of prints.

Image formation of the planographic printing plate precursor is achieved by heat. In case where the precursor contains a light to heat converting material, the precursor can be heated through scanning exposure to IR laser light and the like which is applied for image formation.

Concretely, the image formation includes direct imagewise recording with thermal recording head; scanning exposure to IR laser light; high-intensity flash exposure to xenon discharge lamp; and exposure to IR lamp. Preferred is exposure to light of high-power solid IR laser such as 700-1200 nm IR semiconductor laser or YAG laser.

An image may be formed on the planographic printing plate precursor of the present invention through exposure to laser light having an output power of from 0.1 to 300 W. In case where a pulse laser is used for the image formation, its peak power is preferably 1000 W, more preferably 2000 W. The face exposure intensity before modulation on the printing image is preferably from 0.1 to 10 $J/cm^2$, more preferably from 0.3 to 1 $J/cm^2$. In case where the substrate of the printing plate precursor is transparent, the precursor may be exposed to light applied thereto through the back surface of the substrate.

After the precursor is imagewise-exposed but it is not further processed, the planographic printing plate precursor of the present invention may be directly set in a printer. The precursor, which is set, is developed by an ordinary printing operation wherein damping water, ink and printing paper are applied thereto, and then successively used to produce prints.

The planographic printing plate precursor of the present invention can also be used in a printing system in which the precursor is set on a printing cylinder of a printer, then exposed to laser light mounted on the printer, successively developed in the printer and used to produce prints.

Substrate (Support):

The substrate used for the planographic printing plate precursor in the present invention is not specifically defined, and may be any one which is tabular substrate having good dimensional stability that satisfies a required strength, durability and flexibility. Examples thereof includes paper, paper laminated with plastic (e.g., polyethylene, polypropylene, polystyrene), metal sheets (e.g., aluminium, zinc, copper), plastic films (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal), metal-laminated or deposited paper and plastic films described above.

Preferable examples thereof include polyester films and aluminium plates, and more preferable substrates are aluminum plates, since their dimensional stability is good and they are relatively inexpensive.

Preferably, the aluminium plates for use in the present invention may be pure aluminum plates or aluminium-based alloy plates containing trace amount of hetero elements. Aluminium-laminated or deposited plastic films or papers are also preferable. Examples of the hetero elements that may be comprised in the aluminium alloy include silicon, iron, manganese, copper, magnesium, chromium, zinc, bismuth, nickel, and titanium. Content of the hetero elements comprised in the alloy is at most 10% by weight. In the present invention, pure aluminium is preferable as the substrate. However, it is difficult to produce 100% pure aluminum in view of the smelting technology. Therefore, aluminum containing trace amount of hetero elements is usable for the substrate. The aluminum plate used for the substrate in the present invention is not specifically defined in point of its composition, and any known aluminium plate generally used in the art is usable herein. The thickness of the aluminium plate for use in the present invention is approximately from 0.1 mm to 0.6 mm, preferably 0.15 mm to 0.4 mm, and more preferably 0.2 mm to 0.3 mm.

An aluminum plate used as the substrate may be subjected to a surface treatment, such as a surface roughening treatment and an anodic oxidation treatment, depending on necessity. The surface treatment will be briefly described below.

Before surface roughening of the aluminum plate, a degreasing treatment is carried out with a surfactant, an organic solvent or an alkaline aqueous solution, in order to remove a rolling oil from the surface of the plate. The surface roughening treatment of the surface of the aluminum plate may be carried out by various methods. For example, it may be carried out by a method of mechanically roughening, a method of electrochemically dissolving and roughening the surface, and a method of chemically and selectively dissolving the surface. As the mechanical method, a known method such as a ball grinding method, a brush grinding method, a blast grinding method and a buff grinding method can be used. Examples of the electrochemical surface roughening method include a method wherein a plate is treated in a hydrochloric or nitric acid electrolytic solution with an alternating current or a direct current. A method combining both methods disclosed in JP-A No. 54-63902 may also be utilized.

The aluminum plate having a surface thus roughened is subjected, depending on necessity, to an alkaline etching treatment and a neutralizing treatment, and then it is subjected to an anodic oxidation treatment optionally in order to improve the water holding capacity and the wear resistance of the surface. As an electrolyte used for the anodic oxidation treatment of the aluminum plate, various kinds of electrolytes that form a porous oxide film can be used. In general, sulfuric acid, phosphoric acid, oxalic acid, chromic acid and a mixed acid thereof are used as the electrolyte. The concentration of the electrolyte is suitably determined depending on the kind of the electrolyte.

The treating conditions of the anodic oxidation cannot be necessarily determined because they are variously changed by the electrolyte used. However, in general, it is suitable when the concentration of the electrolyte is from 1 to 80% by weight, the liquid temperature is from 5 to 70° C., the electric current density is from 5 to 60 $A/dm^2$, the voltage is from 1 to 100 V, and the electrolysis time is from 10 seconds to 5 minutes. When the amount of the anodic oxidized film is less than 1.0 g/m², the printing durability becomes insufficient, and the non-image part of the planographic printing plate is liable to be damaged, whereby the so-called "flaw contamination" is tend to occur by attaching an ink to the flaw upon printing.

In the present invention, in addition to aluminum, paper laminated with plastics (for example, polyethylene, polypropylene and polystyrene), a metal plate (for example, aluminum, zinc and copper), a plastic film (for example, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate and polyvinyl acetal), and paper or a plastic film having the foregoing metals laminated thereon or vapor-deposited thereon are also used as a substrate.

The aluminum plate used for the substrate may be treated optionally by ordinary methods such as surface roughening treatment or anodic oxidation.

When plastic film such as polyester film is used as the substrate, it is also preferable that the surface of the film to be coated with a hydrophilic layer in the present invention is roughened in an ordinary manner, in order for facilitating the formation of the hydrophilic layer thereon and for improving the adhesiveness between the hydrophilic layer and the image forming layer to provided thereon.

The surface properties of the surface-roughened substrate preferably satisfy the following requirements.

The preferable condition of the surface-roughened substrate is indicated by two-dimensional roughness parameters which are as follows. Preferably, the substrate satisfies at least one, more preferably all of the requirements of two-dimensional roughness parameters: The center line mean roughness (Ra) is from 0.1 to 1 µm; the maximum height (Ry) is from 1 to 10 µm; the ten-points mean roughness (Rz) is from 1 to 10 µm; the concave-to-convex mean distance (Sm) is from 5 to 80 µm; the convex-to-convex mean distance measured in the predetermine range(S) is from 5 to 80 µm; the maximum height (2) (Rt) is from 1 to 10 µm; the center line convex height (Rp) is from 1 to 10 µm; and the center line concave depth (Rv) is from 1 to 10 µm.

The two-dimensional roughness parameters are defined as follows:

Centerline Mean Roughness (Ra):

A length L is measured in the direction of the centerline from a roughness curve. Absolute values of the variation of length from the roughness curve to the centerline are arithmetically averaged. The arithmetic average indicates the centerline mean roughness (Ra).

Maximum Height (Ry):

A predetermined length is determined in the direction of the average of the roughness curve, and within the length, the distance between convex (crest) line and concave (trough) line is measured in the direction of the longitudinal magnification of the roughness curve. This distance indicates the maximum height (Ry).

Ten-Point Mean Roughness (Rz):

A predetermined length is determined in the direction of the average of the roughness curve. Within the length, each height of convex portion which is highest to convex portion which is fifth, and each depth of concave portion which is lowest to convex portion which is fifth are measured in the direction of the longitudinal magnification of the mean line. The average value (Yp) of the absolute values of the height of the first to fifth highest convex, and the average (Yv) of the absolute values of the depth of the first to fifth deepest concave are summed up. The sum of the two average values indicates the ten-point mean roughness (Rz) having a unit of micrometer (µm).

Concave-to-Convex Mean Distance (Sm):

A predetermined length is determined in the direction of the average of the roughness curve. Within the length, each of lengths of the mean line between one convex portion and the concave portion neighboring to the convex portion are measured and summed up. Obtained value is arithmetically averaged. The arithmetic average indicates the convex-to-concave mean distance (Sm) having a unit of micrometer (µm).

Convex-to-Convex Mean Distance Measured in the Predetermine Range (S):

A predetermined length is determined in the direction of the average of the roughness curve. Within the length, each of lengths of the mean line between the neighboring convex portions (crests) is measured. All the lengths thus measured are arithmetically averaged. The arithmetic average value indicates the convex-to-convex mean distance (S) having a unit of micrometer (µm).

Maximum Height (2) (Rt):

A predetermined length is determined in the direction of the average of the roughness curve. Within the length, the centerline in the determined length is sandwiched between two straight lines both parallel to the centerline, and the distance between the two straight lines is measured. This indicates the maximum height (2) (Rt).

Center Line Convex Height (Rp):

A length L is measured in the direction of the centerline from a roughness curve. Within the length, a straight line tangent to the highest convex peak and parallel to the centerline is drawn, and the distance between the straight line and the centerline is measured. This indicates the center line convex height (Rp).

Center Line Concave Depth (Rv):

A length L is measured in the direction of the centerline from a roughness curve. Within the length, a straight line tangent to the deepest concave bottom and parallel to the centerline is drawn, and the distance between the straight line and the centerline is measured. This value indicates the center line valley depth (Rv).

Method of Surface Roughening Treatment of Substrate

In order to treat the surface of the substrate by the surface roughening treatment, various known methods can be employed. Examples thereof include a method in which the surface of the substrate is mechanically ground by sand blast or brush to form concave parts for surface roughening, a method in which unevenness is formed by mechanical embossing, and a method in which convexes are formed on the surface by gravure printing. In addition to these surface roughening methods wherein the surface of the substrate itself is physically processed, it is also possible to use a method wherein a layer containing solid fine particles (matting agent) is formed on a surface of a substrate by coating, printing or the like, so as to effect surface roughening. The solid fine particles may be contained in a plastic material in the step of forming the plastic film (internal addition), and then unevenness is formed on the surface when the plastic material is shaped into a film form. Furthermore, the surface roughening can be carried out by using known surface treating method, such as a solvent treatment, a corona discharge treatment, a plasma treatment, an electron beam irradiation treatment and an X-ray irradiation treatment. The foregoing methods may be carried out singly or may be used in combination of two or more.

Among these treatments, the method of forming a roughened surface by sand blast or printing a resin, and a method of forming unevenness by adding solid fine particles into the film material are particularly preferable, and preferably carried out.

Surface Roughening Method by Solid Fine Particles

As the solid fine particles used for forming unevenness on the film, various kinds of substances such as metal fine particles, metal oxide fine particles, and organic or inorganic polymer material fine particles or low molecular weight material fine particles can be utilized. Specific examples of the fine particles include copper powder, tin powder, iron powder, zinc oxide powder, silicon oxide powder, titanium oxide powder, aluminum oxide powder, molybdenum disulfide powder, calcium carbonate powder, clay, mica, corn starch, boron nitride, silicone resin particles, polystyrene resin particles, fluorine resin particles, acrylic resin particles, polyester resin particles, acrylonitrile copolymer resin particles, zinc stearate and calcium behenate.

The average particle diameter of the fine particles is preferably 0.05 µm or more, and more preferably 0.1 µm or more. In the case where the fine particles are attached to the surface of the sheet as the substrate, or a layer containing the fine particles is provided on the surface of the sheet, the average particle diameter of the fine particles substantially corresponds to the size of the unevenness of the roughened surface. In the case where the fine particles are internally added to the sheet, the average particle diameter of the fine particles and the thickness of the sheet determined the size of the unevenness of the roughened surface. Therefore, in order to obtain optimum size of unevenness in the later case (internal addition), it is necessary that the optimum particle diameter be experimentally determined in accordance with combinations of the sheets and the fine particles.

Specific examples of the method of forming unevenness by fixing the solid fine particles on the surface of the substrate include a method in which the solid fine particles are added as a material before forming the film, and then the film is formed, a method in which a liquid containing the solid fine particles dispersed in a binder is coated and dried, a method in which after forming the film, the fine particles are pressed into the film with mechanical pressure, and a method in which the solid fine particles are electrically attached after forming the film.

Specific examples of the method, in which the solid fine particles are added before forming the film and then the film is formed, include the following methods. A master batch of polyethylene terephthalate (PET) containing a pigment mixed as the solid fine particles is subjected to melt extrusion, and then a film thereof is provided on a cooling drum. Then, the film is stretched in a longitudinal direction and stretched sequentially in a transversal direction, and finally it is subjected to a heat treatment, whereby a PET film having unevenness is obtained. As the pigment, one or two or more kinds of inorganic pigments, such as titanium oxide, alumina and silica, can be used. The centerline average surface roughness of the film can be adjusted by the particle diameter and the mixing amount of the pigment used. For example, the center line average surface roughness can be adjusted by mixing a pigment having a particle diameter of from 1 to 10 µm in an amount of from 0.5 to 5% by weight, and when the particle diameter of the pigment is larger, or the mixing amount thereof is larger, the center line average surface roughness is increased. In order to obtain objective uneven surface, it is necessary that the particle diameter of the pigment is determined, and the mixing amount thereof is adjusted.

Sand Blast Method

The sand blast is a method wherein abrasives having a small particle size are blown at a high speed onto a surface of a polymer film to make unevenness on the surface of the film. Concretely, in the sand blast treatment, abrasives are blown onto the film surface by compressed air to carry out the surface treatment. The unevenness formed thereby is adjusted by the conditions of the sand blast treatment. Known methods may be used as the sand blast treatment. For example, carborundum (silicon carbide powder) or metal particles can be powerfully blown onto the film surface along with compressed air, followed by water washing and drying, so as to achieve the object.

The center line average surface roughness of the film which is processed by the sand blast treatment can be controlled by the particle diameter and the treating amount (i.e., treating frequency per unit area) of the particles to be blown. When the particle diameter of the particles is larger, or the treating amount is larger, the center line average surface roughness of the film surface is increased.

When the abrasive (grinding material) is sprayed from a sand blast blowing nozzle onto the film, the blowing amount (blast amount) of the abrasive and the angle and the distance between the sand blast blowing nozzle and the film (i.e., the blast angle and the blast distance) as the treating conditions need to be adjusted. The abrasive in a hopper is blown from the sand blast blowing nozzle with compressed air and discharged from an air chamber onto the film surface, and thus the sand blast treatment is carried out under appropriate treating conditions. The method is specifically described, for example, as known methods in JP-A No. 8-34866, No. 11-90827 and No. 11-254590.

It is necessary that the conditions of processing for the sand blast treatment are that the grinding material and ground matters do not remain on the film surface after the treatment, and the strength of the film is not lowered. Such treating conditions can be properly determined.

Concretely, silica sand or the like is used as the grinding material, and silica sand having a particle diameter of from 0.05 to 10 mm is preferably used, and silica sand having a diameter of from 0.1 to 11 mm is more preferable. The blast distance is preferably from 100 to 300 mm, and the blast angle is preferably from 45 to 90°, and more preferably from 45 to 60°. The blast amount is preferably from 1 to 10 kg/min. These conditions are set in order that the abrasive and ground matters do not remain on the plastic film surface and the like after the sand blast treatment, and the grinding depth is controlled. The grinding depth is preferably suppressed in a range of from 0.01 to 0.1 µm. In this range, phenomenon such that the strength of the film is lowered by grinding to fail to maintain the practical strength can be prevented.

Substrate for the Third Aspect:

The surface hydrophilic member (material) of the third aspect of the present invention can be obtained by coating the hydrophilic coating composition on a suitable base material, followed by heating and drying, to form a surface hydrophilic layer. The heating temperature and the heating time for forming the hydrophilic layer are not particularly limited as far as they are suitable temperature and time that can remove the solvent in the sol liquid to form a firm film.

From the standpoint of production suitability, the heating temperature is preferably 200° C. or less, and the heating time is preferably 1 hour or less.

As the base material that can be used in the third aspect of the present invention, for example, a transparent base material can be used when an anti-fogging effect is expected, and glass and plastics can be preferably used as the material. Examples of use, purpose and material, to which the member having an anti-fogging effect can be applied by the present invention, include mirrors such as a rear view mirror for a vehicle, a mirror for a bath room, a mirror for a lavatory, a mirror for dental use and a street mirror; lenses such as a lens for eyeglasses, an optical lens, a lens for a camera, a lens for an endoscope, a lens for lighting, a lens for a semiconductor and a lens for a copy machine; prisms; window glass for a building and a watchtower; window glass for a conveyance such as an automobile, a railway vehicle, an aircraft, a watercraft, a submarine, a snow vehicle, a gondola of an aerial railway, a gondola in an amusement park, and a space craft; a wind shield for a conveyance such as an automobile, a railway vehicle, an aircraft, a watercraft, a submarine, a snow vehicle, a snowmobile, a motorcycle, a gondola of an aerial railway, a gondola in an amusement park, and a space craft; glass for a protecting goggle, a sports goggle, a shield for a protecting mask, a shield for a sports mask, a shield for a helmet, and a display case for frozen foods; cover glass for a measuring instrument; and a film for attached on the surface of the foregoing articles.

In the case where the surface cleaning effect is expected in the surface hydrophilic material of the present invention, metals, ceramics, glass, plastics, wood, stone, cement, concrete, fibers, cloth, combinations thereof and laminated bodies thereof can be preferably used as the base material (substrate) of the materials. Examples of purpose, use and material to which a surface cleaning effect can be applied by the present invention include a building material, an exterior of a building, an interior of a building, a window frame, a window glass, a structural member, an exterior and painting of a conveyance, an exterior of mechanical equipment and articles, an antidust cover and painting, a traffic sign, various kinds of display devices, an advertising pillar, a sound barrier wall for a road, a sound barrier wall for a railway, a bridge, an exterior and painting of a guardrail, an interior and painting of a tunnel, an insulator, a cover for a solar cell, a collector cover for a solar water heater, a plastic hothouse, a cover for a panel lamp for a vehicle, a housing fixture, a lavatory pan, a bath tub, a washbowl, a light fixture, a cover for illumination, a kitchen equipment, a food vessel, a dish washer, a dish dryer, a sink, a cooking range, a kitchen hood, an exhaust fan, and a film for attached on the surface of the foregoing articles.

In the case where the antistatic effect is expected in the surface hydrophilic material of the third aspect of the present invention, examples which are preferably used as the substrate include metals, ceramics, glass, plastics, wood, stone, cement, concrete, fibers, cloth, combinations thereof and laminated bodies thereof. Examples of the applicable purpose, use and material include a housing, a part, an exterior and painting of a cathode ray tube, a magnetic recording medium, an optical recording medium, a magnetoopitical recording medium, an audio tape, a video tape, an analog phonograph record and a household electric equipment, a housing, a part, an exterior and painting of an office automation equipment, a building material, an exterior of a building, an interior of a building, a window frame, a window glass, a structural member, an exterior and painting of a conveyance, an exterior of mechanical equipment and articles, an antidust cover and painting, and a film for attaching on the surface of the foregoing articles.

As the substrate used for the third aspect of the present invention, a substrate having a surface formed with a polymer resin is preferably used, even if inorganic base materials such as glass and ceramics is used. Examples of the resin base material includes all of a resin itself, a substrate wherein the surface thereof is coated with a resin and a composite material having a resin layer as a surface layer.

Examples of the resin itself include a film substrate such as an anti-scattering film, a designed film and a corrosion resistant film; and a resin substrate used for an advertising display and a sound barrier wall of an express highway. Examples of the substrate having a resin coating include a body of an automobile, a coated plate such as a coated building material, a laminated plate having a resin film adhered on the surface thereof, a substrate treated with a primer, and a substrate subjected to a hardcoat treatment. Examples of the composite material having a resin layer as a surface include a resin sealing material having an adhesive layer on the back surface thereof and a reflective mirror.

EXAMPLES

Examples of the present invention are described below. However, the scope of the present invention is not limited to these examples.

Examples 1 to 3 and Comparative Example 1

Production Example 1

Production of Specific Hydrophilic Polymer 50 g of acrylamide, 3.4 g of mercaptopropyl trimethoxysilane, and 220 g of dimethylacetamide were put into a 500-ml three-neck flask, and then 0.5 g of 2,2-azobis(2,4-dimethylvaleronitrile) was added thereto at 65° C. in a nitrogen atmosphere. After the temperature was kept for 6 hours with stirring, this solution was cooled to room temperature. The solution was put into 2 liters of ethyl acetate, and the precipitated solid was taken out through filtration, and washed with water to obtain a hydrophilic polymer (1). Dry weight of the polymer was 52.4 g. Weight-average molecular weight of the polymer was measured by GPC (polystyrene standard), and the weight-average molecular weight thereof was 3000. Measurement of the polymer by $^{13}$C-NMR (DMSO-$d_6$) confirmed that the polymer has a structure of Compound 3-1 mentioned above, terminated with a trimethoxysilyl group (50.0 ppm). (General formula of the Compound 1 is shown in the examples of the specific hydrophilic polymer, wherein Compounds 1 to 12 are included.)

Example 1

Positive Planographic Printing Plate Precursor
Preparation of Substrate

An aluminum plate (material: #1050) having a thickness of 0.30 mm was degreased by washing it with trichloroethylene. Using a nylon brush and an aqueous suspension of a 400-mesh pumiston, surface of the plate was sand-grained, and then washed well with water. This plate was etched by dipping the plate in a 25% (by weight) aqueous solution of sodium hydroxide at 45° C. for 9 seconds, then washed with water, and further washed by dipping it in 2% (by weight) nitric acid for 20 seconds. Through the process, etched amount of the sand-grained surface of the plate was about 3 g/m$^2$.

Next, direct current anodic oxide film having a thickness of 2.4 g/m$^2$ is formed on the plate by using 7% (by weight) sulfuric acid as an electrolytic solution and a current density of 15 A/dm$^2$ The plate was washed with water and dried to obtain as a substrate used in the Example.

Formation of Hydrophilic Layer:

The components mentioned below were uniformly mixed, and stirred at 20° C. for 2 hours for hydrolysis. As the result, a sol-like hydrophilic coating liquid composition 1 is obtained. Hydrophilic Coating Liquid Composition 1:

| | |
|---|---|
| Hydrophilic polymer (1) | 0.21 g |
| Tetramethoxysilane (crosslinking component) | 0.62 g |
| Ethanol | 4.70 g |
| Water | 4.70 g |
| Aqueous solution of nitric acid (1 N) | 0.10 g |

This composition solution was applied onto the aluminium substrate to have a dry weight of 2 g/m$^2$, and dried at 100° C. for 10 minutes to form thereon a hydrophilic layer of an organic/inorganic composite.

The contact angle (to a water drop in air) of the surface of the hydrophilic layer thus formed was measured with CA-Z (manufactured by Kyowa Kaimen Kagaku Co., Ltd.), and was 7.9°. This result shows good hydrophilicity of the hydrophilic layer surface.

Formation of Image Forming Layer:

Using a rod bar #15, a coating liquid 1 for image forming layer mentioned below was applied onto the hydrophilic layer to have a dry weight of 1.0 g/m$^2$, and dried at 80° C. for 5 minutes to form a positive image forming layer thereon. This was a planographic printing plate precursor of Example 1.

Coating Liquid 1 for Positive Image Forming Layer, Containing Sulfonate Polymer:

| | |
|---|---|
| Sulfonate polymer [Compound (1p-4)] | 0.40 g |
| IR absorbent dye (IRG22 (trade name), manufactured by Nippon Kayaku Co., Ltd.) | 0.05 g |
| Methyl ethyl ketone | 4.00 g |

Evaluation of Planographic Printing Plate Precursor of Example 1:

Using Pearl Setter (manufactured by Presstek, Inc, IR laser which emits 908 nm light, power 1.2 W, main scanning rate is 2 m/sec), the positive planographic printing plate precursor was exposed imagewise. Without development, the exposed precursor was directly set in a printer (SOR-M manufactured by Heidelberg Co.), and printing was started. The dampening water used were IF201 (2.5%) and IF202 (0.75%) (both manufactured by Fuji Photo Film Co., Ltd.); and the ink used was GEOS-G Black (manufactured by Dainippon Ink & Chemicals, Inc.). In the initial stage of the printing, the non-image area of the image forming layer of the printing plate was removed, and high-quality prints were obtained. The printing was continued, and 6,000 or more good prints having no stain in the non-image area were obtained. This result shows that the hydrophilicity of the printing plate obtained is good and the printing durability thereof is also good.

Comparative Example 1

Positive Photosensitive Planographic Printing Plate Precursor

A positive planographic printing plate precursor was fabricated in the same manner as in Example 1, except that polyacrylamide (a weight-average molecular weight is 1,500) was used instead of the hydrophilic polymer terminated with a silane coupling group (1) comprised in the hydrophilic coating liquid composition 1. This precursor was exposed, developed and used in printing also in the same manner as in Example 1.

At the start of printing, the printing plate provided good prints having no stain in the non-image area. However, the prints were gradually stained. After 500 prints were printed, the image area and the non-image area comprised in the prints could not be differentiated. This means that the hydrophilicity of the non-image area of the printing plate gradually lowered while the printing was continued.

Example 2

Negative Thermo-Sensitive Planographic Printing Plate Precursor

The components mentioned below were uniformly mixed, and stirred at 60° C. for 2 hours for hydrolysis. As the result, a sol-like hydrophilic coating liquid composition 2 was obtained.

Hydrophilic Coating Liquid Composition 2:

| | |
|---|---|
| Hydrophilic polymer (Compound 3-9 shown above) | 0.21 g |
| Tetramethoxysilane | 0.62 g |
| Ethanol | 4.70 g |
| Water | 4.70 g |
| Aqueous solution of nitric acid (1 N) | 0.10 g |

This composition solution was applied onto the same aluminium substrate as in Example 1 to have a dry weight of 2 g/m$^2$, and dried at 100° C. for 10 minutes to form thereon a hydrophilic layer comprising an organic/inorganic composite. The hydrophilic layer-coated substrate for planographic printing plate precursor was used in the Example.

The contact angle (to a water drop in air) of the surface of the hydrophilic layer thus formed was measured with CA-Z (manufactured by Kyowa Kaimen Kagaku Co., Ltd.), and was 8.3°. This result shows good hydrophilicity of the hydrophilic layer surface.

Formation of Image Forming Layer:

Using a rod bar #15, a coating liquid 2 for image forming layer mentioned below was applied onto the hydrophilic layer to have a dry weight of 1.0 g/m$^2$, and dried at 80° C. for 5 minutes to form a negative image forming layer thereon. This was a planographic printing plate precursor of Example 2.

Coating Liquid 2 for Image Forming Layer which is Containing Sulfonylacetate Polymer:

| | |
|---|---|
| Sulfonylacetate polymer [Compound (P-9)] | 0.40 g |
| IR absorbent dye I (having a structural formula mentioned below) | 0.05 g |
| Water | 4.00 g |

IR Absorbent Dye I:

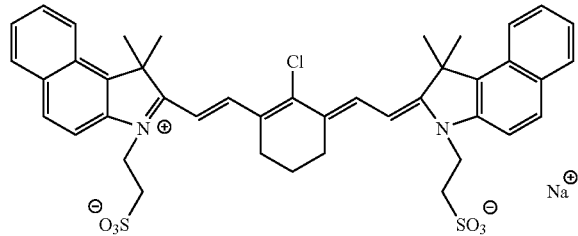

Evaluation of Planographic Printing Plate Precursor of Example 2:

Using Trend Setter 3244VFS manufactured by Creo Corp., which was equipped with a water-cooling type 40 W IR semiconductor laser, the negative planographic printing plate precursor was exposed imagewise to form an image area, which was exposed portion of the surface of the precursor. The number of revolution of outer drum was 100 rpm; the energy on the precursor surface was 300 mJ/cm$^2$; and the resolution was 2400 dpi. Without development, the thus-exposed precursor was directly set in a printer (SOR-M manufactured by Heidelberg Co.), and printing was started. The dampening water were IF201 (2.5%) and IF202 (0.75%) (both manufactured by Fuji Photo Film Co., Ltd.); and the ink used is GEOS-G Black (manufactured by Dainippon Ink & Chemicals, Inc.).

In the initial stage of the printing, high-quality images were immediately obtained. The printing was continued, and more than 5,000 good prints with no stain in the non-image area were obtained. This result shows that the hydrophilicity of the printing plate, in which a negative image forming layer was formed in the precursor, is good and the printing durability thereof is also good, like in Example 1.

Example 3

Positive Planographic Printing Plat Precursor 2

The same hydrophilic coating liquid composition 1 as in Example 1 was applied onto a substrate of corona-discharged polyethylene terephthalate film to form a hydrophilic layer thereon.

Using a rod bar #15, a coating liquid 3 for positive image forming layer mentioned below was applied onto the hydrophilic layer to have a dry weight of 1.0 g/m$^2$, and dried at 80° C. for 5 minutes to form a positive image forming layer thereon. This was a planographic printing plate precursor of Example 3.

Coating Liquid 3 for Image Forming Layer Containing Sulfonate Type Polymer:

| | |
|---|---|
| Sulfonate polymer [Compound (1p-2) shown above as an example of the sulfonate polymer | 0.40 g |
| IR absorbent dye (IRG22 (trade name) manufactured by Nippon Kayaku Co., Ltd.) | 0.05 g |
| Methyl ethyl ketone | 4.00 g |

Evaluation of Planographic Printing Plate Precursor of Example 3:

Using Pearl Setter (manufactured by Presstek, Inc, IR laser which emit 908 nm laser light, power is 1.2 W, main scanning rate is 2 m/sec), the positive planographic printing plate precursor was exposed imagewise. Without development, the thus-exposed precursor was directly set in a printer (SOR-M), and printing was started. The dampening water used were IF201 (2.5%) and IF202 (0.75%) (both manufactured by Fuji Photo Film Co., Ltd.); and the ink used is GEOS-G Black (manufactured by Dainippon Ink & Chemicals, Inc.). In the initial stage of the printing, the non-image area of the image forming layer of the printing plate was removed, and high-quality prints were obtained. The printing was continued, and more than 5,000 good prints with no stain in the non-image area were obtained. This result shows that the hydrophilicity of the printing, in which a PET film was used for the substrate, is good and the printing durability thereof is also good, like in Example 1 in which an aluminium substrate was used.

As shown in the examples, the planographic printing plates obtained from the precursor of examples 1 to 3 can maintain a high degree of hydrophilicity even in severe printing conditions, and its printing durability is good. The plate can provide a large number of good prints of high quality with no stain in the non-image area. In particular, since the image forming layer in the precursor contains a polymer compound having a polarity-converting group, the precursor can be processed through scanning exposure based on digital signals. After imagewise-exposure, the precursor can be processed into a printing plate through simple development with water, or without development, the precursor can be directly set in a printer to produce prints, and in-printer developability of the precursor is good.

Examples 2 to 6 and Comparative Examples 2

Production Example 2

Production of Specific Hydrophilic Polymer

In the same manner as in Production Example 1, the same polymer was produced.

Example 4

Preparation of Substrate:

In the same manner as in Example 1, the same substrate was prepared.

Formation of Hydrophilic Layer:

The components mentioned below were uniformly mixed, and stirred at room temperature for 2 hours for hydrolysis. As the result, a sol-like hydrophilic coating liquid composition 3 was obtained.

Hydrophilic Coating Liquid Composition 3:

| | |
|---|---|
| Hydrophilic polymer (1) | 21 g |
| Tetramethoxysilane (crosslinking component) | 62 g |
| Ethanol | 470 g |
| Water | 470 g |
| Aqueous solution of nitric acid (1 N) | 10 g |

The composition 3 was mixed with the components mentioned below to prepare a coating liquid 3 for hydrophilic layer which can form image. This liquid was applied onto the aluminium substrate to have a dry weight of 3 g/m$^2$, and dried at 100° C. for 10 minutes to form thereon a hydrophilic layer. This plate was a planographic printing plate precursor of the Example 4.

Coating Liquid 3 for Hydrophilic Layer:

| | |
|---|---|
| Hydrophilic coating liquid composition 3 | 66 g |
| Thermo-fuseable polystyrene particles (particle size, 0.2 μm; melting point, 120° C.) which was stabilized with 1.5% by weight of surfactant relative to the polymer (aqueous dispersion of 10% by weight of particles) | 400 g |
| IR absorbent dye I (mentioned above) | 10 g |
| Water | 374 g |

The contact angle (to a water drop in air) of the surface of the image forming hydrophilic layer thus formed on the substrate was measured with CA-Z (manufactured by Kyowa Kaimen Kagaku Co., Ltd.), and the angle was 6.3°. This result shows good hydrophilicity of the hydrophilic layer surface. Evaluation of Planographic Printing Plate Precursor of Example 4:

Using Trend Setter 3244VFS manufactured by Creo Corp., equipped with a water-cooling type 40 W IR semiconductor laser, the planographic printing plate precursor was exposed imagewise to form an image area, which was the exposed portion of the surface of the precursor. The outer drum revolution was 100 rpm; the energy on the precursor surface was 200 mJ/cm$^2$; and the resolution was 2400 dpi.

The water drop contact angle of the IR laser light-exposed surface of the printing plate precursor was 102°. This means that the exposed area of the precursor surface became hydrophobic, and a hydrophobic region (ink-receiving region) was formed. Without development, the imagewise-exposed precursor was directly set in a printer and used to produce prints.

The printer used is SOR-M manufactured by Heidelberg Co. The dampening water used were IF201 (2.5%) and IF202 (0.75%) (both manufactured by Fuji Photo Film Co., Ltd.); and the ink used is GEOS-G Black (manufactured by Dainippon Ink & Chemicals, Inc.). In the initial stage of the printing, high-quality images were immediately obtained. The printing was continued, and more than 5,000 good prints with no stain in the non-image area were obtained. This result shows that the hydrophilicity in the non-image region of the printing plate obtained from the precursor of this Example 4 is good and the printing durability thereof is also good.

Comparative Example 2

A positive planographic printing plate precursor was fabricated in the same manner as in Example 3, except that polyacrylamide (having a weight-average molecular weight of 1,500) was used instead of the hydrophilic polymer terminated with silane coupling group (1) comprised in the hydrophilic coating liquid composition 3, and this was exposed, developed and used in printing also in the same manner as in Example 3.

At the start of printing, the printing plate gave good prints with no stain in the non-image area. However, the prints given by the plate were gradually stained and the images therein became blurred. After 500 prints, the image area and the non-image area in the prints could not be differentiated each other. This result means that the hydrophilicity of the non-image area of the printing plate gradually lowered while the printing was continued.

Example 5

Formation of Hydrophilic Layer:

The components mentioned below were uniformly mixed, and stirred at room temperature for 2 hours for hydrolysis. As the result, a sol-like, hydrophilic coating liquid composition 4 was obtained.

Hydrophilic Coating Liquid Composition 4:

| | |
|---|---|
| Compound 3-9 (Hydrophilic polymer shown above) | 21 g |
| Tetramethoxysilane (crosslinking component) | 62 g |
| Ethanol | 470 g |
| Water | 470 g |
| Aqueous solution of nitric acid (1 N) | 10 g |

The composition 4 was mixed with the components mentioned below in order for preparing a coating liquid 2 for hydrophilic layer. This liquid was applied onto the same aluminium substrate as in Example 1 to have a dry weight of 3 g/m$^2$, and dried at 100° C. for 10 minutes to form thereon a hydrophilic layer. This was a planographic printing plate precursor of this Example 5.

Coating Liquid 2 for Hydrophilic Layer:

| | |
|---|---|
| Hydrophilic coating liquid composition 4 | 66 g |
| Sulfonylacetate polymer [Compound (p-9) which is capable of changing polarity thereof from hydrophilic to hydrophobic] | 40 g |
| IR absorbent dye I | 10 g |
| Water | 374 g |

The contact angle (to a water drop in air) of the surface of the image forming hydrophilic layer thus formed on the substrate was measured with CA-Z (manufactured by Kyowa Kaimen Kagaku Co., Ltd.), and the angle was 7.80. This result shows good hydrophilicity of the hydrophilic layer surface.

Evaluation of Planographic Printing Plate Precursor of Example 5:

In the same manner as in Example 4, the planographic printing plate precursor of the Example 5 was exposed imagewise to form an image region on the surface of the precursor.

The water drop contact angle of the IR laser light-exposed surface of the printing plate precursor was 98°. This means that the exposed area of the precursor surface became hydrophobic, and a hydrophobic region (ink-receiving region) was formed. Without development, the imagewise-exposed precursor was directly set in a printer and used to produce prints, in the same manner as in Example 4. In the initial stage of the printing, high-quality images were immediately obtained. The printing was continued, and more than 5,000 good prints with no stain in the non-image area were obtained. This result shows that the hydrophilicity in the non-image region of the printing plate obtained from the precursor of this Example 6 is good and the printing durability thereof is also good. From this, it is understood that the planographic printing plate precursor of the Example 5, wherein a compound capable of changing their property from hydrophilic to hydrophobic was used as a compound to form a hydrophilic surface region, can also exhibit excellent effect of the present invention like the precursor of Example 4 in which thermo-fuseable hydrophobic particles were used.

Example 6

The same coating liquid 3 for image forming hydrophilic layer as in Example 4 was applied onto a corona-treated polyethylene terephthalate film substrate to have a dry weight of 3 g/m$^2$, and dried at 100° C. for 10 minutes. This was a planographic printing plate precursor of the Example 6.

The contact angle (to a water drop in air) of the surface of the image forming hydrophilic layer thus formed on the substrate was measured with CA-Z (manufactured by Kyowa Kaimen Kagaku Co., Ltd.), and the angle was 6.50. This result shows good hydrophilicity of the hydrophilic layer surface.

Evaluation of Planographic Printing Plate Precursor of Example 6:

In the same manner as in Example 4, the planographic printing plate precursor of this Example 6 was exposed imagewise to form an image region on the surface of the precursor.

The water drop contact angle of the IR laser light-exposed surface of the printing plate precursor was 105°. This result means that the exposed area of the precursor surface formed a hydrophobic region (ink-receiving region). Without development, the imagewise-exposed precursor was directly set in a printer and used to produce prints, in the same manner as in Example 4. In the initial stage of the printing, high-quality images were immediately obtained. The printing was continued, and more than 5,000 good prints with no stain in the non-image area were obtained. This result shows that the hydrophilicity in the non-image region of the printing plate from the precursor of this Example 6 is good and the printing durability of the plate is also good. From this, it is understood that the planographic printing plate precursor of the Example 6, in which a resin film was sued for the substrate, also exhibits excellent effect of the present invention.

As shown in the examples, the planographic printing plates obtained from the precursors of Examples 4 to 6 can maintain a high degree of hydrophilicity even in severe printing conditions, and its printing durability is good. It can give a large number of good prints of high quality with no stain in the non-image area. In particular, the precursor can be processed through scanning exposure based on digital signals. After imagewise-exposure, it can be processed into a printing plate through simple development with water, or without development, it can be directly set in a printer to produce prints, and its in-printer developability is good.

Examples 7 to 14

Production Example 3

Production of Hydrophilic Polymer (3-1)
In the same manner as in Production Example 1, the same polymer was produced.

Production Example 4

Production of Hydrophilic Polymer (3-5)
50 g of N-vinylacetamide, 2.9 g of mercaptopropyltrimethoxysilane, and 220 g of dimethylacetamide were put into a 500-ml three-neck flask, and 0.5 g of 2,2-azobis(2,4-dimethylvaleronitrile) was added thereto at 65° C. in a nitrogen atmosphere. After kept at the temperature with stirring for 6 hours, this solution was cooled to room temperature. The solution was put into 2 liters of ethyl acetate, and the precipitated solid was taken out through filtration, and washed with water to obtain a hydrophilic polymer (5). Dry weight of the polymer was 48.5 g. Weight-average molecular weight was determined by GPC (polystyrene standard), and a weight-average molecular weight of the polymer was 2500; and Measurement of the polymer by $^{13}$C-NMR (DMSO-d$_6$) confirmed that the polymer has a structure of Compound (5) mentioned above which is terminated with a trimethoxysilyl group (50.0 ppm).

Production Example 5

Production of Microcapsules (1)
7.5 g of a phenol-novolak resin having a weight-average molecular weight of 1500 (meta/para=60/40) and 0.1 g of an anionic surfactant (Pionin A-41C manufactured by Takemoto Yushi Co., Ltd.) were dissolved in 21.0 g of ethyl acetate to prepare an oily phase. To the oily phase was added 36.0 g of 4% aqueous solution of polyvinyl alcohol (PVA205 manufactured by Kuraray Co., Ltd.) as an aqueous phase. The phases were emulsified by the use of a homogenizer at 10000 rpm for 10 minutes. 24.0 g of water was added thereto, and the resulting liquid was heated at 50° C. for 3 hours to remove the organic solvent. The process gave a dispersion of microcapsules (1) wherein microcapsules were used as a hydrophobic precursor for image forming layer. The solid content concentration of the dispersion was measured and was 15.0%. The mean particle size of the microcapsules (1) was 0.3 μm.

Production Example 6

Production of Microcapsules (2)
40 g of xylylene diisocyanate, 10 g of trimethylolpropane diacrylate, 10 g of a copolymer of allyl methacrylate and butyl methacrylate (molar ratio thereof=17/3), 0.1 g of an anionic surfactant (Pionin A-41C manufactured by Takemoto Yushi Co., Ltd.), and 2 g of an iodonium salt having a structure mentioned below were dissolved in 60 g of ethyl acetate to prepare an oily phase component. 120 g of an aqueous solution of 4% polyvinyl alcohol (PVA205 manufactured by Kuraray Co., Ltd.) was prepared as an aqueous phase. The oily phase component and the aqueous phase component were emulsified by the use of a homogenizer at 10000 rpm. Next, 40 g of water was added thereto, and stirred at room temperature for 30 minutes and then stirred at 40° C. for 3 hours. The process gave a dispersion of microcapsules (2) that are used as a hydrophobic precursor for image forming layer. The solid content concentration of the dispersion was 20% by weight. The mean particle size of the microcapsules (2) was 0.5 μm.

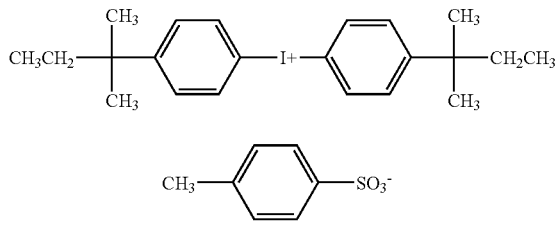

Production Example 7

Production of Polymer Particles (3)

400 g of methyl ethyl ketone was put into a one-liter four-neck flask equipped with a stirrer, a reflux equipment, a dry nitrogen-introducing tube with a thermometer, and a dropping funnel, and heated up to 80° C. A solution was prepared by mixing 80 g of vinyltoluene, 238.9 g of ethyl methacrylate, 24.5 g of methacrylic acid, 56.6 g of ethyl acrylate and 3 g of azobisisobutyronitrile, and the solution was added dropwise to the methyl ethyl ketone over a period of 2 hours. After this solution obtained was stirred for 6 hours, 0.5 g of azobisisobutyronitrile was added thereto and further stirred for 3 hours. As the result, an acrylic polymer having a solid content concentration of 49.5%, an acid value of 0.70 milliequivalents/g (polymer solid), and a mass molecular weight of 40,000 was obtained. The solid content concentration was obtained by sampling and measuring 1 part of the polymer solution, heating it at 120° C. for 1 hour, measuring the dried sample, and calculating the weight ratio of the samples measured. The weight-average molecular weight was obtained by GPC, through conversion based on molecular weight of polyethylene as a standard substance. The acid value was determined by sampling a predetermined amount of the polymer solution and titrating it with an aqueous 0.1 N sodium hydroxide solution.

Next, after solvent had been removed from the resin obtained above (the acrylic polymer), 20 g of the resin was dissolved in 50 g of a solvent of 1-methoxy-2-propanol/water (mass ratio: 8/2), and 0.84 g of triethylamine was added thereto. Next, 50 g of an aqueous solution of 5% polyacrylamide was further added thereto, and it was emulsified by the use of a homogenizer at 15,000 rpm for 15 minutes. This emulsion was further stirred under reduced pressure at 60° C. for 3 hours to remove the organic solvent. The process gave an aqueous dispersion of polymer particles (3) that serve as a hydrophobic precursor for image forming layer.

Production Example 8

Production of Polymer Particles (4)

The same process as in Production Example 5 (for producing polymer particles (3)) was repeated except that 3.3 g of an aqueous 10% sodium hydroxide solution was added instead of 0.84 g of triethylamine. This gave an aqueous dispersion of polymer particles (4) that serve as a hydrophobic precursor for image forming layer.

Production Example 9

Production of Polymer Particles (5)

533 g of Barnock DN-9180 (trade name, polyisocyanate manufactured by Dainippon Ink & Chemicals, Inc.), 33.5 g of 2,2-bis(hydroxymethyl)propionic acid, 0.05 g of dibutyl tin dilaurate, and 300 g of ethyl acetate were put into a one-liter four-neck flask equipped with a stirrer, a reflux equipment, a dry nitrogen-introducing tube and a thermometer, and stirred at 80° C. for 3 hours. 50 g of ethanol was added thereto and further stirred at 80° C. for 1 hour to treat the terminal isocyanate group of the polymer, and the polymer was precipitated in water. The acid value of the polymer was 0.57 milliequivalent/g (polymer solid). The process gave a polyurethane prepolymer solution having a dry solid content ration of 50.0% and a NCO (isocyanate group) content ratio of 6.80%. The NCO content ratio was obtained by sampling a predetermined amount of the polymer solution, adding thereto a predetermined amount of an ethyl acetate solution containing di-n-butylamine wherein the amine content was known, such that the amount of di-n-butylamine is lager than those of the isocyanate group to be measured, reacting them, and back-titrating the excess di-n-butylamine with an aqueous hydrochloric acid solution wherein the concentration thereof was known.

After the solvent had been removed from the polyurethane prepolymer solution, 20 g of the resin obtained was dissolved in 50 g of a solvent of 1-methoxy-2-propanol/water (mass ratio: 8/2), and 1.04 g of triethylamine was added thereto. Next, 50 g of a 5% aqueous solution of polyacrylic acid was further added thereto, and emulsified by the use of a homogenizer at 15,000 rpm for 15 minutes. This was further stirred under reduced pressure at 60° C. for 3 hours to remove the organic solvent. The process gave an aqueous dispersion of polymer particles (5) that serve as a hydrophobic precursor for image forming layer.

Examples 7 to 11

Preparation of Substrate:

In the same manner as in Example 1, the same substrates were prepared.

Formation of Hydrophilic Layer:

The sol-like hydrophilic coating liquid composition 1 was prepared in the same manner as in Example 1, and this composition was applied onto the aluminium substrate to form thereon a hydrophilic layer also in the same manner as in Example 1.

Formation of Image forming Layer:

Coating liquids for image forming layer mentioned below were prepared. Using a rod bar #15, each of the coating liquids was applied onto the hydrophilic layer to have a dry weight of 0.8 g/m², and dried at 60° C. for 3 minutes to form an image forming layer thereon. The process gave planographic printing plate precursors of these Examples 7 to 11. The particle dispersion described below was prepared by adding distilled water to the dispersion obtained in each of Production Examples 3 to 7 to have a solid content concentration of 10%.

Coating Liquids for Image Forming Layer:

| | |
|---|---|
| Particle dispersion (the particle therein is a hydrophobic precursor described in Table 1) | 10 g |
| Hydrophilic resin (described in Table 1) | 0.1 g |
| Light to heat converting agent (IR-10 mentioned above) | 0.1 g |
| Megafac F-177 (fluorine-containing surfactant manufactured by Dainippon Ink & Chemicals, Inc.), 20% aqueous solution | 0.05 g |

Distilled water (that was added such that solid content concentration of the coating liquid was 7%)

Evaluation of Planographic Printing Plate Precursors of Examples 7 to 11:

Using Trend Setter 3224VFS manufactured by Creo Corp., equipped with a water-cooling type 40 W IR semiconductor laser, each planographic printing plate precursor fabricated above was exposed imagewise. The power was 9 W; the number of revolution of the outer drum was 210 rpm; the energy on the precursor surface was 500 mJ/cm$^2$; and resolution was 2400 dpi. Without development, the image-wise-exposed precursor was directly set in a printer, which is SOR-M manufactured by Heidelberg Co. Dampening water was first applied thereto, and then ink was also applied. Further, printing paper was applied thereto, and printing was carried out to produce prints. In the in-printer development and printing test, the number of copying paper sheets needed for finishing the in-printer development and the number of good prints which was obtained during continuous printing (the number of prints which can endure the printing test) were counted. Further, the prints were checked for stains (presence or absence of background stains). The test results are given in Table 1 below.

As shown in Table 1, the planographic printing plate precursors of Examples 7 to 11 were completely developed between the first print and fortieth to sixtieth prints, and gave a large number of good prints of high quality. This result shows that all precursors of Examples 7 to 11 have good in-printer developability. In addition, even in the initial stage of the printing, the printing plates obtained from the precursors immediately gave good prints with no stain in the non-image area. When the printing was continued, all the printing plates gave more than 30,000 good prints having excellent image quality. This result shows that all the planographic printing plates obtained from the precursors maintain good hydrophilicity in the non-image area, and all plates have good printing durability.

Examples 12 to 14

The same hydrophilic coating liquid compositions as in Examples 7 and 10 were prepared and each of the compositions was applied onto substrate, which is a corona-treated polyethylene terephthalate film, to form a hydrophilic layer thereon.

Further, coating liquids for image forming layer were prepared and applied onto the hydrophilic layers as in Table 2 below. That is, the same coating liquids for image forming layer as in Examples 7 and 9 were prepared and each of them was applied onto the hydrophilic layer which was prepared in a same manner as in Example 7; and the same coating liquid for image forming layer as in Example 10 was prepared and applied onto the hydrophilic layer which was prepared in a same manner as in Example 10. After dried, an image forming layer was formed. These were planographic printing plate precursors of Examples 12 to 14.

TABLE 1

| | Hydrophilic Layer Utilized | Image forming Layer | | Test Results | | |
|---|---|---|---|---|---|---|
| | | | | No. Printing Papers needed for achieving | Printing durability (no. of good | Stains in |
| | Hydrophilic Polymer | Hydrophobic Precursor | Hydrophilic Resin | in-printer development | prints, 10,000) | Non-Image Area |
| Example 7 | Hydrophilic polymer (1) | microcapsules (1) | PVA205 | 40 | 3.0 | no |
| Example 8 | hydrophilic polymer (1) | microcapsules (2) | PVA205 | 45 | 4.5 | no |
| Example 9 | hydrophilic polymer (1) | polymer particles (3) | polyacrylic acid | 55 | 3.5 | no |
| Example 10 | hydrophilic polymer (5) | polymer particles (4) | polyacrylic acid | 60 | 3.0 | no |
| Example 11 | hydrophilic polymer (5) | polymer particles (5) | polyacrylic acid | 55 | 5.5 | no |

TABLE 2

| | Image forming Layer | | | Test Results | | |
|---|---|---|---|---|---|---|
| | Hydrophilic Layer Hydrophilic Polymer | Utilized Hydrophobic Precursor | Hydrophilic Resin | No. of Printing Papers needed for achieving in-printer development | Printing durability (no. of good prints, × 10,000) | Stains in Non-Image Area |
| Example 12 | hydrophilic polymer (3-1) | microcapsules (1) | PVA205 | 40 | 3.0 | no |
| Example 13 | hydrophilic polymer (3-1) | polymer particles (3) | polyacrylic acid | 55 | 3.5 | no |
| Example 14 | hydrophilic polymer (3-5) | polymer particles (4) | polyacrylic acid | 60 | 3.0 | no |

As shown in Table 2, the planographic printing plate precursors of the present invention having a PET substrate also have good in-printer developability and give good prints with no stain in the non-image area, and all the printing plates obtained from them have good printing durability. That is, the planographic printing plate precursors having a PET substrate was excellent similar to those having an aluminum substrate The planographic printing plates obtained from the precursors of Examples 12 to 14 comprises hydrophilic layer having high hydrophilicity and good durability. Therefore, stain resistance thereof is good. Even in severe printing conditions, the printing plate can provide a large number of good prints with no stain. In addition, the printing plate precursor of the present invention can be processed into a printing plate through scanning exposure based on digital signals. After thus imagewise exposed, the precursor can be processed into a printing plate through simple development with water, or without development, it can be directly set in a printer to produce prints, and therefore its in-printer developability is good.

Examples 15 to 29

Example 15

Formation of Image Forming Layer:

In a same manner as in Example 1, a substrate having a hydrophilic layer was obtained. A coating liquid for image forming layer having a composition mentioned below was prepared. The coating liquid was applied onto the hydrophilic layer to have a dry weight of 1.5 g/m², and dried at 100° C. for 30 minutes to form a positive image forming layer thereon. This was a planographic printing plate precursor of the Example 15.

Coating Liquid for Positive Image Forming Layer:

| | |
|---|---|
| Ester of naphtoquinone-(1,2)-diazide-4-sulfonyl chloride with pyrogallol-acetone resin | 0.90 g |
| Victoria Pure Blue BOH | 0.05 g |
| Cresol-formaldehyde novolak resin (meta:para ratio = 6:4, weight-average molecular weight 8,000) | 2.0 g |
| Methyl ethyl ketone | 20.00 g |
| Methyl alcohol | 7.00 g |

Evaluation of Planographic Printing Plate Precursor of Example 15:

The obtained planographic printing plate precursor was exposed to PS light through a Step Guide (manufactured by Fuji Photo Film Co., Ltd.). After exposure, the plate was processed through an automatic developing machine filled with a developer of DP-4 (manufactured by Fuji Photo Film Co., Ltd.). The precursor processed was set in a printer (SOR-M manufactured by Heidelberg Co.), and printing was carried out, and 5,000 good prints having no stain in the non-image area were obtained. This result means that the hydrophilicity of the printing plate obtained is good and the printing durability thereof is also good.

Comparative Example 3

A planographic printing plate precursor was prepared in the same manner as in Comparative Example 1, and same result was obtained.

Example 16

Negative Planographic Printing Plate Precursor:
Formation of Hydrophilic Surface:
A substrate having a hydrophilic layer was prepared in the same manner as in Example 2.
Formation of Image Forming Layer:
A coating liquid for image forming layer having a composition mentioned below was prepared. The coating liquid was applied onto the substrate having hydrophilic layer to have a dry weight of 1.7 g/m², and dried at 100° C. for 10 minutes to form a negative image forming layer thereon. This was a planographic printing plate precursor of the Example 16.

Coating Liquid 1 for Negative Image Forming Layer:

| | |
|---|---|
| Copolymer of P-hydroxyphenyl methacrylamide/2-hydroxyethyl methacrylate/acrylonitrile/methylmethacrylate/methacrylic acid (Weight ratio = 10/20/25/35/10, weight-average molecular weight 60,000) | 5.0 g |
| Diazo compound represented by the following formula (V) (Weight-average molecular weight 16,500) | 0.5 g |
| Victoria Pure Blue BOH | 0.1 g |
| Cellulose ethyl ether | 0.2 g |
| Tricresyl phosphate | 0.5 g |
| Methyl cellosolve | 95 ml |
| Water | 5 ml |

-continued general formula (V)

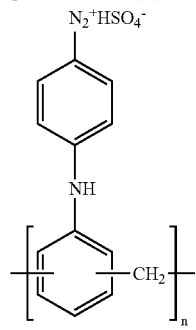

Evaluation of Planographic Printing Plate Precursor of Example 16:

The resulting planographic printing plate was exposed by Jet Printer 2000 (manufactured by Oak Seisakusho Co., Ltd.) through a Step Guide (manufactured by Fuji Photo Film Co., Ltd.) for 50 seconds. After exposure, the plate was developed with a following developer. The developed precursor was set in a printer (SOR-M manufactured by Heidelberg Co.), and printing was carried out, and 6,000 good prints having no stain in the non-image area were obtained. This result shows that the hydrophilicity of non-image area is maintained well and the printing durability thereof is also good.

Developer:

| Benzyl alcohol | 30 ml |
| Sodium carbonate | 5 g |
| Sodium sulphite | 5 g |
| Sodium dodecylbenzene sulfonate | 10 g |
| Water | 1 L |

Example 17

Positive Planographic Printing Plate Precursor:

Preparation of Substrate:

The components mentioned below were uniformly mixed, and stirred at 80° C. for 2 hours for hydrolysis. As the result, a sol-like hydrophilic coating liquid composition was obtained.

Hydrophilic Coating Liquid Composition:

| Hydrophilic polymer (Compound 1-5 shown above) | 0.21 g |
| Tetramethoxysilane | 0.62 g |
| Ethanol | 4.70 g |
| Water | 4.70 g |
| Aqueous solution of nitric acid (1 N) | 0.10 g |

This composition solution was applied onto a substrate (a corona treated polyethlene terephthalate film) to have a dry weight of 2 g/m², and dried at 100° C. for 10 minutes to form thereon a hydrophilic layer. The hydrophilic layer-coated substrate for planographic printing plate precursor was used in the Example 17. The contact angle (to a water drop in air) of the surface of the hydrophilic layer thus formed was measured with CA-Z (manufactured by Kyowa Kaimen Kagaku Co., Ltd.), and was 8.9°. This result shows good hydrophilicity of the hydrophilic layer surface.

Formation of Image Forming Layer:

A coating liquid for image forming layer having a composition mentioned below was applied onto the substrate (corona treated polyethylene terephthalate film having the hydrophilic layer) to have a dry weight of 1.0 g/m², and dried at 100° C. for 10 minutes to form thereon a hydrophilic layer. Thus, planographic printing plate precursor was obtained.

Coating Liquid for Positive Image Forming Layer:

| Ester of naphtoquinone-(1,2)-diazide-4-sulfonyl chloride with pyrogallol-acetone resin | 0.9 g |
| Victoria Pure Blue BOH | 0.05 g |
| Cresol-formaldehyde novolak resin (meta:para ratio = 6:4, weight-average molecular weight 1800) | 2.0 g |
| Methyl ethyl ketone | 20.0 g |
| Methyl alcohol | 7.0 g |

Evaluation of Planographic Printing Plate Precursor of Example 17:

The resulting planographic printing plate precursor was exposed to PS light through a Step Guide (manufactured by Fuji Photo Film Co., Ltd.). After exposure, the plate was processed through an automatic developing machine filled with a developer of DP-4 (1:8, manufactured by Fuji Photo Film Co., Ltd.). The precursor was set in a printer (SOR-M manufactured by Heidelberg Co.), and printing was carried out, and 5,000 good prints having no stain in the non-image area were obtained. This result shows that the hydrophilicity of the non-image area is good and the printing durability thereof is also good.

Examples 18 to 29

Positive photo-sensitive Planographic Printing Plate Precursor:

Planographic printing plate precursors were formed in a same manner as in Example 15 except that composition of the hydrophilic coating liquid and its coating amount was changed in accordance with following Table 3.

The contact angles (to a water drop in air) of the surface of the hydrophilic layers were measured with CA-Z (manufactured by Kyowa Kaimen Kagaku Co., Ltd.). These results were also shown in Table 3. Further, in a same manner as in Example 15, positive planographic printing plate precursors for Examples 18 to 29 were formed.

Evaluation of Planographic Printing Plate Precursors of Examples 18 to 29:

Planographic printing plate precursors of Examples 18 to 29 were exposed to, developed and used for printing in as same manner as in Example 15.

All planographic printing plate precursors of Examples 15 to 29 provided prints having high-quality images. Further, each of printing was continued. Further, each of printing stain resistance was evaluated when 9,000th print and 15,000th print were obtained. Results thereof were shown in Table 3. As the evaluation of the printing stain resistance, referred to are following results in Table 3.

TABLE 3

| | Hydrophilic coating liquid composition | | Surface | Printing stain resistance | |
|---|---|---|---|---|---|
| | Utilized hydrophilic polymer | Weight ratio of hydrophilic polymer to tetramethoxysilane | Coating amount (g/m²) | hydrophilicity Contact angle (°) | 9,000th print | 15,000th print |
| Example 18 | hydrophilic polymer (1-1) | 25/75 | 0.05 | 7.3 | ○ | ○ |
| Example 19 | hydrophilic polymer (1-1) | 25/75 | 0.03 | 7.7 | ○ | ○ |
| Example 20 | hydrophilic polymer (1-1) | 50/50 | 0.03 | 6.5 | ○ | ○ |
| Example 21 | hydrophilic polymer (1-1) | 10/90 | 0.05 | 13.2 | ○ | Δ |
| Example 22 | hydrophilic polymer (2-1) | 25/75 | 0.10 | 9.0 | ○ | ○ |
| Example 23 | hydrophilic polymer (2-1) | 10/90 | 0.05 | 18.0 | Δ | Δ |
| Example 24 | hydrophilic polymer (1-13) | 25/75 | 0.50 | 7.9 | ○ | ○ |
| Example 25 | hydrophilic polymer (1-15) | 10/90 | 0.10 | 12.2 | ○ | Δ |
| Example 26 | hydrophilic polymer (1-16) | 25/75 | 0.05 | 8.0 | ○ | ○ |
| Example 27 | hydrophilic polymer (1-17) | 50/50 | 0.05 | 6.5 | ○ | ○ |
| Example 28 | hydrophilic polymer (1-22) | 10/90 | 0.03 | 14.1 | ○ | Δ |
| Example 29 | hydrophilic polymer (1-23) | 25/75 | 0.05 | 8.0 | ○ | ○ |

As shown from the Examples 15 to 29, the substrates having hydrophilic layer used for planographic printing plat precursor of the present invention has high hydrophilicity, and the hydrophilicity can be maintained even in severe printing conditions. Therefore, when the substrate is used for a planographic printing plate, printing durability of the plate is excellent, and many high quality image prints can be obtained. As described above, the substrate for planographic printing plat precursor of the present invention has comprises hydrophilic layer having high hydrophilicity and good durability. Therefore, stain resistance thereof is good. Even in severe printing conditions, the printing plate can provide a large number of good prints with no stain.

Example 30

Formation of Hydrophilic Surface Material:

The hydrophilic coating liquid composition was prepared in the same manner as in Example 1, and was applied onto a glass plate (manufactured by Endo Kagaku Co.) to have a dry weight of 2 g/m², and dried at 100° C. for 10 minutes to form an hydrophilic layer thereon. The plate was surface hydrophilic material of the Example 30.

Evaluation of Hydrophilic Surface Material of Example 30:

The surface of the surface hydrophilic material obtained was rubbed with non-woven fabric (BEMCOT, manufactured by Asahi Chemical Industry Co, Ltd.) one hundred times. The contact angles (to a water drop in air) of the surface before and after rubbing were measured with CA-Z (manufactured by Kyowa Kaimen Kagaku Co., Ltd.). The surface after rubbing was observed. No peeling of the layer and no scratch were observed. The contact angle before rubbing was 6.5° and those after rubbing was 6.9°. These results means that the surface hydrophilic material of the present invention can maintain excellent hydrophilicity even after rubbing as well as before rubbing, and has goof plate wear resistance.

What is claimed is:

1. A planographic printing plate precursor comprising a substrate having disposed thereon a hydrophilic layer which includes hydrophilic graft chains and a crosslinked structure formed through hydrolytic polycondensation of an alkoxide of an element selected from Si, Ti, Zr and Al, wherein the hydrophilic layer includes a polymer compound represented by the following general formula (I):

general formula (I)

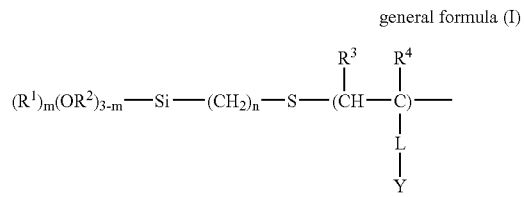

general formula (I)

wherein each of $R^1$, $R^2$, $R^3$ and $R^4$ independently represents a hydrogen atom or a hydrocarbon group having 1 to 8 carbon atoms; m is an integer of 0 to 2; n is an integer of 1 to 8; L represents a single bond or an organic linking group; Y represents —NHCOR⁵, —CONH₂, —CON(R⁵)₂, —COR⁵, —OH, —CO₂M or —SO₃M; $R^5$ represents an alkyl group having 1 to 8 carbon atoms; and M represents one of a hydrogen atom, an alkali metal, an alkaline earth metal and an onium and wherein the planographic printing plate precursor further comprises an image forming layer on the hydrophilic layer, and the image forming layer contains a polymer compound including a functional group that changes from one of hydrophilic to hydrophobic and hydrophobic to hydrophilic in the presence of an acid, by application of heat, or by irradiation with radiation.

2. The planographic printing plate precursor according to claim 1, wherein the polymer compound including a functional group that changes from hydrophobic to hydrophilic is at least one selected from the group consisting of secondary sulfonate polymers, tertiary carboxylate polymers, and alkoxyalkyl carboxylate polymers; and the polymer compound including a functional group that changes from hydrophilic to hydrophobic is at least one selected from the group consisting of polymers having an ammonium group and polymers having a decarboxylation polarity-changing group represented by the following general formula:

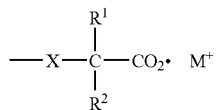

wherein X represents —O—, —S—, —Se—, —NR³—, —CO—, —SO—, —SO₂—, —PO—, —SiR³R⁴—, or —CS; each of $R^1$, $R^2$, $R^3$ and $R^4$ independently represents a monovalent group; and M represents a cation.

3. A planographic printing plate precursor comprising a substrate having disposed thereon a hydrophilic layer which includes hydrophilic graft chains and a crosslinked structure formed through hydrolytic polycondensation of an alkoxide of an element selected from Si, Ti, Zr and Al, wherein the hydrophilic layer includes a Polymer compound represented by the following general formula (I):

general formula (I)

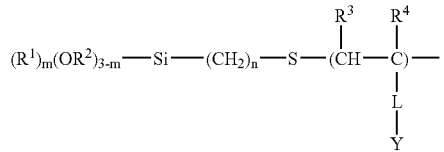

wherein each of $R^1$, $R^2$, $R^3$ and $R^4$ independently represents a hydrogen atom or a hydrocarbon group having 1 to 8 carbon atoms; m is an integer of 0 to 2; n is an integer of 1 to 8; L represents a single bond or an organic linking group; Y represents —NHCOR⁵, —CONH₂, —CON(R⁵)₂, —COR⁵, —OH, —CO₂M or —SO₃M; $R^5$ represents an alkyl group having 1 to 8 carbon atoms; and M represents one of a hydrogen atom, an alkali metal, an alkaline earth metal and an onium and wherein the hydrophilic layer further includes a compound that forms a hydrophobic surface region by application of heat or irradiation with radiation.

4. The planographic printing plate precursor according to claim 3, wherein the compound that forms the hydrophobic surface region is at least one of a compound that changes from hydrophilic to hydrophobic by application of heat or irradiation with radiation, and thermo-fuseable hydrophobic particles, and when the compound that changes from hydrophilic to hydrophobic is used and formed into a film, a contact angle between a surface of the film and a water drop in air is at most 20° before the film is heated, and increases to at least 65° after the film has been heated.

5. The planographic printing plate precursor according to claim 3, wherein the coating liquid composition includes one of an acid catalyst and a basic catalyst.

6. A planographic printing plate precursor comprising a substrate having disposed thereon a hydrophilic layer which includes hydrophilic graft chains and a crosslinked structure formed through hydrolytic polycondensation of an alkoxide of an element selected from Si, Ti, Zr and Al, wherein the hydrophilic layer includes a polymer compound represented by the following general formula (I):

general formula (I)

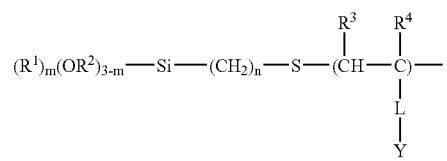

wherein each of $R^1$, $R^2$, $R^3$ and $R^4$ independently represents a hydrogen atom or a hydrocarbon group having 1 to 8 carbon atoms; m is an integer of 0 to 2; n is an integer of 1 to 8; L represents a single bond or an organic linking group; Y represents —NHCOR⁵, —CONH₂, —CON(R⁵)₂, —COR⁵, —OH, —CO₂M or —SO₃M; $R^5$ represents an alkyl group having 1 to 8 carbon atoms; and M represents one of a hydrogen atom, an alkali metal, an alkaline earth metal and an onium and wherein the hydrophilic layer is formed by preparing a coating liquid composition including the hydrophilic polymer compound represented by general formula (I), a crosslinking component represented by the following general formula (II), and a compound that forms a hydrophobic surface region by application of heat or by irradiation with radiation, applying the coating liquid composition onto a surface of the substrate, the substrate comprising aluminum, and drying the coating liquid composition:

general formula (II)

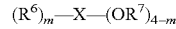

wherein each of $R^6$ and $R^7$ independently represents an alkyl group or an aryl group; X represents Si, Al, Ti or Zr; and m is an integer of 0 to 2.

* * * * *